US012259402B2

(12) United States Patent
Zhou et al.

(10) Patent No.: US 12,259,402 B2
(45) Date of Patent: Mar. 25, 2025

(54) ACCELERATION SENSING DEVICE

(71) Applicant: SHENZHEN SHOKZ CO., LTD., Guangdong (CN)

(72) Inventors: Wenbing Zhou, Shenzhen (CN); Wenjun Deng, Shenzhen (CN); Yongshuai Yuan, Shenzhen (CN); Yujia Huang, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 76 days.

(21) Appl. No.: 17/812,176

(22) Filed: Jul. 13, 2022

(65) Prior Publication Data

US 2022/0341964 A1    Oct. 27, 2022

Related U.S. Application Data

(63) Continuation of application No. PCT/CN2022/071932, filed on Jan. 14, 2022.

(30) Foreign Application Priority Data

Apr. 23, 2021 (CN) .......................... 202110445739.3

(51) Int. Cl.
*G01P 15/125* (2006.01)
*G01P 1/02* (2006.01)
*G01P 15/097* (2006.01)

(52) U.S. Cl.
CPC ............ *G01P 15/125* (2013.01); *G01P 1/023* (2013.01); *G01P 15/097* (2013.01)

(58) Field of Classification Search
CPC ........ G01P 15/125; G01P 15/097; G01P 1/02; G01P 1/023; G01P 2015/0831
See application file for complete search history.

(56) References Cited

U.S. PATENT DOCUMENTS 4,333,342 A * 6/1982 Gilden ................ G01P 15/0975
73/514.12
4,676,104 A * 6/1987 Cullen ................ G01P 15/0975
73/514.12
(Continued)

FOREIGN PATENT DOCUMENTS

CN    105158511 A    12/2015
CN    209589100 U    11/2019
(Continued)

OTHER PUBLICATIONS

International Search Report in PCT/CN2022/071932 mailed on Apr. 13, 2022, 10 pages.
(Continued)

*Primary Examiner* — Helen C Kwok
(74) *Attorney, Agent, or Firm* — METIS IP LLC

(57) ABSTRACT

The present disclosure discloses an acoustic device and a support assembly. The support assembly may include a shell configured to provide a space for accommodating one or more components of the acoustic device. The support assembly may further include an interaction assembly configured to realize an interaction between a user and the acoustic device, wherein the interaction assembly include a first component and one or more second components, in response to receiving an operation of the user, the first component is configured to trigger at least one of the one or more second components to cause the acoustic device to perform a function corresponding to the at least one of the one or more second components.

18 Claims, 17 Drawing Sheets

(56) References Cited

U.S. PATENT DOCUMENTS

| | | | | |
|---|---|---|---|---|
| 4,882,933 | A * | 11/1989 | Petersen | G01P 15/0802 |
| | | | | 73/514.33 |
| 5,150,616 | A * | 9/1992 | Kondo | G01P 1/023 |
| | | | | 73/514.33 |
| 5,777,227 | A * | 7/1998 | Cho | G01P 15/0802 |
| | | | | 73/514.12 |
| 9,278,847 | B2 * | 3/2016 | Cazzaniga | B81B 3/0018 |
| 9,645,032 | B2 | 5/2017 | Shimoyama et al. | |
| 2002/0051258 | A1 * | 5/2002 | Tamura | G01P 1/02 |
| | | | | 358/514 |
| 2008/0264169 | A1 * | 10/2008 | Ingrisch | B60T 8/3675 |
| | | | | 73/514.14 |
| 2009/0282915 | A1 * | 11/2009 | Ohta | H05K 13/00 |
| | | | | 73/504.12 |
| 2011/0296916 | A1 * | 12/2011 | Ge | G01P 15/18 |
| | | | | 73/514.32 |
| 2011/0303010 | A1 * | 12/2011 | Yang | G01P 15/18 |
| | | | | 73/514.32 |
| 2012/0007469 | A1 * | 1/2012 | Matova | H02N 2/185 |
| | | | | 310/322 |
| 2012/0031185 | A1 * | 2/2012 | Classen | G01P 15/125 |
| | | | | 73/514.14 |
| 2012/0180567 | A1 * | 7/2012 | Koyama | G01P 1/006 |
| | | | | 73/579 |
| 2013/0002244 | A1 * | 1/2013 | Quevy | G01R 33/0286 |
| | | | | 324/244 |
| 2013/0104656 | A1 * | 5/2013 | Smith | G01P 1/003 |
| | | | | 73/514.16 |
| 2013/0263661 | A1 * | 10/2013 | Watanabe | G01P 15/09 |
| | | | | 73/504.12 |
| 2014/0000365 | A1 * | 1/2014 | Aaltonen | G01C 19/5762 |
| | | | | 73/504.12 |
| 2016/0327523 | A1 | 11/2016 | Shimoyama et al. | |
| 2016/0370403 | A1 * | 12/2016 | Merdassi | G01P 15/18 |
| 2017/0018471 | A1 * | 1/2017 | Aono | G01L 9/02 |
| 2017/0052207 | A1 * | 2/2017 | Classen | G01P 15/125 |
| 2017/0089943 | A1 * | 3/2017 | Chen | B81B 7/0048 |
| 2017/0261528 | A1 * | 9/2017 | Fain | G01P 15/123 |
| 2018/0080954 | A1 * | 3/2018 | Ono | G01P 15/08 |
| 2018/0113146 | A1 * | 4/2018 | Najafi | G01P 15/125 |
| 2018/0209791 | A1 * | 7/2018 | Chang | G01P 15/097 |
| 2018/0275160 | A1 * | 9/2018 | Otsuki | G01P 1/023 |
| 2019/0296711 | A1 * | 9/2019 | Kulah | H03H 9/465 |
| 2020/0025786 | A1 * | 1/2020 | Malvern | G01P 1/003 |
| 2020/0096538 | A1 | 3/2020 | Zhang et al. | |
| 2020/0408721 | A1 | 12/2020 | Shimoyama et al. | |
| 2020/0408722 | A1 | 12/2020 | Shimoyama et al. | |

FOREIGN PATENT DOCUMENTS

| | | |
|---|---|---|
| CN | 110988395 A | 4/2020 |
| JP | H09230032 A | 9/1997 |
| JP | 2015227863 A | 12/2015 |
| JP | 2016130735 A | 7/2016 |
| JP | 2020046233 A | 3/2020 |
| WO | 2010084981 A1 | 7/2010 |

OTHER PUBLICATIONS

Written Opinion in PCT/CN2022/071932 mailed on Apr. 13, 2022, 10 pages.

* cited by examiner

705

710

Etching may be performed on a doped layer of a manufacturing silicon substrate to etch a detection assembly on a monocrystalline silicon layer of the manufacturing silicon substrate, the detection assembly may include a support rod, a mass element connected to the support rod, and a coupling member which may wrap the mass element and has a gap with the mass element

720

A free end of the support rod and the coupling member may be bonded to a surface of a first silicon substrate, and the monocrystalline silicon layer may be removed

730

A second silicon substrate may be etched to form a holding groove, and a side of the second silicon substrate etched with the holding groove may be bonded with a first silicon substrate, so that the first silicon substrate and the holding groove may be enclosed into a cavity for accommodating the detection assembly

FIG. 7A

ACCELERATION SENSING DEVICE

CROSS-REFERENCE TO RELATED APPLICATIONS

This application is a continuation of International Patent Application No. PCT/CN2022/071932, filed on Jan. 14, 2022, which claims priority to Chinese Patent Application No. 202110445739.3, filed on Apr. 23, 2021, the contents of each of which are incorporated herein by reference in their entirety.

TECHNICAL FIELD

The present disclosure relates to sensing devices, in particular, to an acceleration sensing device.

BACKGROUND

For an acceleration sensing device (e.g., a capacitive acceleration sensing device, a piezoelectric acceleration sensing device, or a piezoresistive acceleration sensing device), when subjected to an external force or external acceleration whose frequency is close to a natural resonant frequency of the acceleration sensing device, the acceleration sensing device may produce a relatively large amplitude and output a relatively large electrical signal. Therefore, a response of acceleration sensing device to the external force or the external acceleration may be represented by a frequency response curve that has a resonance peak near the resonant frequency. A sensitivity of the acceleration sensing device near the resonant frequency may be higher, while sensitivities at other frequencies may be lower, resulting in a higher value of a quality factor Q and an unstable output gain. At the same time, at the working state, the acceleration sensing device may be subject to large external impacts. When an external impact load is relatively high, internal components of the acceleration sensing device may be damaged. Therefore, it is desirable to provide an acceleration sensing device being capable of adjusting the value of the quality factor Q, improve the sensitivity of the acceleration sensing device, stabilize the output gain, and improve the impact resistance reliability of the acceleration sensing device.

SUMMARY

A sensing device, comprising: an acceleration sensor, having a first resonant frequency, wherein the acceleration sensor may include a housing and a sensing element, and the sensing element may be located within a cavity formed by the housing; and at least one resonant system, coupled to the sensing element. The at least one resonant system may provide at least one second resonant frequency for the sensing device, and the at least one second resonant frequency may be the same as or different from the first resonant frequency.

In some embodiments, the sensing element may include: a substrate; a mass element, in response to an external acceleration, the mass element moving relative to the substrate, wherein at least one moving electrode may be set on the mass element; and at least one fixing electrode fixed on the substrate, wherein the at least one fixing electrode and the at least one moving electrode may form at least one detection capacitor, the at least one detection capacitor being configured to determine a magnitude of the external acceleration.

In some embodiments, the at least one moving electrode may include: at least one group of first moving electrodes arranged along a first direction and each group of first moving electrodes extending perpendicular to the first direction, wherein each group of first moving electrodes may include one or more first moving electrodes; and at least one group of second moving electrodes arranged along a second direction and each group of second moving electrodes extending perpendicular to the second direction wherein each group of second moving electrodes may include one or more second moving electrodes. The at least one fixing electrode may include: a first fixing electrode being set relative to and in parallel with each of the first moving electrodes, wherein the at least one group of first moving electrodes and the corresponding first fixing electrodes may form a first direction detection capacitor; a second fixing electrode being set relative to and in parallel with each of the second moving electrodes, wherein the at least one group of second moving electrodes and the corresponding second fixing electrodes may form a second direction detection capacitor, wherein the at least one group of first moving electrodes, the at least one group of second moving electrodes, the corresponding first fixing electrodes, and the corresponding second fixing electrodes may form a third direction detection capacitor.

In some embodiments, the second direction may be perpendicular to the first direction.

In some embodiments, the at least one group of first moving electrodes may include an even number of groups of first moving electrodes and the even number of groups of first moving electrodes may be located on two sides of the mass element along the first direction. The at least one group of second moving electrodes may include an even number of groups of second moving electrodes and the even number of groups of second moving electrodes may be located on two sides of the mass element along the second direction.

In some embodiments, each group of first moving electrodes may be provided with a first moving electrode shaft along the first direction and one or more first fixed moving electrodes perpendicular to the first direction, and the first moving electrode shaft and the one or more first fixed moving electrodes may be connected with the substrate through a first elastic element. Each group of second moving electrodes may be provided with a second moving electrode shaft along the second direction and one or more second fixed moving electrodes perpendicular to the second direction, and the second moving electrode shaft and the one or more second fixed moving electrodes may be connected with the substrate through a second elastic element. The sensing device may further include: a pair of first fixing electrode shafts and a pair of first fixed fixing electrodes corresponding to the each group of first moving electrodes, wherein the pair of first fixing electrode shafts may be symmetrically arranged relative to the first direction, the pair of first fixed fixing electrodes may be perpendicular to the first direction, the first moving electrode shaft of the each group of first moving electrodes may be set between the pair of first fixing electrode shafts, and the one or more first fixed moving electrodes may be set between the pair of first fixed fixing electrodes; and a pair of second fixing electrode shafts and a pair of second fixed fixing electrodes corresponding to the each group of second moving electrodes, wherein the pair of second fixing electrode shafts may be symmetrically arranged relative to the second direction, the pair of second fixed fixing electrodes may be perpendicular to the second direction, the second moving electrode shaft of the each group of second moving electrodes may be set between the pair of second fixing electrode shafts, and the one or more second fixed moving electrodes may be set between the pair of second fixed fixing electrodes.

In some embodiments, the pair of first fixing electrode shafts, the pair of first fixed fixing electrodes, and the first fixed moving electrode corresponding to the each group of first moving electrodes may form a triangular region. The pair of second fixing electrode shafts, the pair of second fixed fixing electrodes, and the second fixed moving electrode corresponding to the each group of second moving electrodes may form a triangular region.

In some embodiments, a first fixing electrode shaft adjacent to a second fixing electrode shaft may be parallel to and has a certain distance from the second fixing electrode shaft.

In some embodiments, each first moving electrode has a first moving electrode top surface and a first moving electrode bottom surface, the first moving electrode top surface and the first moving electrode bottom surface may be parallel to an upper surface of the mass element, a corresponding first fixing electrode has a first fixing electrode top surface and a first fixing electrode bottom surface, the first fixing electrode top surface and the first fixing electrode bottom surface may be parallel to the upper surface of the mass element, and the first moving electrode top surface may be farther away from the upper surface of the mass element compared with the first fixing electrode top surface. Each second moving electrode has a second moving electrode top surface and a second moving electrode bottom surface, the second moving electrode top surface and the second moving electrode bottom surface may be parallel to an upper surface of the mass element, a corresponding second fixing electrode has a second fixing electrode top surface and a second fixing electrode bottom surface, the second fixing electrode top surface and the second fixing electrode bottom surface may be parallel to the upper surface of the mass element, and the second moving electrode top surface may be farther away from the upper surface of the mass element compared with the second fixing electrode top surface.

In some embodiments, the first fixing electrode top surface has a same horizontal height as the second moving electrode top surface.

In some embodiments, the sensing element may further include: a first support component fixed on the substrate, wherein the mass element may be connected with the first support component through an elastic connecting unit, the first support component may be located at a center of the mass element, the elastic connecting unit extends along a first direction, a center line of the elastic connecting unit coincides with a center line of the mass element in the first direction, weights of two parts of the mass element on different sides of the elastic connection unit in a second direction are different, wherein the at least one fixing electrode may include: at least two first direction fixing electrodes; at least two second direction fixing electrodes extending along the first direction, wherein the at least two second direction fixing electrodes may be located at a center line of the mass element along the second direction and may be set symmetrically with respect to the first support component; and at least two third direction fixing electrodes arranged on two sides of the elastic connection unit, the at least one moving electrode may include: first direction moving electrodes, second direction moving electrodes, and third direction moving electrodes corresponding to the at least two first direction fixing electrodes, the at least two second direction fixing electrodes, and the at least two third direction fixing electrodes, respectively, forming at least two first direction detection capacitors, at least two second direction detection capacitors, and at least two third direction detection capacitors, respectively.

In some embodiments, the at least two first direction fixing electrodes extend along the second direction, the at least two first direction fixing electrodes may be distributed on two sides of a line on the substrate corresponding to the center line of the mass element along the second direction, and the at least two first direction fixing electrodes may be axisymmetric with respect to the center line of the mass element along the second direction or with respect to a center of the first support component.

In some embodiments, the at least two first direction fixing electrodes may be not on the center line of the mass element along the first direction.

In some embodiments, each first direction fixing electrode may include two first direction fixing electrode units arranged in parallel, a first direction moving electrode corresponding to the first direction fixing electrodes may include two first direction moving electrode units, the two first direction moving electrode units, and the two first direction fixing electrode units may form a first direction differential capacitance structure. Each second direction fixing electrode may include two second direction fixing electrode units arranged in parallel, a second direction moving electrode corresponding to the second direction fixing electrode includes two second direction moving electrode units, the two second direction moving electrode units, and the two second direction fixing electrode units may form a second direction differential capacitance structure.

In some embodiments, the at least two first direction fixing electrodes may be located at the center line of the mass element along the first direction.

In some embodiments, each first direction fixing electrode may include two first direction fixing electrode units arranged in parallel, a first direction moving electrode corresponding to the first direction fixing electrode includes two first direction moving electrode units, the two first direction moving electrode units, and the two first fixing electrode units form a first direction differential capacitance structure. Each second direction fixing electrode may include two second direction fixing electrode units arranged in parallel, a second direction moving electrode corresponding to the second direction fixing electrode may include two second direction moving electrode units, the two second direction moving electrode units, and the two second fixing electrode units may form a second direction differential capacitance structure, wherein a first direction fixing electrode unit on one side of at least one of the at least two first direction fixing electrodes may be electrically connected with another first direction fixing electrode unit on an opposite side of the other first direction fixing electrode that is symmetrical with the at least one first direction fixing electrode about the center line axis of the mass element along the second direction.

In some embodiments, the at least two third direction fixing electrodes may be lower electrodes of the at least two third direction detection capacitors, respectively, and the at least two third direction moving electrodes may be upper electrodes of the at least two third direction detection capacitors, respectively.

In some embodiments, one side of the mass element may be provided with one or more weight reducing holes or clump weights so that weights of two sides of the mass element may be different.

In some embodiments, the sensing elements may further include: a second support component fixed to the substrate, wherein the mass element may be connected with the substrate through the second support component. The at least one fixing electrode may include: a coupling component, wherein the coupling component surrounds the mass element, and a gap may be set between the mass element and the coupling component so as to form at least one detection capacitor.

In some embodiments, a material of the substrate includes silicon, and materials of the second support component, the mass element, and the coupling may include doped silicon.

In some embodiments, the sensing device may further include an integrated chip, wherein the integrated chip may be electrically connected with the second support component and the coupling component, respectively.

In some embodiments, the integrated chip may be located on an outer surface of the housing, the housing may be provided with a through-hole, and one or more conductive elements may pass through the through-hole and connect the integrated chip with the second support component and the coupling component.

In some embodiments, the mass element may include: a first mass element; and a second mass element. The sensing device may further include: a first fixing element, connected with the substrate and surrounding the first mass element, wherein the first fixing element may be connected with the first mass element through at least one first flexible component, and the second mass element may surround the first fixing element; and a second fixing element, connected with the substrate and surrounding the second mass element, wherein the second fixing element may be connected with the second mass element through at least one second flexible component. The at least one moving electrode may include: a plurality of first moving electrodes disposed on an inner side of the second mass element and extending inwards, wherein the plurality of first movable electrodes may be distributed along at least a first direction and a second direction; and a second moving electrode arranged at a bottom of the first mass element. The at least one fixing electrode may include: a plurality of first fixing electrodes arranged on a periphery of the first fixing element and extending outwards, wherein the plurality of first fixing electrodes may correspond to the plurality of first moving electrodes, and the plurality of first fixing electrodes and the plurality of first moving electrodes may be arranged at intervals to form a plurality of first direction detection capacitors and a plurality of second direction detection capacitors; and the second fixing electrode disposed on the substrate, wherein the second fixing electrode and the second moving electrode may form a third direction detection capacitor.

In some embodiments, a plurality of holes may be set on the first mass element and/or the second mass element.

In some embodiments, a contour of at least one of the first mass element, the second mass element, the first fixing element, or the second fixing element may be square.

In some embodiments, the at least one resonance system may include a first resonance system and the first resonance system may be a spring-mass-damper system.

In some embodiments, the first resonance system may be composed of a first medium, the first medium fills the cavity, and the acceleration sensor may be immersed in the first medium.

In some embodiments, the first medium is liquid, and the liquid may include at least one of silicone oil, glycerin, motor oil, lubricating oil, or hydraulic oil.

In some embodiments, the first resonance system may be at least one first elastic structure connected with the acceleration sensor, and the first elastic structure may include an elastic component and a mass unit.

In some embodiments, the at least one resonant system may include a second resonant system, and the second resonance system may be a combination of a spring-mass-damping system and a spring-damping system.

In some embodiments, the second resonance system may be composed of a first medium and a second medium, the first medium and the second medium may be filled in the cavity, and the acceleration sensor at least partially immersed in the first medium and/or the second medium.

In some embodiments, the first medium may be liquid, the second medium may be gas, and the gas may be distributed in the liquid in the form of one or more bubbles.

In some embodiments, a volume of the one or more bubbles may account for 30%-50% of a volume of the cavity.

In some embodiments, the one or more bubbles may be formed by at least one of air in the cavity, air sacs, or hydrophobic material.

In some embodiments, the first medium and the second medium may be immiscible liquids with different properties.

In some embodiments, the second resonant system may include at least one second elastic structure connected with the acceleration sensor, and the second elastic structure may include a first elastic structure and at least one lightweight elastic component.

Additional features of the present disclosure may be described in the following description. Through the study of the following description and corresponding drawings or the understanding of the production or operation of the embodiment, some additional features of the present disclosure are obvious to those skilled in the art. The features of the present disclosure can be realized and obtained by practice or using various aspects of the methods, tools and combinations described in the following embodiments.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein:

FIG. 7A is a flow diagram illustrating a preparation method of an acceleration sensing device including a sensing element 600 according to some embodiments of the present disclosure;

DETAILED DESCRIPTION

Figure 1:
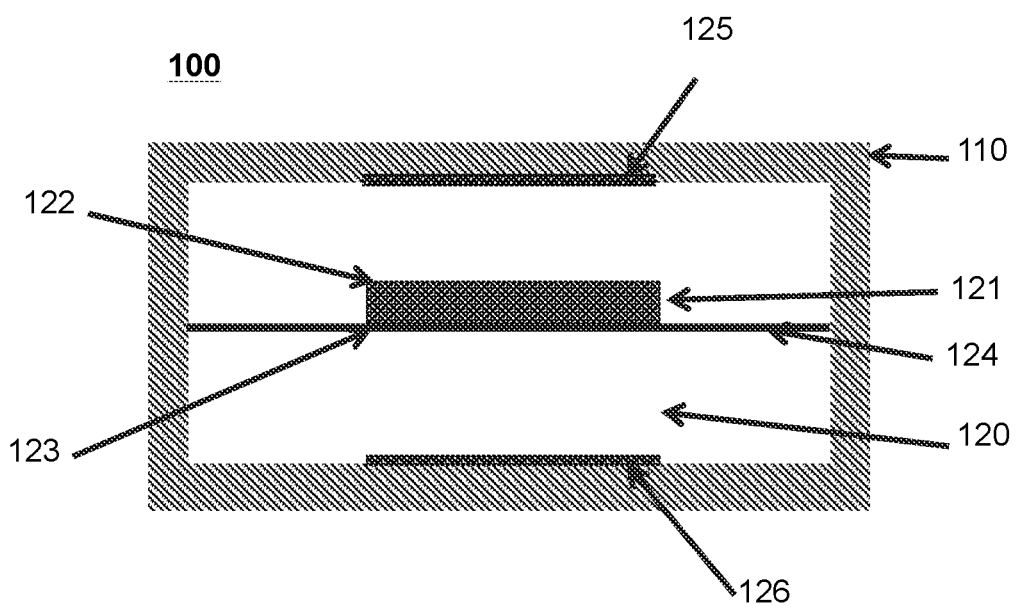
FIG. 1 is a schematic diagram illustrating an exemplary acceleration sensing device 100 according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

A flowchart is used in the present disclosure to illustrate the operation performed by the system according to the embodiment of the present disclosure. It should be understood that the preceding or subsequent operations are not necessarily performed accurately in sequence. Instead, the steps may be processed in reverse order or simultaneously. At the same time, other operations may add to these procedures, or remove one or more operations from these procedures.

The embodiments of the present disclosure provide an acceleration sensing device (hereinafter referred to as a sensing device). The sensing device may include an acceleration sensing device and at least one resonant system coupled to the acceleration sensing device. The sensing device may include a capacitive acceleration sensing device, i.e., a variable capacitance acceleration sensing device. The acceleration sensing device may have a first resonant frequency, the first resonant frequency may be related to attributes of the acceleration sensing device (e.g., shape, size, structure, material, etc.). The at least one resonant system may be formed by a solid structure, a liquid, a gas, or any combination thereof, that is coupled to the acceleration sensing device (e.g., a moving electrode). For example, a cavity of the acceleration sensing device may be filled with liquid. The liquid and gas (if any) in the cavity may affect the response of the acceleration sensing device to an external acceleration signal, forming the at least one resonance system. As another example, the acceleration sensing device (e.g., the moving electrode) may be connected with a vibration assembly consisting of an elastic component and a mass element (e.g., a mass block), the vibration component may affect the response of the acceleration sensing device to the external acceleration signal, forming the at least one resonant system. The at least one resonance system may additionally provide at least one second resonance frequency for the sensing device. The at least one second resonant frequency may be different from the first resonant frequency. By adjusting the acceleration sensing device (e.g., a housing and/or a sensing element) and/or parameters of the substance/structure forming the at least one resonance system (e.g., a liquid viscosity, a bubble size, etc.), a relationship between the first resonance frequency and the at least one second resonance frequency may be changed so as to achieve, for example, adjusting a value of Q of the sensing device, improving a sensitivity and reliability of the sensing device, or making an output gain of the sensing device more stable in a required frequency band (e.g., a medium and low frequency).

FIG. 1 is a schematic diagram illustrating an exemplary acceleration sensing device 100 according to some embodiments of the present disclosure.

The acceleration sensing device 100 may be a capacitive acceleration sensing device, a piezoelectric acceleration sensing device, a piezoresistive acceleration sensing device, or the like. As an example only, the present disclosure may take the capacitive acceleration sensing device as an example to describe the acceleration sensing device 100, which is not a limitation of the acceleration sensing device 100. The acceleration sensing device may include a housing and an acceleration sensing element. The acceleration sensing element may be located within a cavity formed by the housing. The acceleration sensing element may include at least one electrode pair. The each electrode pair may include a fixing electrode and a moving electrode, thereby forming a capacitor. In response to the external acceleration signal, the moving electrode may be displaced relative to the fixing electrode, so that a distance and/or positive area between the fixing electrode and the moving electrode may be changed, thereby changing capacitance of the capacitor. The change in the capacitance may cause a change in the amount of electricity stored in the capacitor, thereby producing a measurable current signal.

Exemplarily, as shown in FIG. 1, the acceleration sensing device 100 may include a housing 110 and a sensing element 120. The housing 110 may be a regular or irregular three-dimensional structure with a cavity (i.e., a hollow portion) inside, for example, the housing 110 may be a hollow frame structure, including but not limited to regular shapes such as cubes, spheres, cylinders, regular polyhedrons, etc., or any irregular shapes. The housing 110 may be configured to accommodate the sensing element 120. The housing 110 may adopt a metal (e.g., a stainless steel, a copper, etc.), a plastic (e.g., a polyethylene (PE), a polypropylene (PP), a polyvinyl chloride (PVC), a polystyrene (PS), an acrylonitrile butadiene styrene copolymer (ABS), etc.), an inorganic non-metallic material (e.g., a monocrystalline silicon, a doped silicon, etc.), a composite material (e.g., a metal matrix composite or a non-metal matrix composite), etc. In some embodiments, the material of the housing 110 may be silicon. The sensing element 120 may be located within a cavity of the housing 110 or at least partially suspended from the cavity of the housing 110. The sensing element 120 may include a mass element 121 (e.g., a mass block). The mass element 121 may be in the shape of a square, a cuboid, a cylinder, a ring, or the like. There is no specific limitation in the specification of the present disclosure. The mass element 121 may be provided on an elastic film 124. The elastic film 124 may be a high molecular elastic film such as a polytetrafluoroethylene (PTFE) film, a polydimethylsiloxane (PDMS) film, a composite film (for example, a plastic film (such as a film formed by compounding polyethylene (PE), a polypropylene (PP), a polystyrene (PS), a polyvinyl chloride (PVC), and a polyester (PET), a cellophane, a paper, and/or a metal foil AL), etc.).

The mass element 121 may include an upper surface and a lower surface. The upper surface and the lower surface may be respectively provided with an electrode 122 and an electrode 123. For example, an upper surface and a lower surface of the mass element 121 may be respectively coated with conductive layers to form the electrode 122 and the electrode 123. As another example, the upper surface and the lower surface of the mass element 121 may be respectively connected with conductive layers to form the electrode 122 and the electrode 123. The exemplary conductive layer may include a metal, an alloy material, a metal oxide material, a graphene, a silicon, or the like, or any combination thereof. In some embodiments, the metal and the alloy material may include a nickel, an iron, a lead, a platinum, a titanium, a copper, a molybdenum, a zinc, or any combination thereof. In some embodiments, the alloy material may include a copper zinc alloy, a copper tin alloy, a copper nickel silicon alloy, a copper chromium alloy, a copper silver alloy, or any combination thereof. In some embodiments, the metal oxide material may include RuO2, MnO2, PbO2, NiO, etc., or any combination thereof. The "connection" mentioned in the present disclosure may be understood as a connection between different parts of the same structure, or after preparing different parts or structures, each independent part or structure may be fixed and connected by welding, riveting, clamping, bolt connection, adhesive bonding, etc., or during the preparation process, a first component or structure may be deposited on a second component or structure by a physical deposition (e.g., a physical vapor deposition) or a chemical deposition (e.g., a chemical vapor deposition).

Accordingly, an upper inner wall and a lower inner wall of the housing 110 may be respectively provided with an electrode 125 and an electrode 126. The electrode 125 and the electrode 126 may be disposed opposite the electrode 122 and the electrode 123, respectively. In some embodiments, the electrode 125 and the electrode 126 may be the same or similar in shape and/or size to the electrode 122 and the electrode 123. The arrangement of the electrode 125 and the electrode 126 may be the same or different from the arrangement of the electrode 122 and the electrode 123. For example, a conductive layer may be formed on the upper inner wall and lower inner wall of the housing 110 by physical growth to form the electrode 125 and the electrode 126. The materials of the electrode 125 and the electrode 126 may be the same or different from electrodes 122 and 123. For example, the electrode 122, the electrode 123, the electrode 125, and the electrode 126 may both be made of a certain metal material. The electrode 125 and the electrode 122 may form two poles of the first capacitor, and the electrode 126 and the electrode 123 may form two poles of the second capacitor.

When an acceleration signal (e.g., an acceleration signal in a vertical direction in the figure) exists externally, the mass element 121 provided on the elastic film 124 may vibrate in a direction of the acceleration signal. For example, when the mass element 121 moves upward, a distance between the electrode 125 and the electrode 122 constituting the first capacitor may decrease and the capacitance may increase; a distance between the electrode 126 and the electrode 123 constituting the second capacitor may become larger and the capacitance may become smaller, thereby forming a differential capacitance output signal. At the same time, the greater amplitude of the acceleration signal (i.e., the greater the acceleration), the greater a motion displacement of the mass element 121, the smaller the distance between the electrode 125 and the electrode 122 of the first capacitor, and the greater the capacitance; the greater a distance between electrode 126 and electrode 123 of the second capacitor, the smaller the capacitance, and the greater amplitude of the differential capacitance output signal. It may be seen that the output signal of the differential capacitor is proportional to the size of the acceleration signal. Thus, the magnitude of the external acceleration signal may be characterized by the differential capacitance output signal generated by the acceleration sensing device 100.

It should be noted that the above description of the acceleration sensing device 100 is only for the convenience of description and cannot limit the present disclosure to the scope of the embodiments. It may be understood that for those skilled in the art, after understanding the principle of the system, it is possible to arbitrarily combine various devices/modules or form a subsystem to connect with other devices/modules without departing from this principle. For example, the mass element 121 and the elastic film 124 in the sensing element 120 may be replaced by a vibrating rod (e.g., a cantilever beam). The vibrating rod may be a strip-shaped structure or a plate-shaped structure, one end of the vibrating rod may be connected with the upper inner wall and lower inner wall or side walls of the housing 110, and another end may be not connected or contacted with the housing 110, so that another end may be suspended in the cavity of the housing 110. In some embodiments, the vibrating rod may be a multilayer structure. The multilayer structure may include at least one elastic layer and at least one damping layer. The damping layer may refer to a structure with damping characteristics. The upper surface and lower surface of the vibrating rod may be respectively provided with the electrode 122 and the electrode 123. When there exists an external acceleration, the housing 110 may drive the vibrating rod to move. Due to different properties of the vibrating rod and the housing 110, the vibrating rod and the housing 110 may not maintain a completely consistent movement, resulting in a relative movement, which may change a distance between the vibrating rod and the upper inner wall and lower inner wall of the housing 110, change a capacitance of the first capacitor and the second capacitor, and generate the differential capacitance output signal.

Figure 2A:
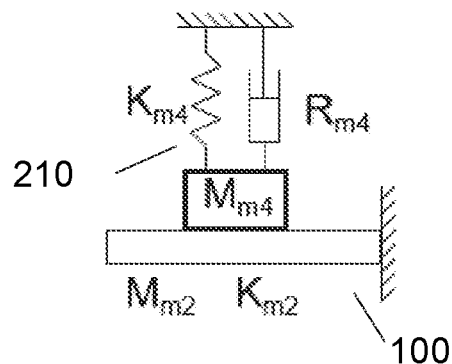
FIG. 2A is a schematic diagram illustrating mechanical equivalence of an exemplary sensing device 200 according to some embodiments of the present disclosure.

FIG. 2A is a schematic diagram illustrating mechanical equivalence of an exemplary sensing device 200 according to some embodiments of the present disclosure.

The sensing device 200 may include an acceleration sensing device 100 and a first resonance system 210. In some embodiments, the sensing device 200 may be considered as adding the first resonant system 210 to the acceleration sensing device 100. For example, in this embodiment, the first resonant system 210 may be a spring (km4)-mass (MM4)-damping (RM4) system. As an example only, taking a cantilever acceleration sensing device as an example, the first resonant system 210 may be coupled between the housing 110 and the sensing element 120. Due to the action of the first resonance system 210, when the housing 110 receives an external vibration signal, the external vibration signal may be transmitted to the sensing element 120 through a region of the housing connected with the sensing element 120 and a region of the housing connected with the first resonance system 210, respectively. Therefore, a mechanical response of the sensing device 200 may be different from a mechanical response of the acceleration sensing device 100. Accordingly, an electrical, an acoustic, and/or a thermal response of the sensing device 200 may be different from an electrical, an acoustic, and/or a thermal response of the acceleration sensing device 100.

In some embodiments, the first resonant system 210 may be formed of an elastic structure connected with the sensing element 120 and having a certain mass (e.g., an elastic rod, an elastic sheet, an elastic block, an elastic mesh support, a composite structure of an elastic connection structure (e.g., a light spring), and a mass element (e.g., a mass block), etc.). For example, the first resonant system 210 may include at least one elastic rod. Two ends of the at least one elastic rod may be fixedly connected with the housing 110 and the sensing element 120 respectively. As another example, the first resonant system 210 may be a combination of at least one group of elastic connecting structures (e.g., a light spring, a light elastic rod, etc.) and the mass element. The two ends of each elastic connecting structure in the at least one group of elastic structures may be respectively connected with the housing 110 and the mass element. The mass element may be fixedly connected or placed on the sensing element 120. In some embodiments, the first resonant system 210 may also be manufactured integrally with the sensing element 120. For example, the first resonant system 210 in the form of the elastic rod may be integrally molded with the sensing element 120 by injection a molding or physical growth.

Figure 2B:
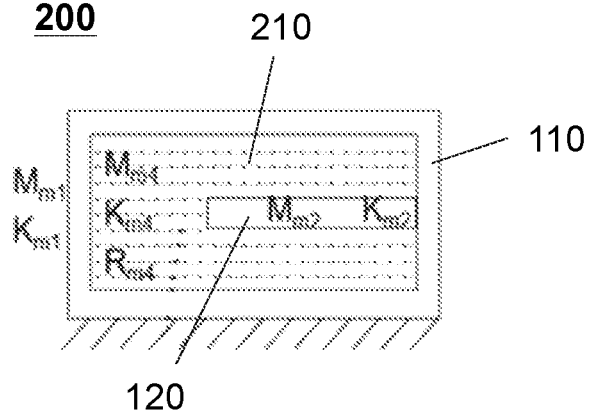
FIG. 2B is a schematic diagram illustrating an exemplary sensing device 200 filled with liquid inside according to some embodiments of the present disclosure.

In some embodiments, the first resonant system 210 may be formed by filling a cavity of the acceleration sensing device 100 with liquid. For example, the liquid may fill a cavity in the housing 110, and the sensing element 120 may be wrapped in the liquid. FIG. 2B is a schematic diagram illustrating an exemplary sensing device 200 filled with liquid inside according to some embodiments of the present disclosure. The liquid may be liquid with a safety performance (such as non-flammable and non-explosive) and a stability performance (such as non-volatile, non-high temperature deterioration, etc.). For example, the liquid may include oil (e.g., silicone oil, glycerin, castor oil, engine oil, lubricating oil, hydraulic oil (e.g., aviation hydraulic oil), water (including pure water, aqueous solutions of other inorganic or organic substances, etc. (e.g., brine)), oil-water emulsion, or other liquid meeting performance requirements of the liquid, or a combination of one or more of thereof.

A density and kinematic viscosity of the liquid may within a certain density range and a certain kinematic viscosity range respectively. In some embodiments, a range of the density and a range of the kinematic viscosity may be set by a user or determined based on the performance of the sensing device 200 (e.g., a sensitivity, a bottom noise level, a resonance peak to peak, a frequency range where the resonance peak is located, a peak to valley value, and/or a quality factor Q, etc.). In some embodiments, the liquid may be silicone oil. The silicone oil has characteristics of high temperature resistance, non-volatilization, wide viscosity range, etc., the density may be about 0.94 kg/m$^3$, and the optional kinematic viscosity range may be wide (e.g., 0.1-1000 Stokes (cst)).

In some embodiments, a frequency response curve of the sensing device 200 may include at least two resonance peaks. The at least two resonance peaks may include a first resonance peak and a second resonance peak. The first resonance peak may be a corresponding resonance peak of the acceleration sensing device 100, and a corresponding resonant frequency may be mainly related to properties of the sensing element 120 (e.g., a shape, a material, a structure, etc.). The second resonance peak may be a resonance peak generated by an additional system of the acceleration sensing device 100 (for the sensing device 200, the additional system may be the first resonant system 210), and a corresponding resonance frequency may be mainly related to one or more mechanical parameters of the additional system (e.g., an equivalent spring (Km4), a mass (Mm4), and damping (Rm4) of the resonant system, etc.). In order to make the sensing device 200 applicable to different scenarios, different relationships may be satisfied between the resonant frequency corresponding to the first resonance peak (also be referred to as the first resonant frequency) and the resonant frequency corresponding to the second resonance peak (also be referred to as the second resonant frequency). For example, the second resonant frequency may be less than, equal to, or greater than the first resonant frequency.

For the purpose of explanation only, due to the existence of the second resonance peak corresponding to the first resonant system 210, the frequency response curve of the sensing device 200 may be improved in a specific frequency band (e.g., a medium and low frequency band, a medium and high frequency band, etc.), so that a sensitivity may be improved compared with the acceleration sensing device 100. In addition, since the first resonant system 210 acts on the sensing element 120, vibration characteristics of the acceleration sensing device 100 may be changed compared with the vibration characteristics of the acceleration sensing device 100 without the first resonant system 210. Specifically, the first resonant system 210 acts on the sensing element 120, which may affect the mass, the stiffness, the damping of the acceleration sensing device 100. The effect may be equivalent to making a value of Q of the first resonance peak of the sensing device 200 change (e.g., the value of Q may decrease) relative to a value of Q of the acceleration sensing device 100 not connected with the first resonant system 210. More information about the frequency response curve of the sensing device 200, the first resonance peak, and the second resonance peak may refer to other parts of the specification, such as FIG. 3A, FIG. 3B, and the related descriptions.

At the same time, the first resonance system 210 may reduce external impacts received by the sensing element to protect the sensing element. For example, if the first resonant system 210 is the cavity of the acceleration sensing device 100 filled with the liquid, the first resonant system 210 may improve an impact resistance reliability of the sensing device 200 when the sensing device 200 receives an external impact load because the liquid has a viscous effect and an own stiffness of the liquid is much smaller than stiffness of the device material. Specifically, due to the viscosity of the liquid, part of the impact energy may be absorbed and consumed, which may greatly reduce the impact load on the sensing element 120. Therefore, the sensing element 120 may be protected and a working life of the sensing element 120 may be extended.

In addition, due to the stress in a machining process of the acceleration sensing device 100, especially a cantilever beam device, there may be often a device deformation, such as bending (along length and width), a torsion, etc. However, a cantilever beam structure may be commonly used in the acceleration sensing device. Since the housing of the sensing device 200 may be filled with the liquid, a gravity, a surface tension, and a viscosity of the liquid may be used to correct a deformation of the acceleration sensing device, making the deformation of the acceleration sensing device smaller, the output more stable, and closer to an actual design effect.

Figure 2C:
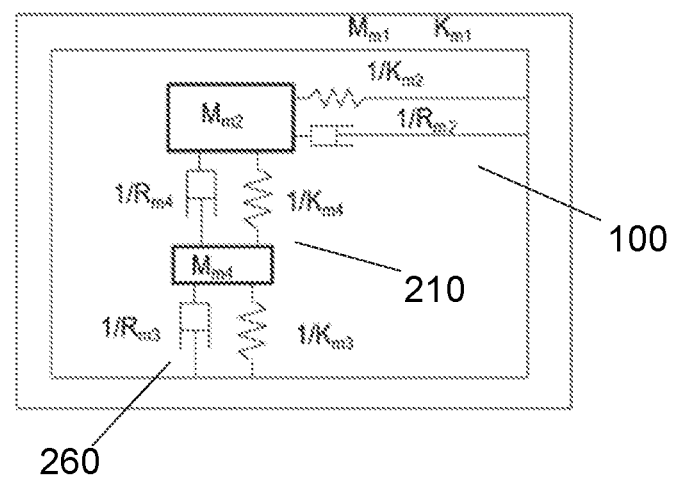
FIG. 2C is a schematic diagram illustrating mechanical equivalence of an exemplary sensing device 250 according to some embodiments of the present disclosure.

FIG. 2C is a schematic diagram illustrating mechanical equivalence of an exemplary sensing device 250 according to some embodiments of the present disclosure.

The sensing device 250 may include an acceleration sensing device 100 and a second resonance system 260. In some embodiments, the sensing device 250 may be considered as adjusting the first resonant system 210 to form a second resonant system 260 based on the sensing device 200. For example, in this embodiment, the second resonant system 260 may add a spring (Km3) and damping (Rm3) compared to the first resonant system 210. The second resonance system 260 may be arranged between the housing 110 and the sensing element 120. For example, as shown in FIG. 2C, a spring (Km3)-damping (Rm3) of the second resonant system 260 may be connected in series with a spring (Km4)-mass (Mm4)-damping (Rm4) of the first resonant system 210 and act indirectly on the sensing element 120. As another example, the spring (Km3) and damping (Rm3) of the second resonant system 260 may be connected in series with the spring (Km4)-mass (Mm4)-damping (Rm4) of the first resonant system 210 and act directly on the sensing element 120. Due to a function of the second resonance system 260, when the housing 110 receives an external vibration signal, the external vibration signal may be transmitted to the sensing element 120 through a region of the housing connected with the sensing element 120 and a region of the housing connected with the second resonance system through the second resonance system 260. Therefore, a mechanical response of the sensing device 250 may be different from a mechanical response of both the sensing device 200 and the acceleration sensing device 100. Accordingly, the electrical, the acoustic, and/or the thermal response of the sensing device 250 may change compared to the electrical, the acoustic, and/or the thermal response of the sensing device 200 and the acceleration sensing 100. At the same time, due to a newly introduced spring (Km3) and damping (Rm3) of the second resonance system 260, vibration characteristics of the sensing device 250 (e.g., a stiffness-damping, etc.) may be different from vibration characteristics of the sensing device 200 and the acceleration sensing device 100.

In some embodiments, the second resonant system 260 may be an elastic structure connected with the sensing element 120. The elastic structure may include an elastic rod, an elastic rope, an elastic sheet, a spring, an elastic mesh support, an elastic block, or the like, which are connected in multiple stages. For example, the second resonant system 260 may include at least one elastic rod and/or spring with a small mass and an elastic rod and/or spring with a large mass. At this time, the elastic rod and/or spring with a relatively big mass may be equivalent to the spring (km4)-mass (Mm4)-damping (Rm4), and the elastic rod and/or a spring with a relatively small mass may be equivalent to the spring (Km3) and damping (Rm3). Two ends of the elastic rod and/or the spring may be fixedly connected with the housing 110 and the sensing element 120 respectively. In some embodiments, the elastic rod with a relatively small mass (e.g., an elastic rod made of low-density material) and an elastic rod with a relatively big mass (e.g., an elastic rod made of high-density material) in the second resonance system 260 may be integrally manufactured by injection the molding and physical growth. In some embodiments, a multiple stages elastic structure of the second resonant system 260 may also be integrally manufactured with the sensing element 120.

In some embodiments, the second resonant system 260 may be formed by the cavity of the acceleration sensing device 100 filled with different media. For example, the cavity of the acceleration sensing device 100 may be partially filled with the liquid to form the second resonant system 260 coexists with the liquid and bubbles. The bubbles may be bubbles formed by air not discharged from the cavity, bubbles formed by air bags (e.g., film wrapped gas such as polyester film, nylon film, plastic film, composite film, etc.), and/or bubbles formed by coating a hydrophobic coating on the sensing element. The gas in the bubble may be air, oxygen, nitrogen, inert gas, etc. At this time, the liquid in the cavity may be equivalent to the spring (Km4)-mass (Mm4)-damping (Rm4), and the bubbles may be equivalent to the spring (Km3) and damping (Rm3). As another example, the cavity of the acceleration sensing device 100 may be filled with liquids of different densities and immiscible with each other to form a second resonant system 260. In some embodiments, the medium filled into the cavity of the acceleration sensing device 100 may be set by the user or determined based on the performance of the sensing device 250 (e.g., a sensitivity, a bottom noise level, a resonance peak, a frequency range of the resonance peaks, a peak valley value, and/or the value of the quality factor Q).

Figure 2D:
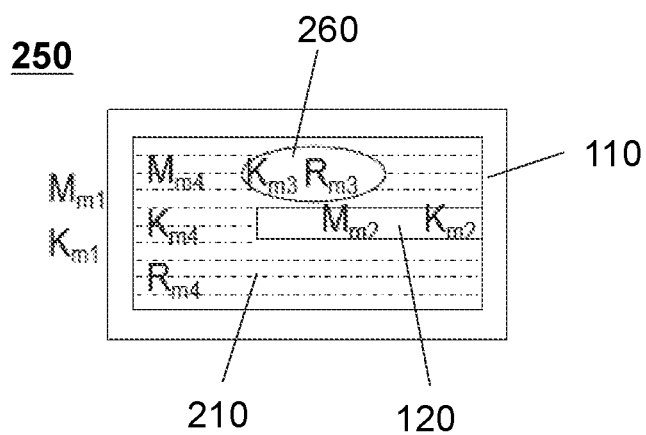
FIG. 2D is a schematic diagram illustrating an exemplary sensing device 250 filled with liquid and bubbles inside according to some embodiments of the present disclosure.

FIG. 2D is a schematic diagram illustrating an exemplary sensing device 250 filled with liquid and bubbles inside according to some embodiments of the present disclosure. In the sensing device 250, the cavity of the housing 110 may be filled with the liquid and bubbles. The liquid in the sensing device 250 may be same or different type of liquid as the sensing device 200. For example, both the sensing device 250 and the sensing device 200 may be filled with the silicone oil with a same kinematic viscosity. As another example, the sensing device 250 and the sensing device 200 may be filled with the different types of liquids or the same types of liquids with different kinematic viscosities (e.g., silicone oil with kinematic viscosities of 0.65 cst and 200 cst, respectively). The liquid and bubbles may be injected into or formed in the cavity of the housing 110 in a specific manner.

In some embodiments, the frequency response curve of the sensing device 250 may include at least two resonance peaks. The at least two resonance peaks may include a third resonance peak and a fourth resonance peak. The third resonance peak may be a corresponding resonance peak of the acceleration sensing device 100, and the fourth resonance peak may be a resonance peak generated by the additional system of the acceleration sensing device 100 (for the sensing device 250, the additional system may be the second resonance system 260).

In some embodiments, different relationships may be satisfied between a third resonant frequency (a resonant frequency corresponding to the third resonance peak) and a fourth resonant frequency (a resonant frequency corresponding to the fourth resonance peak) of the sensing device 250. For example, when the second resonance system 260 is formed by the liquid and bubbles, the sensing device 250 may have a resonance frequency located in a low frequency band or a medium and low frequency band and a medium and high frequency band due to a large compressible amplitude of the bubbles (compared with the case of a pure liquid) and a small stiffness. For example, the fourth resonant frequency may be a low frequency, a medium and low frequency, or a medium and high frequency, and the third resonant frequency may be greater than the fourth resonant frequency, for example, the third resonant frequency may be a higher frequency band. As another example, the fourth resonant frequencies may be all medium and low frequencies, wherein the low frequency, the medium and low frequency, and the medium and high frequency may refer to frequencies whose frequency values are within a certain range. For example, the frequency range of low frequency, medium and low frequency, or medium and high frequency (within a frequency band less than 7000 Hz, 5000 Hz, 3000 Hz, 1000 Hz, 500 Hz, 100 Hz, 50 Hz), and a corresponding frequency range of the higher frequency band may be more than 2000 Hz, more than 5000 Hz, more than 8000 Hz, etc. The third resonant frequency may be a higher frequency than the fourth resonant frequency. Optionally, a difference between the third resonant frequency and the fourth resonant frequency may be 100-6000 Hz. When the sensing device 250 has a resonant frequency in the low or middle and low and frequency range, a sensitivity of the low frequency may be higher than a sensitivity of the acceleration sensing device 100; when the sensing device 250 further has a resonant frequency in the high frequency or the medium and high frequency, the frequency response curve may be also flattering in the medium and low frequency range, which may be more conducive to the acquisition of effective signals in this frequency band.

In addition, since the second resonance system 260 acts on the sensing element 120, the vibration characteristics of the acceleration sensing device 100 may be changed compared with the vibration characteristics of the acceleration sensing device 100 without the second resonance system 260. Specifically, the second resonance system 260 may act on the sensing element 120, which may affect the stiffness and/or the damping of the acceleration sensing device 100, and the effect may be equivalent to making a value of Q of the third resonance peak of the sensing device 250 change relative to the acceleration sensing device 100 not connected with the second resonance system 260 (e.g., the value of Q may decrease). More information about the frequency response curve of the sensing device 250, the third resonance peak, and the fourth resonance peak may refer to other parts of the specification, such as FIG. 3A, FIG. 3B, and the related descriptions.

At the same time, the second resonance system 260 may reduce external impacts received by the sensing element to protect the sensing element. For example, if the liquid and bubbles are introduced into the cavity of the housing 110, an impact resistance reliability of the sensing device 250 may be improved when receiving the external impact load. Specifically, due to the viscosity of the liquid and the large compressibility of the gas, part of the impact energy may be absorbed and consumed, which may greatly reduce the impact load on the sensing element 120. Therefore, the sensing element 120 may be protected and a working life may be extended.

In addition, the acceleration sensing device 100 may be often deformed due to the stress during processing. By injecting the liquid and bubbles into the cavity, the gravity, the surface tension, and the viscosity of the liquid may be used to correct the deformation of the acceleration sensing device, so that the deformation of the sensing device 250 may be smaller, the output may be more stable and closer to the actual design effect.

It should be noted that the above description of the sensing devices 200 and 250 is only an exemplary description, and the present disclosure cannot be limited to the scope of the embodiments. It may be understood that after understanding the principle of the system, those skilled in the art may arbitrarily combine the structure and modules, or form a subsystem to connect with other modules without departing from the principle. For example, the sensing element may be the mass element 121 supported by the elastic film 124 shown in FIG. 1, and the mechanical equivalence, the frequency response curve, or the like, may be the same or similar.

Figure 3A:
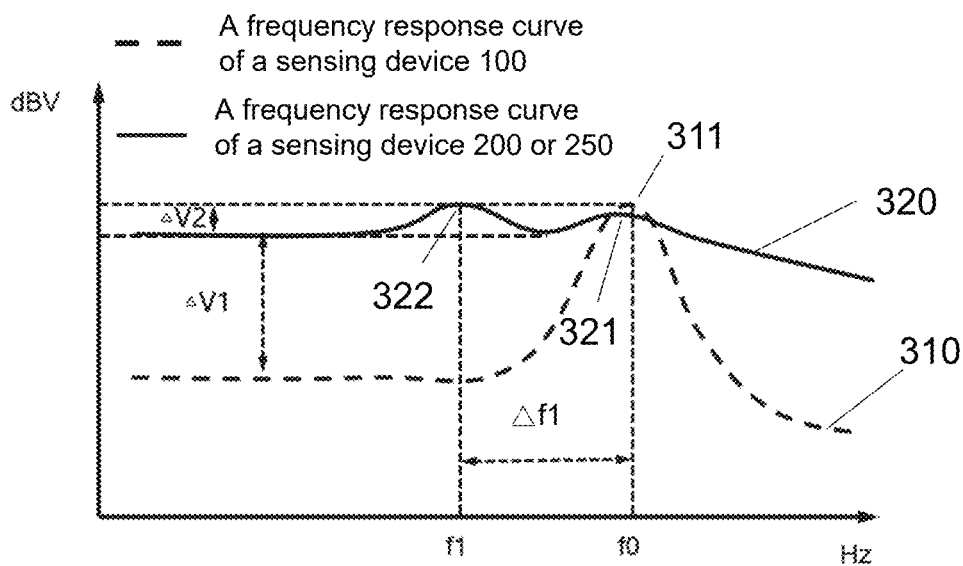
FIG. 3A is a schematic diagram illustrating a frequency response curve of an exemplary sensing device 200 or 250 according to some embodiments of the present disclosure.

FIG. 3A is a schematic diagram illustrating a frequency response curve of an exemplary sensing device 200 or 250 according to some embodiments of the present disclosure.

For example, as shown in FIG. 3A, a frequency response curve 310 represented by the dotted line may be a frequency response curve of the acceleration sensing device 100, and a frequency response curve 320 represented by the solid line may be a frequency response curve of the sensing device 200 or the sensing device 250. The abscissa may represent the frequency, which the unit is Hz, and the ordinate may represent the sensitivity, which the unit is dBV. 1 dBV=20lg (S), the unit of a sensitivity V is V/g. The frequency response curve 310 may include a resonance peak 311 corresponding to a resonant frequency of the acceleration sensing device 100. The frequency response curve 320 may include a first (or a third) resonance peak 321 and a second (or a fourth) resonance peak 322. For the sensing device 200, a frequency corresponding to the first resonance peak 321 may be the first resonance frequency, the second resonance peak 322 may be formed by the action of the first resonance system 210, and a corresponding frequency may be the second resonance frequency; for the sensing device 250, a frequency corresponding to the third resonance peak 321 may be the third resonance frequency, the fourth resonance peak 322 may be formed by the action of the second resonance system 260, and a frequency corresponding to the fourth resonance peak 322 may be the fourth resonance frequency.

It should be noted that the second (or the fourth) resonance peak 322 shown in the figure may be on the left side of the first (or the third) resonance peak 321, i.e., the frequency corresponding to the second (or the fourth) resonance peak 322 may be less than the frequency corresponding to the first (or the third) resonance peak. In some embodiments, by changing mechanical parameters of the sensing element or the first (or the second) resonant system, the frequency corresponding to the second (or the fourth) resonance peak 322 may be greater than the frequency corresponding to the first (or the third) resonance peak 321, i.e., the second (or the fourth) resonance peak 322 may be on the right side of the first (or the third) resonance peak 321.

For example, for the sensing device 200 filled with liquid inside, the second (or the fourth) resonance peak 322 may be on the left or right side of the first (or the third) resonance peak 321, and the position of the second resonance peak 322 may be related to properties of the filled liquid (e.g., a density, a kinematic viscosity, a volume, etc.). For example, if the density of the liquid becomes smaller or the kinematic viscosity becomes larger, a resonance peak may shift to a high frequency.

In some embodiments, a frequency corresponding to the resonance peak 311 may be in the range of 10 Hz-12000 Hz. In some embodiments, the frequency corresponding to the resonance peak 311 may be in the range of 10 Hz-10000 Hz. In some embodiments, the frequency corresponding to the resonance peak 311 may be in the range of 50 Hz-10000 Hz. In some embodiments, the frequency corresponding to the resonance peak 311 may be in the range of 100 Hz-7000 Hz. In some embodiments, the frequency corresponding to the resonance peak 311 may be in the range of 1500 Hz-5000 Hz. In some embodiments, the frequency corresponding to the resonance peak 311 may be in the range of 200 Hz-5000 Hz. In some embodiments, the frequency corresponding to the resonance peak 311 may be in the range of 200 Hz-4000 Hz. In some embodiments, the frequency corresponding to the resonance peak 311 may be in the range of 300 Hz-4000 Hz.

In some embodiments, the frequency corresponding to the first (or the third) resonance peak 321 may be in the range of 10 Hz-12000 Hz. In some embodiments, the frequency corresponding to the first (or the third) resonance peak 321 may be in the range of 50 Hz-10000 Hz. In some embodiments, the frequency corresponding to the first (or THE third) resonance peak 321 may be in the range of 100 Hz-10000 Hz. In some embodiments, the frequency corresponding to the first (or the third) resonance peak 321 may be in the range of 150 Hz-7000 Hz. In some embodiments, the frequency corresponding to the first (or the third) resonance peak 321 may be in the range of 150 Hz-5000 Hz. In some embodiments, the frequency corresponding to the first (or the third) resonance peak 321 may be in the range of 200 Hz-5000 Hz. In some embodiments, the frequency corresponding to the first (or the third) resonance peak 321 may be in the range of 200 Hz-4000 Hz. In some embodiments, the frequency corresponding to the first (or the third) resonance peak 321 may be in the range of 300 Hz-4000 Hz.

In some embodiments, the resonant frequency (the first resonant frequency or the third resonant frequency) corresponding to the first (or the third) resonance peak 321 may be different from the resonant frequency corresponding to the resonance peak 311. For example, for the sensing device 200 filled with liquid in the cavity of the housing 110, as the first resonance system 210, the liquid may be used as the first resonant system 210, since the liquid is incompressible, a stiffness of the system may increase, so the first frequency corresponding to the first resonance peak 321 may become larger than the resonance frequency corresponding to the resonance peak 311, i.e., the first resonance peak 321 may move to a right relative to the resonance peak 311.

In some embodiments, the frequency corresponding to the second (or the fourth) resonance peak 322 may be in the range of 1 Hz-12000 Hz. In some embodiments, the frequency corresponding to the second (or the fourth) resonance peak 322 may be in the range of 1 Hz-10000 Hz. In some embodiments, the frequency corresponding to the second (or the fourth) resonance peak 322 may be in the range of 1 Hz-6000 Hz. In some embodiments, the frequency corresponding to the second (or the fourth) resonance peak 322 may be in the range of 10 Hz-5000 Hz. In some embodiments, the frequency corresponding to the second (or fourth) resonance peak 322 may be in the range of 10 Hz-5000 Hz. In some embodiments, the frequency corresponding to the second (or fourth) resonance peak 322 may be in the range of 50 Hz-5000 Hz. In some embodiments, the frequency corresponding to the second (or the fourth) resonance peak 322 may be in the range of 50 Hz-3000 Hz. In some embodiments, the frequency corresponding to the second (or the fourth) resonance peak 322 may be in the range of 50 Hz-2000 Hz. In some embodiments, the frequency corresponding to the second (or the fourth) resonance peak 322 may be in the range of 100 Hz-2000 Hz.

In some embodiments, the fourth resonant frequency may be lower than the second resonant frequency. For the sensing device 200 filled with the liquid in the cavity of the housing 110, the liquid may be used as the first resonance system 210, relatively speaking, in the sensing device 250 filled with the liquid and bubbles in the cavity of the housing 110, the liquid and bubbles may be used as a second resonance system 260, respectively, and the combined overall stiffness may be lower than the stiffness of the liquid, so the fourth resonance frequency may be lower than the second resonance frequency.

In some embodiments, by adjusting the structure and material of the sensing element and one or more mechanical parameters in the first (or the second) resonant system (e.g., the types of filling liquid, bubbles size, etc.), the two resonance peaks 321 and 322 on the frequency response curve 320 may be flattened, to improve an output mass of the sensing device 200 or the sensing device 250. In some embodiments, a sensitivity difference between a trough between the resonance peak 321 and the resonance peak 322 and a peak of a relatively high peak in the resonance peak 321 and the resonance peak 322 may be not more than 30 dBV, and a ratio of a sensitivity difference to the peak of the relatively high peak may be not more than 0.2. In some embodiments, a sensitivity difference between the trough between the resonance peak 321 and the resonance peak 322 and the peak of the relatively high peak in the resonance peak 321 and the resonance peak 322 may be not more than 20 dBV, and a ratio of the sensitivity difference to the peak of the relatively high peak may be not more than 0.15. In some embodiments, a sensitivity difference between the trough between the resonance peak 321 and the resonance peak 322 and the peak of the relatively high peak in the resonance peak 321 and the resonance peak 322 may be not more than 15 dBV, and the ratio of the sensitivity difference to the peak of the relatively high peak may be not more than 0.12. In some embodiments, the sensitivity difference between the trough between the resonance peak 321 and the resonance peak 322 and the peak of the higher peak in the resonance peak 321 and the resonance peak 322 may be not more than 10 dBV, and the ratio of the sensitivity difference to the peak of the higher peak may be not more than 0.1. In some embodiments, the sensitivity difference between the trough between the resonance peak 321 and the resonance peak 322 and the peak of the higher peak in the resonance peak 321 and the resonance peak 322 may be not more than 8 dBV, and the ratio of the sensitivity difference to the peak of the higher peak may be not more than 0.08. In some embodiments, the sensitivity difference between the trough between the resonance peak 321 and the resonance peak 322 and the peak of the higher peak in the resonance peak 321 and the resonance peak 322 may be not more than 5 dBV, and the ratio of the sensitivity difference to the peak of the higher peak may be not more than 0.05.

Accordingly, a difference between the resonant frequencies corresponding to the resonance peak 321 and the resonance peak 322 (a frequency of the resonance peak 321 may be represented by $f_0$ (close to the resonance peak 311), a frequency of the resonance peak 322 may be represented by $f_1$, and a frequency difference $\Delta f_1$ may represent the difference between the resonant frequencies corresponding to the resonance peak 321 and the resonance peak 322) may be within a certain range, which may make the frequency response curve between the resonance peak 321 and the resonance peak 322 relatively flat. In some embodiments, the frequency difference $\Delta f_1$ may be in the range of 20-3000 Hz, and a ratio of the frequency difference $\Delta f_1$ to $f_0$ may be in the range of 0.02-0.7. In some embodiments, the frequency difference $\Delta f_1$ may be in the range of 20-2000 Hz, and a ratio of the frequency difference $\Delta f_1$ to $f_0$ may be in the range of 0.02-0.65. In some embodiments, the frequency difference $\Delta f_1$ may be in the range of 50-2000 Hz, and a ratio of the frequency difference $\Delta f_1$ to $f_0$ may be in the range of 0.05-0.65. In some embodiments, the frequency difference $\Delta f_1$ may be in the range of 50-1500 Hz, and a ratio of the frequency difference $\Delta f_1$ to $f_0$ may be in the range of 0.05-0.6. In some embodiments, the frequency difference $\Delta f_1$ may be in the range of 80-1500 Hz, and a ratio of the frequency difference $\Delta f_1$ to $f_0$ may be in the range of 0.1-0.6. In some embodiments, the frequency difference $\Delta f_1$ may be in the range of 100-1500 Hz, and a ratio of the frequency difference $\Delta f_1$ to $f_0$ may be in the range of 0.15-0.6.

As shown in FIG. 3A, compared with the frequency response curve 310, a sensitivity of the frequency response curve 320 within a frequency range of the resonance frequency $f_1$ corresponding to the second (or the fourth) resonance peak 322 (i.e., a difference, expressed in $\Delta f_1$) may be higher and more stable. In some embodiments, the lift $\Delta V_1$ may be in the range of 10 dBV-60 dBV. In some embodiments, the lift $\Delta V_1$ may be in the range of 15 dBV-50 dBV. In some embodiments, the lift $\Delta V_1$ may be in the range of 15 dBV-40 dBV. In some embodiments, the lift $\Delta V_1$ may be in the range of 25 dBV-40 dBV. In some embodiments, the lift $\Delta V_1$ may be in the range of 30 dBV-40 dBV.

The existence of the first resonance system 210 or the second resonance system 260 may suppress a resonance peak corresponding to the acceleration sensing device 100 in the sensing device 200 or the sensing device 250, so that a value of Q at the first (or the third) resonance peak 321 of the frequency response curve 320 may be relatively low, and the frequency response curve may be more flattened in a required frequency band (e.g., the medium and low frequency), a difference between a peak value of the highest peak and a valley value of the lowest valley of the overall frequency response curve 320 (also be known as peak valley value, expressed in $\Delta V_2$) may be within a certain range. In some embodiments, the peak valley value may be not more than 30 dBV, and a ratio of the peak valley value to the peak value of the highest peak may be not more than 0.2. In some embodiments, the peak valley value may be not more than 20 dBV, and a ratio of the peak valley value to the peak value of the highest peak may be not more than 0.15. In some embodiments, the peak valley value may be not more than 10 dBV, and a ratio of the peak valley value to the peak value of the highest peak may be not more than 0.1. In some embodiments, the peak valley value may be not more than 8 dBV, and a ratio of the peak valley value to the peak value of the highest peak may be not more than 0.08. In some embodiments, the peak valley value may not be more than 5 dBV, and a ratio of the peak valley value to the peak value of the highest peak may be not more than 0.05.

For the sensing device 250, in some embodiments, the frequency corresponding to the fourth resonance peak 322 (i.e., the fourth resonance frequency) may be a medium and low frequency, and the frequency corresponding to the third resonance peak 321 (i.e., the third resonance frequency) may be a medium and high frequency. In some embodiments, a difference between a minimum sensitivity value of the frequency response curve 320 in the frequency range within the resonant frequency $f_1$ and the peak value of the fourth resonant peak may be not more than 30 dBV, and a ratio between the minimum sensitivity value of the frequency response curve 320 in the frequency range within the resonant frequency $f_1$ and the peak value of the fourth resonance peak may be not more than 0.2. In some embodiments, a difference between the minimum sensitivity value of the frequency response curve 320 in the frequency range within the resonant frequency $f_1$ and the peak value of the fourth resonant peak may be not more than 20 dBV, and a ratio between the minimum sensitivity value of the frequency response curve 320 in the frequency range within the resonant frequency $f_1$ and the peak value of the fourth resonance peak may be not more than 0.15. In some embodiments, a difference between the minimum sensitivity value of the frequency response curve 320 in the frequency range within the resonant frequency $f_1$ and the peak value of the fourth resonant peak may be not more than 10 dBV, and a ratio between the minimum sensitivity value of the frequency response curve 320 in the frequency range within the resonant frequency $f_1$ and the peak value of the fourth resonance peak may be not more than 0.1.

In some embodiments, a frequency response of the sensing device 200 or the sensing device 250 may pass through relevant parameters of the curve 320, such as one or more combination of a peak value of the first (or the third) resonance peak 321, a frequency, a peak value of the second (or the fourth) resonance peak 322, a frequency, a value of Q, $\Delta f_1$, $\Delta V_1$, $\Delta V_2$, a ratio of $\Delta f_1$ to $f_0$, a ratio of the peak valley value to the peak value of the highest peak, a first-order coefficient, a second-order coefficient, and a third-order coefficient of equation determined by fitting the frequency response curve, etc. In some embodiments, the frequency response of the sensing device 200 or the sensing device 250 may be related to properties of the filled liquid and/or parameters of the acceleration sensing device 100. The properties of the liquid may include, for example, a density of the liquid, a kinematic viscosity of the liquid, a volume of the liquid, presence or absence of bubbles, a volume of the bubbles, a position of the bubbles, a count of the bubbles, or the like. The parameters of the acceleration sensing device 100 may include, for example, the internal structure, the size, the stiffness of the housing 110, the mass of the acceleration sensing device 100, and/or the size, the stiffness of the sensing element 120 (e.g., a cantilever beam).

In some embodiments, in order to obtain an ideal output frequency response (e.g., the frequency response curve 320) of the sensing device 200 or the sensing device 250, the ranges of the above listed parameters (also be known as frequency response influencing factors, including the properties of the filled liquid and/or the parameters of the acceleration sensing device 100) that affect the frequency response may be determined by computer simulation, phantom experiment, etc. In some embodiments, the influence of each factor on the frequency response of the sensing device 200 or the sensing device 250 may be determined one by one by controlling variables based on simulation. For example, the performance of the sensing devices with different cavity structure characteristics may be tested under the premise that filling with same liquid. As another example, under the premise of the same housing size, the performance of the sensing device may be tested under different conditions of filling the liquid and filling the liquid and bubbles. As a further example, under the premise that the bubbles do not cover the sensing elements (such as piezoelectric transducers), the performance of the sensing devices with different characteristics of size of the bubbles may be tested. As a further example, under the premise that the bubbles cover the sensing elements (such as piezoelectric transducers), the performance of the sensing devices with different characteristics of the size of the bubbles may be tested.

In some embodiments, some factors may be related to the influence of other factors on the frequency response of the sensing device 200 or the sensing device 250, so the influence of parameter pairs or parameter groups on the frequency response of the sensing device 200 or the sensing device 250 may be determined in the form of the corresponding parameter pairs or parameter groups. For example, when the height of the housing of the acceleration sensing device 100 is increased, the volume of the cavity may become larger, the mass of the housing may become larger, and the volume of the liquid filled therein may correspondingly become larger, therefore, the performance of the sensing device with characteristics of different parameter pairs may be tested by taking the height of the housing, the mass of the housing, and/or the volume of the liquid (or a ratio of any two parameters, or a product of at least two parameters, etc.) as the parameter groups. As another example, the liquid viscosity and density may be used as a parameter pair to test the influence of the parameter pair (or the ratio, the product, etc.) on the frequency response of the sensing device 200 or the sensing device 250.

In some embodiments, the influence of the parameter pair or the parameter group corresponding to each factor or multiple factors on the frequency response of the sensing device 200 or the sensing device 250 may be determined by a phantom test.

Exemplarily, for the sensing device 200 or the sensing device 250 filled with liquids of different viscosities, the greater the liquid viscosity, the greater the system damping, and the smaller the value of Q of the frequency response of the sensing device 200. For the sensing device 250 filled with the liquid and air bubbles, within a certain range of kinematic viscosity, the greater the kinematic viscosity of the filling liquid, the greater a sensitivity improvement of the sensing device 250.

In some embodiments, the kinematic viscosity of the liquid may be 0.1-5000 cst. In some embodiments, the kinematic viscosity of the liquid may be 0.1-1000 cst. In some embodiments, the kinematic viscosity of the liquid may be 0.3-1000 cst. In some embodiments, the kinematic viscosity of the liquid may be 0.5-500 cst. In some embodiments, the kinematic viscosity of the liquid may be 0.5-200 cst. In some embodiments, the kinematic viscosity of the liquid may be 59-200 cst.

Exemplarily, for the sensing device 200 filled with liquid, by increasing the size of the cavity, a sensitivity of the sensing device at the medium frequency may be improved, a frequency response suppression effect of the liquid on the sensing device at the medium frequency may be reduced, and the frequency response curve may be flatter.

Exemplarily, for the sensing device 200 with different heights of the cavity filled with liquid, within a certain range, the higher the cavity height, the higher an output sensitivity of the medium and low frequency of the sensing device 200.

In some embodiments, the length, the width, and the height of the cavity of the sensing device may be 1-30 mm, 1-30 mm, and 0.5-30 mm, respectively. In some embodiments, the length, the width, and the height of the cavity of the sensing device may be 2-30 mm, 2-30 mm, and 1-30 mm, respectively. In some embodiments, the length, the width, and the height of the cavity of the sensing device may be 5-10 mm, 5-10 mm, and 1-10 mm, respectively. In some embodiments, the length, the width, and the height of the cavity of the sensing device may be 8-10 mm, 5-10 mm, and 1-5 mm, respectively. Optionally, the cavity of the sensing device has a relatively large size. In some embodiments, the length, the width, and the height of the cavity of the sensing device may be 10-200 mm, 10-100 mm, and 10-100 mm, respectively. In some embodiments, the length, the width, and the height of the cavity of the sensing device may be 10-100 mm, 10-50 mm, and 10-50 mm, respectively. In some embodiments, the length, the width, and the height of the cavity of the sensing device may be 10-50 mm, 10-30 mm, and 10-30 mm, respectively.

Exemplarily, compared with the sensing device 200 filled with the liquid, the sensing device 250 filled with the liquid and bubbles may have excessive stiffness and damping, because the gas is compressible and the stiffness is small, while the liquid is incompressible, so an overall output gain of the sensing device 250 may be higher. For example, in some cases, the second resonance peak of the sensing device 200 may "disappear" due to the over damping, thereby affecting the improvement of the sensitivity of the sensing device 200 at the medium and low frequency.

Exemplarily, the sensing device 250 filled with the liquid and bubbles, when the bubbles do not cover the sensing element (e.g., a piezoelectric transducer), a sensitivity of the sensing device may increase as the volume of the bubbles increases.

In some embodiments, a ratio of the volume of the bubbles to the volume of the liquid may be 5%-90%. In some embodiments, a ratio of the volume of the bubbles to the volume of the liquid may be 10%-80%. In some embodiments, a ratio of the volume of the bubbles to the volume of the liquid may be 20%-60%. In some embodiments, a ratio of the volume of the bubbles to the volume of the liquid may be 30%-50%.

It should be noted that the above description of the frequency response curve of the sensing device 200 or the sensing device 250 is only an exemplary description, and the present disclosure cannot be limited to the scope of the cited embodiments. It can be understood that after understanding the principle of the system, those skilled in the art may arbitrarily adjust the structure and composition without departing from the principle. Such deformation is within the protection scope of the present disclosure.

Figure 3B:
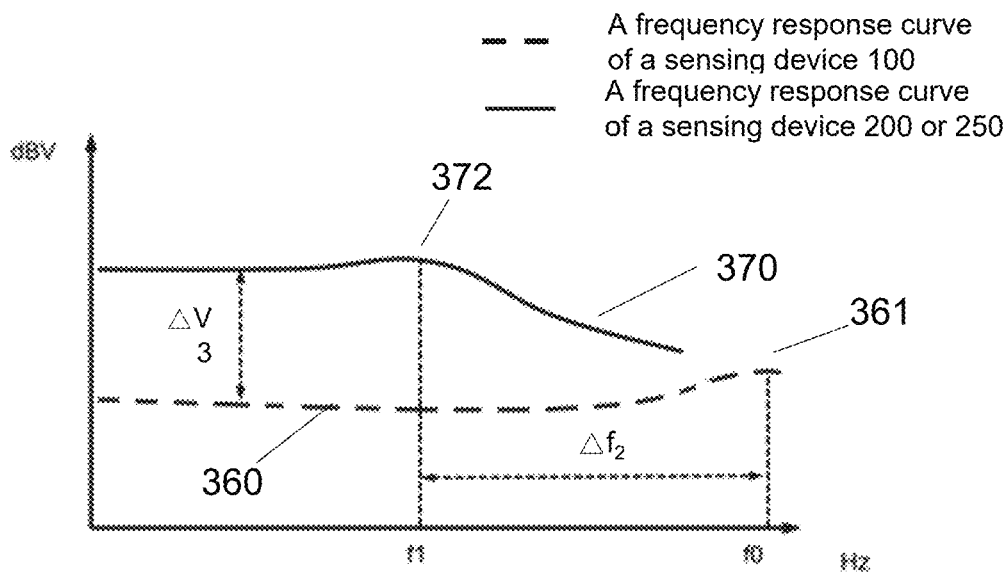
FIG. 3B is a schematic diagram illustrating a frequency response curve of an exemplary sensing device 200 or 250 according to some embodiments of the present disclosure.

FIG. 3B is a schematic diagram illustrating a frequency response curve of an exemplary sensing device 200 or 250 according to some embodiments of the present disclosure.

Exemplarily, as shown in FIG. 3B, a frequency response curve 360 represented by the dotted line may be a frequency response curve of the acceleration sensing device 100, and a frequency response curve 370 represented by the solid line may be a frequency response curve of the sensing device 200 or the sensing device 250. The frequency response curve 360 may include a resonance peak 361 corresponding to the resonant frequency of the acceleration sensing device 100. In some embodiments, the acceleration sensing device 100 may correspond to a higher resonant frequency that is not in the desired frequency band (e.g., 10-5000 Hz, 50-7000 Hz, etc.). In some embodiments, the resonant frequency corresponding to the acceleration sensing device 100 may be in a higher frequency band. For example, in some embodiments, the resonant frequency corresponding to the acceleration sensing device 100 may be higher than 7000 Hz. In some embodiments, the corresponding resonant frequency of the acceleration sensing device 100 may be higher than 10000 Hz. In some embodiments, the corresponding resonant frequency of the acceleration sensing device 100 may be higher than 12000 Hz. Accordingly, the sensing device 200 or the sensing device 250 may have high stiffness at this time, and also bring high impact strength and reliability to the sensing device 200 or the sensing device 250.

The frequency response curve 370 may include a first (or a third) resonance peak (not shown in the figure) and a second (or a fourth) resonance peak 372. In some embodiments, the frequency corresponding to the first (or the third) resonance peak may be close to or the same as the resonant frequency corresponding to the acceleration sensing device 100 in the frequency response curve 360. In some embodiments, the frequency response curve 370 may be approximately the same as the frequency response curve 320 in FIG. 3A except that the first (or the third) resonance peak shifts to the right. The frequency range corresponding to the second (or the fourth) resonance peak 372 may be the same or similar to a frequency range corresponding to the second (or the fourth) resonance peak 322 in FIG. 3A.

In some embodiments, within a required frequency range (e.g., within 200 Hz, 300 Hz, 500 Hz, etc.), a difference between a maximum sensitivity value and a minimum sensitivity value in the frequency response curve 370 may be kept within a certain range to ensure a stability of the frequency response of the sensing device 200 or the sensing device 250. In some embodiments, within the required frequency range, the difference between the maximum sensitivity value and the minimum sensitivity value may be not more than 40 dBV, and a ratio of the sensitivity difference to the maximum sensitivity value may be not more than 0.3. In some embodiments, within the required frequency range, the difference between the maximum sensitivity value and the minimum sensitivity value may be not more than 30 dBV, and a ratio of the sensitivity difference to the maximum sensitivity value may be not more than 0.25. In some embodiments, within the required frequency range, the difference between the maximum sensitivity value and the minimum sensitivity value may be not more than 20 dBV, and a ratio of the sensitivity difference to the maximum sensitivity value may be not more than 0.15. In some embodiments, within the required frequency range, the difference between the maximum sensitivity value and the minimum sensitivity value may be not more than 10 dBV, and a ratio of the sensitivity difference to the maximum sensitivity value may be not more than 0.1.

In some embodiments, a difference between the resonant frequencies corresponding to the first (or the third) resonance peak and the second (or the fourth) resonance peak 372 (the frequency of the first (or the third) resonance peak may be expressed as $f_0$ (close to a resonance peak 361), a frequency of the second (or the fourth) resonance peak 372 may be represented by $f_1$, and a frequency difference $\Delta f_2$ may be a difference of the corresponding resonance frequencies of the two resonance peak s) may be within a certain range. In some embodiments, the frequency difference $\Delta f_2$ may be in the range of 100-8000 Hz, and a ratio of the frequency difference $\Delta f_2$ to $f_0$ may be in the range of 0.02-0.8. In some embodiments, the frequency difference $\Delta f_2$ may be in the range of 100-6000 Hz, and a ratio of the frequency difference $\Delta f_2$ to $f_0$ may be in the range of 0.02-0.65. In some embodiments, the frequency difference $\Delta f_2$ may be in the range of 200-6000 Hz, and a ratio of the frequency difference $\Delta f_2$ to $f_0$ may be in the range of 0.05-0.65. In some embodiments, the frequency difference $\Delta f_2$ may be in the range of 300-5000 Hz, and a ratio of the frequency difference $\Delta f_2$ to $f_0$ may be in the range of 0.1-0.5. In some embodiments, the frequency difference $\Delta f_2$ may be in the range of 300-4000 Hz, and a ratio of the frequency difference $\Delta f_2$ to $f_0$ may be in the range of 0.1-0.4.

Compared with the frequency response curve 360, the improvement of a sensitivity of the frequency response curve 370 within the frequency range of the resonance frequency $f_1$ corresponding to the second (or the fourth) resonance peak 372 (i.e., a difference, expressed in $\Delta V_3$) may be higher and more stable. In some embodiments, the improvement $\Delta V_3$ may be in the range of 10 dBV-60 dBV. In some embodiments, the improvement $\Delta V_3$ may be in the range of 10 dBV-50 dBV. In some embodiments, the improvement $\Delta V_3$ may be in the range of 15 dBV-50 dBV. In some embodiments, the improvement $\Delta V_3$ may be in the range of 15 dBV-40 dBV. In some embodiments, the improvement $\Delta V_3$ may be in the range of 20 dBV-40 dBV. In some embodiments, the improvement $\Delta V_3$ may be in the range of 25 dBV-40 dBV. In some embodiments, the improvement $\Delta V_3$ may be in the range of 30 dBV-40 dBV.

For the sensing device 250, in some embodiments, the frequency corresponding to the fourth resonance peak 372 (i.e., the fourth resonance frequency) may be a medium and low frequency, and the frequency corresponding to the third resonance peak (i.e., the third resonance frequency) may be a medium and high frequency. In some embodiments, a difference between the minimum sensitivity value of the frequency response curve 370 in the frequency range within the resonant frequency $f_1$ and the peak value of the fourth resonance peak may be not more than 30 dBV, and a ratio between the minimum sensitivity value of the frequency response curve 370 in the frequency range within the resonant frequency $f_1$ and the peak value of the fourth resonance peak may be not more than 0.2. In some embodiments, a difference between the minimum sensitivity value of the frequency response curve 370 in the frequency range within the resonant frequency $f_1$ and the peak value of the fourth resonance peak may be not more than 20 dBV, and a ratio between the minimum sensitivity value of the frequency response curve 320 in the frequency range within the resonant frequency $f_1$ and the peak value of the fourth resonance peak may be not more than 0.15. In some embodiments, a difference between the minimum sensitivity value of the frequency response curve 320 in the frequency range within the resonant frequency $f_1$ and the peak value of the fourth resonance peak may be not more than 10 dBV, and a ratio between the minimum sensitivity value of the frequency response curve 320 in the frequency range within the resonant frequency $f_1$ and the peak value of the fourth resonance peak may be not more than 0.1.

In some embodiments, the frequency response of the sensing device 200 or the sensing device 250 may pass through relevant parameters of the curve 370, such as one or more combination of a peak value of a primary resonance peak, a frequency, a peak value of a secondary resonance peak 372, the frequency, a value of Q, $f_2$, $\Delta V_3$, a ratio of $\Delta f_2$ to $f_0$, a ratio of the maximum sensitivity value to the minimum sensitivity value within a required frequency range, a first-order coefficient, a second-order coefficient, and a third-order coefficient of the equation determined by fitting the frequency response curve, etc. In some embodiments, the frequency response of the sensing device 200 or the sensing device 250 may be related to the properties of the filled liquid and/or the parameters of the acceleration sensing device 100. In some embodiments, in order to obtain an ideal output frequency response (e.g., the frequency response curve 370) of the sensing device 200 or the sensing device 250, the range of the above listed parameters (also be known as frequency response influencing factors, including the properties of the filled liquid and/or the parameters of the acceleration sensing device 100) that affect the frequency response may be determined by computer simulation, phantom experiment, etc., which may be the same as or similar to the method described in FIG. 3A, and may not be repeated here.

Figure 3C:
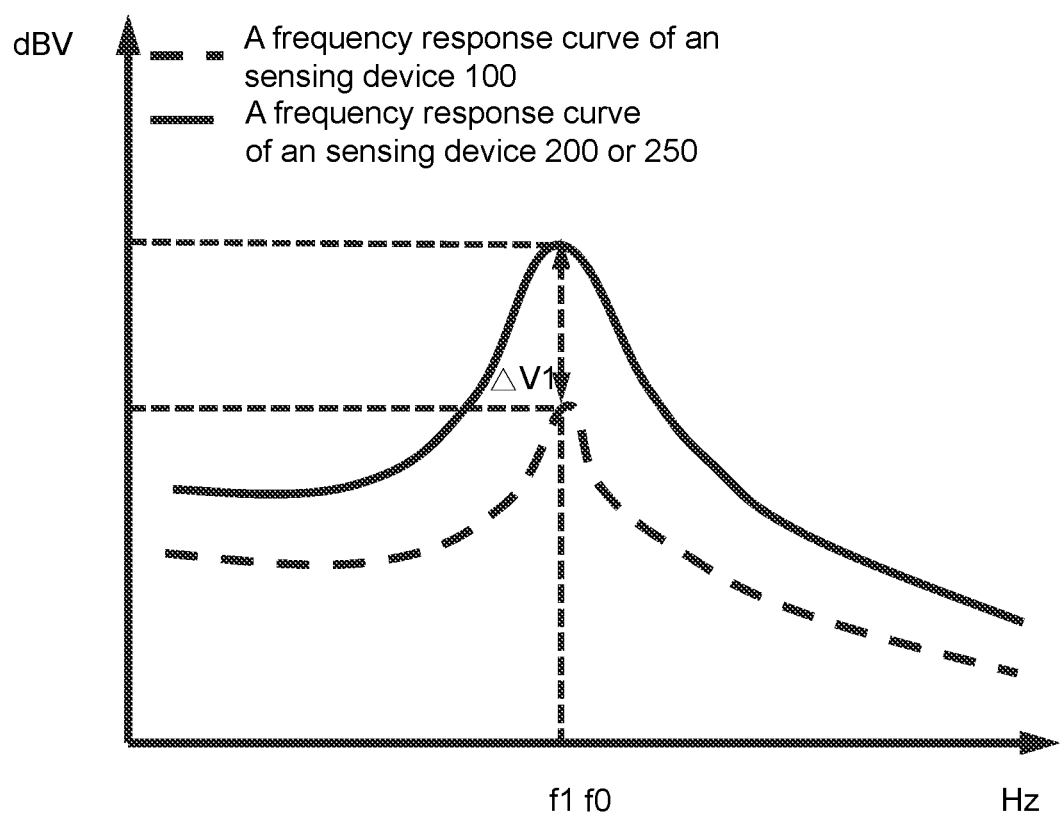
FIG. 3C is a schematic diagram illustrating a frequency response curve of an exemplary sensing device 200 or 250 according to some embodiments of the present disclosure.

FIG. 3C is a schematic diagram illustrating a frequency response curve of an exemplary sensing device 200 or 250 according to some embodiments of the present disclosure.

Exemplarily, as shown in FIG. 3C, a frequency response curve 380 represented by the dotted line may be a frequency response curve of the acceleration sensing device 100, and a frequency response curve 390 represented by the solid line may be a frequency response curve of the sensing device 200 or the sensing device 250. The frequency response curve 380 may include a resonance peak 381 corresponding to the resonant frequency of the acceleration sensing device 100. The frequency response curve 390 may include a first (or a third) resonance peak and a second (or a fourth) resonance peak. A frequency of a resonance peak 391 may be represented by $f_0$ (close to the resonance peak 381), a frequency of a resonance peak 392 may be represented by $f_1$, and a difference of resonant frequencies corresponding to the resonance peak 391 and the resonance peak 392 may be represented by a frequency difference $\Delta f_3$. In some embodiments, $f_1$ may be closer or equal to $f_0$ to further enhance output of the sensing device 200 or the sensing device 250 at the resonant frequency $f_0$.

In some embodiments, in order to improve the sensitivity of the response the sensing device 200 or the sensing device 250 to the acceleration signal at $f_0$ and/or $f_1$, structural parameters of the first resonance system 210 or the second resonance system 260 may be set to make an absolute value of the difference $\Delta f_3$ between $f_1$ and $f_0$ not greater than a set threshold. In some embodiments, the absolute value of $\Delta f_3$ may not be greater than 1000 Hz. In some embodiments, the absolute value of $\Delta f_3$ may be less than 1000 Hz. In some embodiments, the absolute value of $\Delta f_3$ may be less than 800 Hz. In some embodiments, the absolute value of $\Delta f_3$ may be in the range of 100 Hz-200 Hz. In some embodiments, the absolute value of $\Delta f_3$ may be in the range of 0 Hz-100 Hz. In some embodiments, the absolute value of $\Delta f_3$ may be 0, i.e., $f_0$ and $f_1$ may be equal. In some embodiments, the absolute value of $\Delta f_3$ may be relatively small by setting the structural parameters of the first resonant system 210 or the second resonant system 260 and/or the acceleration sensing device 100. In this case, since the sensing device 200 or the sensing device 250 resonates with the external acceleration signal at $f_0$ and $f_1$, respectively, frequency components in a certain frequency band including $f_0$ or $f_1$ may be amplified. When the absolute value of $\Delta f_3$ is close to 0 (i.e., $f_0$ and $f_1$ may be substantially equal), the frequency components near $f_0$ and $f_1$ may be further "amplified", so that the sensing device 200 or the sensing device 250 has a relatively high sensitivity at $f_0$ and $f_1$, for example, the resonance peak 391 and the resonance peak 392 in FIG. 3C may correspond to substantially a same frequency point, and combined action of the resonance peak 391 and the resonance peak 392 may greatly improve the sensitivity of the sensing device near the frequency point. In some embodiments, a sensitivity of the sensing device 200 or the sensing device 250 at $f_1$ may be greater than a sensitivity of the acceleration sensing device 100 at $f_1$, as shown in FIG. 3C, a difference between the sensitivity of the sensing device 200 or the sensing device 250 at $f_1$ and the sensitivity of the acceleration sensing device 100 at $f_1$ may be represented by $\Delta V_1$.

In some embodiments, the sensitivity of the sensing device 200 or the sensing device 250 in different resonant frequency ranges may be improved by 5 dBV-60 dBV compared to the acceleration sensing device 100. In some embodiments, the sensitivity of the sensing device 200 or the sensing device 250 may be increased by 10 dBV-40 dBV in different resonant frequency ranges.

Figure 4A:
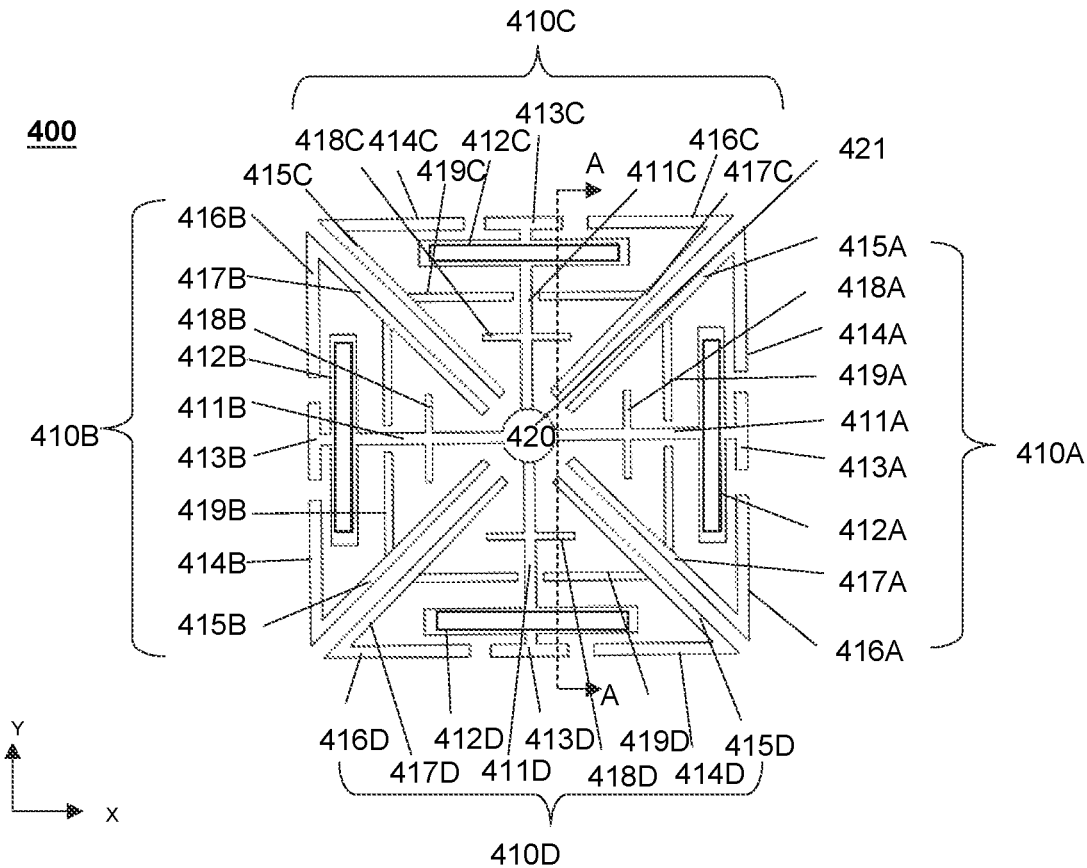
FIGS. 4A and 4B are structure diagrams illustrating an exemplary sensing device 400 according to some embodiments of the present disclosure.
Figure 4B:
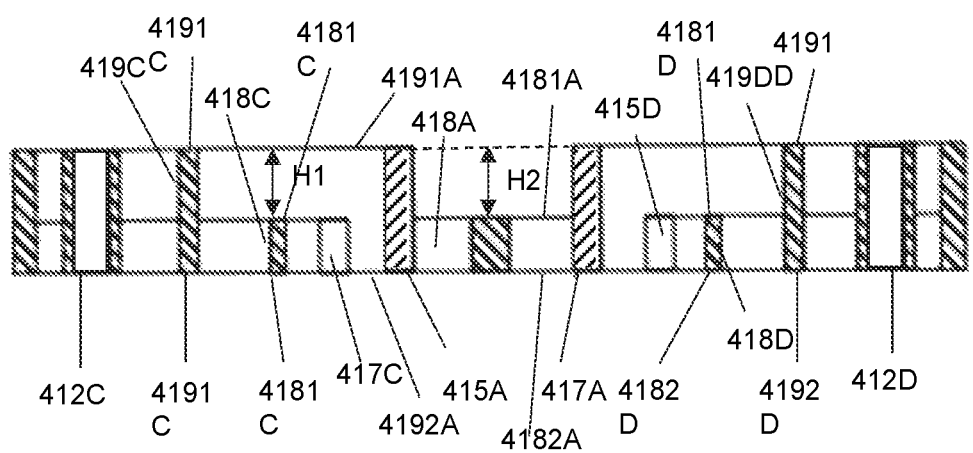

FIGS. 4A and 4B are structure diagrams illustrating an exemplary sensing device 400 according to some embodiments of the present disclosure.

As shown in FIGS. 4A and 4B, the sensing element 400 may include a substrate (not shown in the figure), a mass element 420, and one or more detection capacitors for determining the magnitude of the external acceleration. The substrate may be a flat plate structure. The material of the substrate may be polysilicon, polysilicon germanium, or the like. In some embodiments, the mass element 420 may be arranged at a central position on an upper portion of the substrate. The mass element 420 may include an upper surface 421 and a lower surface (not numbered) parallel to each other and a side surface (not shown in the figure) connecting the upper surface and the lower surface. The mass element 420 may move relative to the substrate in response to the external acceleration.

In each direction (e.g., a first direction, a second direction, and a third direction), the sensing element 400 may include at least one detection capacitor. In each direction, the sensing element 400 may include at least one moving electrode and at least one corresponding fixing electrode to form a detection capacitor in the direction for determining the size of the acceleration in the direction. The at least one moving electrode may be arranged on the mass element 420. In some embodiments, the sensing element 400 may include at least one group of first moving electrodes arranged in the first direction and each group of first moving electrodes extending perpendicular to the first direction, at least one group of second moving electrodes arranged in the second direction and each group of second moving electrodes extending perpendicular to the second direction. Each group of first moving electrodes may include one or more first moving electrodes. Each group of second moving electrodes may include one or more second moving electrodes. Accordingly, the sensing element 400 may also include a first fixing electrode being set relative to and in parallel with each of the first moving electrodes and a second fixed electrode being set relative to and in parallel with each of the second moving electrodes. The at least one group of first moving electrodes and the corresponding first fixing electrode may form a first direction detection capacitor. The at least one group of second moving electrodes and the corresponding second fixing electrode may form a second direction detection capacitor. The at least one group of first moving electrodes and the at least one group of second moving electrodes together with the corresponding first fixing electrode and the second fixing electrode may form a third direction detection capacitor.

In some embodiments, the at least one group of first moving electrodes may include an even numbers of the first moving electrodes (e.g., two groups). The even groups of the first moving electrodes may be located on two sides of the mass element 420 along the first direction. The even groups of the first direction moving electrode, and the corresponding first fixing electrode may form a first direction differential capacitance structure to determine the size of the acceleration in the first direction more accurately. Similarity, the at least one second moving electrode may include the even groups (e.g., two groups) of the second moving electrodes. The even groups of the second moving electrodes may be located on two sides of the mass element 420 along the second direction. The even groups of the second direction moving electrode, and the corresponding second fixing electrode may form a second direction differential capacitance structure to determine the size of the acceleration in the second direction more accurately.

In some embodiments, each first moving electrode has a first moving electrode top surface and a first moving electrode bottom surface, the first moving electrode top surface, and the first moving electrode bottom surface may be parallel to an upper surface of the mass element, and the corresponding first fixing electrode has a first fixing electrode top surface and a first fixing electrode bottom surface, the first fixing electrode top surface, and the first fixing electrode bottom surface may be parallel to an upper surface of the mass element. The first moving electrode top surface may be farther away from the upper surface of the mass element compared with the first fixing electrode top surface. Each second moving electrode has a second moving electrode top surface and a second moving electrode bottom surface, the second moving electrode top surface, and the second moving electrode bottom surface may be parallel to the upper surface of the mass element, and a corresponding second fixing electrode has a second fixing electrode top surface and a second fixing electrode bottom surface, the second fixing electrode top surface, and the second fixing electrode bottom surface may be parallel to the upper surface of the mass element. The second moving electrode top surface may be farther away from the upper surface of the mass element compared with the second fixing electrode top surface. Thus, a differential capacitance structure may be formed to determine the size of the acceleration in the third direction more accurately.

Specifically, each group of first moving electrodes may be provided with a first moving electrode shaft along the first direction and one or more first fixed moving electrodes perpendicular to the first direction. The group of first moving electrodes may be distributed along the first moving electrode shaft. A distance between each first moving electrode may be the same or different. The first moving electrode shaft and the first fixed moving electrode are connected with the substrate through a first elastic element (e.g., a spring, an elastic rod, an elastic net, etc.). Each group of second moving electrodes may be provided with a second moving electrode shaft along the second direction and one or more second fixed moving electrodes perpendicular to the second direction. A distance between each second moving electrode may be the same or different. The second moving electrode shaft and the second fixed moving electrode may be connected with the substrate through a second elastic element (e.g., a spring, an elastic rod, an elastic net, etc.).

Accordingly, the sensing element 400 may include a pair of first fixing electrode shafts and a pair of first fixed fixing electrodes corresponding to the each group of first moving electrodes. The pair of first fixing electrode shafts may be symmetrically arranged relative to the first direction. For example, the pair of first fixing electrode shafts may be set at a certain angle (e.g., 90 degrees). The first moving electrode shaft of the each group of first moving electrodes may be set between the pair of first fixing electrode shafts. The pair of first fixed fixing electrodes may be perpendicular to the first direction. The one or more first fixed moving electrodes may be set between the pair of first fixed fixing electrodes. In some embodiments, the first fixed moving electrode may be in line with the pair of first fixed fixing electrodes. The sensing element 400 may include a pair of second fixing electrode shafts and a pair of second fixed fixing electrodes corresponding to the each group of second moving electrodes. The pair of second fixing electrode shafts may be symmetrically arranged relative to the second direction. For example, the pair of second fixing electrode shafts may be set at a certain angle (e.g., 90 degrees). The second moving electrode shaft of the each group of second moving electrodes may be set between the pair of second fixing electrode shafts. The pair of second fixed fixing electrodes may be perpendicular to the second direction. The one or more second fixed moving electrodes may be set between the pair of second fixed fixing electrodes. In some embodiments, the second fixed moving electrode may be in line with the pair of second fixed fixing electrodes. In some embodiments, the pair of first moving electrode shafts corresponding to the each group of first moving electrodes, the first fixed fixing electrode, and the first fixed moving electrode may form a triangular region. The pair of second fixing electrode shafts corresponding to the each group of second moving electrodes, the second fixed fixing electrode, and the second fixed moving electrode may form a triangular region.

In order to more clearly explain the structure of the sensing element 400, the first direction may be set as an X-axis direction shown in FIG. 4A, the second direction may be set as a Y-axis direction, and the X-axis direction and the Y-axis direction may be perpendicular to each other, the third direction may be a Z-axis direction (not shown in the figure), and the Z-axis direction may be perpendicular to the X-Y plane. Exemplarily, a sensing region of the sensing element 400 may be divided into four triangular regions 410A, 410B, 410C, and 410D. The structures of the sensing regions 410A and 410B may be arranged symmetrically with respect to the Y-axis, and the structures of the sensing regions 410C and 410D may be arranged symmetrically with respect to the X-axis; the sensing regions 410A and 410B may be arranged along the X-axis direction, and the sensing regions 410C and 410D may be arranged along the Y-axis direction.

As shown in FIG. 4A, for the sensing regions 410A and 410B, the mass element 420 may extend in the X-axis direction (a positive direction, a negative direction) to form a first moving electrode shaft 411A and a first moving electrode shaft 411B. The first moving electrode shaft 411A and the first moving electrode shaft 411B may be connected with the substrate through a first elastic element (e.g., a first spring structure 412A, a first spring structure 412B). The group of first moving electrodes may be formed along the first moving electrode shaft 411A and the first moving electrode shaft 411B. The group of first moving electrodes may include a plurality of first moving electrodes (e.g., a first moving electrode 418A, a first moving electrode 418B). The plurality of first moving electrodes may be perpendicular to the first moving electrode shafts 411A and 411B (i.e., the X-axis direction) and may be sequentially arranged along the first moving electrode shafts 411A and 411B. A distance between each of the first moving electrodes may be the same or different. The plurality of first moving electrodes may be connected with the substrate through a first elastic element. For example, the first moving electrodes 418A and 418B may be connected with the substrate through the first spring structures 412A and 412B, respectively. The plurality of first fixing electrodes (e.g., a first fixing electrode 419A, a first fixing electrode 419B) may be parallel to the first moving electrodes (e.g., a first moving electrode 418A, a first moving electrode 418B) and fixedly connected with the substrate. The first moving electrodes (e.g., 418A, 418B) respectively have overlapping areas with the first fixing electrodes (e.g., 419A, 419B).

For the sensing regions 410C and 410D, the mass element 420 may extend in the Y-axis direction, forming the second moving electrode shafts 411C and 411D. The second moving electrode shafts 411C and 411D may be connected with the substrate through the second elastic element (e.g., a second spring structure 412C, a second spring structure 412D). A group of second moving electrodes may be formed along the second moving electrode shafts 411C and 411D. The group of second moving electrodes may include a plurality of second moving electrodes (e.g., a second moving electrode 418C, a second moving electrode 418D). The plurality of second moving electrodes may be perpendicular to the second moving electrode shafts 411C and 411D (i.e., the Y axis direction) and may be sequentially arranged along the second moving electrode shafts 411C and 411D. A distance between the second moving electrodes may be the same or different. The plurality of second moving electrodes may be connected with the substrate through the second elastic element. For example, the second moving electrodes 418C and 418D may be connected with the substrate through the second spring structures 412C and 412D, respectively. A plurality of second fixing electrodes (e.g., a second fixing electrode 419C, a second fixing electrode 419D) may be parallel to the second moving electrodes (e.g., a second moving electrode 418C, a second moving electrode 418D) and fixedly connected with the substrate. The second moving electrodes (e.g., 418C, 418D) respectively have overlapping areas with the second fixing electrodes (e.g., 419C, 419D). The above-mentioned first moving electrodes and second moving electrodes (for example, 418A, 418B, 418C, 418D) and the first fixing electrodes and second fixing electrodes (for example, 419A, 419B, 419C, 419D) may respectively intersect each other to form a comb-tooth capacitance system.

The mass element 420 may further include a first fixing moving electrode (e.g., 413A, 413B). The first fixing moving electrode may be connected with the substrate through the first elastic element (e.g., the first spring structure 412A, the first spring structure 412B) or directly. The mass element 420 may further include a plurality of groups of first fixing electrode shafts (e.g., 415A and 417A, 415B and 417B) connected with the substrate. The each of the first fixing electrode shafts may respectively connect the corresponding first fixed fixing electrodes (e.g., 414A, 416A, 414B, and 416B) with the substrate. For example, the first fixing electrode shafts 415A, 417A, 415B, and 417B may connect the first fixed fixing electrodes 414A, 416A, 414B, and 416B with the substrate, respectively. For each of the sensing regions, the first moving electrode, the first moving electrode shaft, and the first fixed moving electrode may be sandwiched between a group of first fixing electrode shafts. For example, for the sensing region 410A, the first moving electrode 418A, the first moving electrode shaft 411A, and the first fixed moving electrode 413A may be sandwiched between a group of first fixing electrode shafts 415A and 417A. A group of first fixing electrode shafts of the sensing region, the first fixed fixing electrode, and the first fixed moving electrode may form a triangular region. For example, for the sensing region 410A, the first fixing electrode shafts 415A and 417A, the first fixed fixing electrodes 414A and 416A, and the first fixed moving electrode 413A may form a triangular region.

Similarly, the mass element 420 may further include a second fixed moving electrode (e.g., 413C, 413D). The second fixed moving electrode may be connected with the substrate through the second elastic element (e.g., the second spring structure 412C, the second spring structure 412D) or directly. The mass element 420 may further include a plurality of groups of second fixed electrode shafts (e.g., 415C and 417C, 415D and 417D) connected with the substrate. The each of the first fixing electrode shafts may respectively connect corresponding second fixed fixing electrodes (e.g., 414C, 416C, 414D, 416D) to the substrate. For example, the second fixing electrode shafts 415C, 417C, 415D, and 417D may connect the first fixed fixing electrodes 414C, 416C, 414D, and 416D with the substrate, respectively. For each of the sensing region, the second moving electrode, the second moving electrode shaft, and the second fixed moving electrode may be sandwiched between a group of second fixing electrode shafts. For example, for the sensing region 410C, the second moving electrode 418C, the second moving electrode shaft 411C, and the second fixed moving electrode 413C may be sandwiched between a group of second fixing electrode shafts 415C and 417C. A group of second fixing electrode shafts in the sensing region, the second fixed fixing electrode, and the second fixed moving electrode may form a triangular region. For example, for the sensing region 410C, the second fixing electrode shafts 415C and 417C may form a triangular region with the second fixed fixing electrodes 414A and 416A, and the first fixing moving electrode 413A. For example, for the sensing region 410C, the second fixing electrode shafts 415C and 417C may form a triangular region with the second fixed fixing electrodes 414A and 416A, and the first fixed moving electrode 413A. In this way, the sensing region of the sensing element 400 may be divided into four regions 410A, 410B, 410C, and 410D. In some embodiments, the first/second fixing electrode shaft of adjacent sensing regions may be arranged in parallel. For example, the first fixing electrode shafts 415A, 417A, 415B, and 417B may be arranged in parallel with the second fixing electrode shafts 417C, 415D, 417D, and 415C, respectively, and have a certain distance.

In some embodiments, the height of the plurality of first/second moving electrode in the third direction (i.e., the direction of the Z axis) may be different from the height of the plurality of first/second fixing electrodes. For example, the first moving electrodes 418A and 41B have a first moving electrode top surface 4181A and a first moving electrode bottom surface 4182A parallel to an upper surface 421 of the mass element 420, and the corresponding first fixing electrodes 419A and 419B have a first fixing electrode top surface and a first fixing electrode bottom surface parallel to the upper surface 421 of the mass element 420 (not shown in the figure). The height of the first moving electrodes 418a and 418b may be smaller than the height of the first fixing electrodes 419A and 419B. If the first moving electrode bottom surface and the first fixing electrode bottom surface are on a same plane, a height difference between the first moving electrodes 418a and 418b, and the first fixing electrodes 419A and 419B may be H2, as shown in FIG. 4b, if the first moving electrode bottom surface and the first fixing electrode bottom surface are on a same plane, and a height difference between a top surface 4181A of the first moving electrode 418a and a top surface 4191A of the first fixing electrode 419A may be H2. The second moving electrodes 418C and 418D have a second moving electrode top surface 4181C and a second moving electrode bottom surface 4182C parallel to the upper surface 421 of the mass element 420, and the second fixing electrodes 419C and 419D have a second fixing electrode top surface 4191D and a second fixed electrode bottom surface 4192D parallel to the upper surface 421 of the mass element 420. The height of the second moving electrodes 418C and 418D may be greater than the height of the second fixing electrodes 419C and 419D. If the second moving electrode bottom surface and the second fixing electrode bottom surface are on the same plane, a distance height difference between the second moving electrode 418C and 418D, and the second fixing electrode 419C and 419D may be H1, as shown in FIG. 4B, if the second moving electrode bottom surface and the second fixing electrode bottom surface are on the same plane, and a height difference between a top surface 4181C of the second moving electrode 418C and a top surface 4191C of the second fixing electrode 419C may be H1. In some embodiments, in order to improve the measurement accuracy and ensure the reliability of the manufacturing process, the first electrode top surface has a same horizontal height as the second moving electrode top surface, as shown in FIG. 4B. For example, a top surface of the first electrode 419A of the sensing region 410A has a same horizontal height as a top surface of the second moving electrode 4181D of the sensing region 410D, making the surface of the entire sensing element 420 flatter.

The plurality of first moving electrodes and the corresponding first fixing electrodes may form a plurality of first and detection capacitors and third direction detection capacitors for determining the size of the acceleration in the first direction and the third direction. The plurality of second moving electrodes and the corresponding second fixing electrodes may form a plurality of second direction detection capacitors and third direction detection capacitors for determining the size of the acceleration in the second direction and third direction. When there is an external acceleration in the first direction, a distance between the plurality of first moving electrodes and the corresponding first electrode may change, for example, when the mass element 420 moves to a positive direction of the X-axis, a distance between the first moving electrode and the first fixing electrode in the sensing region 410A may become smaller and the capacitance may become larger, when a distance between the first moving electrode and the first fixing electrode in the sensing region 410B increases, the capacitance may decreases, thereby generating a differential capacitance output signal proportional to the size of the acceleration, and detecting the size of the acceleration in the first direction. When there is an external acceleration of the second direction, a distance between the plurality of second moving electrodes and the corresponding second fixing electrodes may change, for example, when the mass element 420 moves in a positive direction of the Y-axis, a distance between the second moving electrode and the second fixing electrode in the sensing region 410C may become smaller and the capacitance may become larger, while a distance between the second moving electrode and the second fixing electrode in the sensing region 410D may become larger and the capacitance may become smaller, thereby generating a differential capacitance output signal proportional to the size of the acceleration, so as to detect the acceleration in the second direction. When there is an external acceleration in the third direction, positive area between the plurality of first moving electrodes or second moving electrodes and the corresponding first fixing electrode or second fixing electrode may change, for example, when the mass element 420 moves along a positive direction of the Z-axis, the positive area and the capacitance between the first moving electrode and the first fixing electrode of the sensing regions 410a and 410b remain unchanged, while the positive area and the capacitance between the second moving electrode and the second fixing electrode of the sensing regions 410C and 410D may become smaller, so as to detect the acceleration in the third direction. The sensing element 400 may be accommodated in the cavity formed by the housing 110 to form an acceleration sensing device to detect the acceleration in three dimensions. At the same time, the structure may be simple and reliable, and the overall size may be small.

By coupling at least one resonant system to the acceleration sensing device (e.g., between the housing 110 and the sensing element 400), the sensing device (e.g., the sensing device 200 or 250) may be constructed. The at least one resonance system may include the first resonance system 210 shown in FIGS. 2A and 2B or the second resonance system 260 shown in FIGS. 2C and 2D.

In some embodiments, the first resonant system 210 and the second resonant system 260 may include a liquid. Exemplarily, the first resonance system 210 may be a liquid having a specific density and viscosity. For example, the liquid may be a silicone oil with a density of 0.94 kg/m$^3$, and the kinematic viscosity of the silicone oil may be 0.5 cst, 1 cst, 5 cst, 10 cst, 100 cst, 200 cst, 1000 cst, etc. The liquid may be equivalent to a spring (Km4)-mass (Mm4)-damping (Rm4) system. By filling the cavity of the acceleration sensing device with the liquid, so that the sensing element 400 may be completely immersed in the liquid, the first resonance system 210 may be coupled to the sensing element 400. The second resonance system 210 may be liquid including air bubbles, for example, the silicone oil including the air bubbles, and a proportion of the air bubbles in the volume of the cavity may be any value between 5% and 95%. The number of bubbles may be 1, 2, 3, 4, or etc. The liquid may be equivalent to a spring (Km4)-mass (Mm4)-damping (Rm4) system, and the bubbles may be equivalent to a spring (Km3) and damping (Rm3) system. By partially filling the cavity of the acceleration sensing device with the liquid, the air bubbles may be partially filled the cavity of the acceleration sensing device (e.g., air bubbles formed by air not expelled from the cavity when filling liquid, air bubbles formed by air pockets, and/or air bubbles formed by applying a hydrophobic coating to the sensing element 400), the sensing element 400 may be at least partially immersed in the liquid, thereby realizing the coupling of the second resonant system 260 with the sensing element 400.

In some embodiments, the first resonant system 210 and the second resonant system 260 may include elastic structures. Exemplarily, the first resonance system 210 may be an elastic structure with a certain mass (e.g., an elastic rod, an elastic sheet, an elastic block, an elastic net, etc.), or a combination of a lightweight elastic structure and a mass element. The elastic structure with a certain mass or the combination of the lightweight elastic structure and the mass element may be equivalent to a spring (Km4)-mass (Mm4)-damping (Rm4) system. The two ends of the elastic structure may be respectively connected between the housing 110 and the sensing element 400 (e.g., the upper surface 421 of the mass element 420, the lower surface of the mass element 420, and/or the side surface 423 of the mass element 420, or the plurality of first/second moving electrodes extending along the X-axis or Y-axis), so that the coupling between the first resonance system 210 and the sensing element 400 may be realized. The second resonant system 260 may be a combination of the lightweight elastic rod and/or the spring and a relatively large mass elastic rod. The elastic rod with a relatively large mass may be equivalent to a spring (Km4)-mass (Mm4)-damping (Rm4) system. The lightweight elastic rod and/or the spring may be equivalent to a spring (Km3) and damping (Rm3) system. The two ends of the elastic rod and/or the spring may be fixedly connected between the housing 110 and the sensing element 400 (e.g., the upper surface 421 of the mass elements 420, the lower surface of the mass element 420, and/or the side surface 423 of the mass element 420, or a plurality of first/second moving electrodes extending along the X-axis or Y-axis), respectively, so that the second resonance system 260 may be coupled to the sensing element 400.

Due to the existence of the second resonance frequency corresponding to the first resonance system 210 or the second resonance system 260, the frequency response curve of the sensing device including the sensing element 400 may be improved in a specific frequency band (e.g., a low frequency, a medium and low frequency, a medium and high frequency and/or high frequency), so that a sensitivity of the sensing device may be improved compared with the acceleration sensing device without the first resonance system 210 or the second resonance system 260. In addition, since the first resonant system 210 or the second resonant system 260 acts on the sensing element 400, the vibration characteristics of the acceleration sensing device may be changed compared with the vibration characteristics of the acceleration sensing device without the first resonant system 210. Specifically, the first resonant system 210 or the second resonant system 260 acts on the sensing element 400 and may affect the mass, stiffness, damping, etc. of the acceleration sensing device, the effect may be equivalent to changing the value of Q of the first resonance peak of the sensing device including the sensing element 400 relative to the value of Q of the acceleration sensing device not connected with the first resonance system 210 or the second resonance system 260 (e.g., the value of Q may decrease). In some embodiments, the existence of the first resonance system 210 or the second resonance system 260 may suppress a resonance peak corresponding to the acceleration sensing device in the sensing device, so that the value of Q at the resonance peak in the frequency response curve may be relatively low, and the frequency response curve may be flatter in the required frequency band (e.g., a medium and low frequency, a medium frequency, etc.).

At the same time, the first resonance system 210 or the second resonance system 260 may reduce external impacts on the sensing element 400 to protect the sensing element 400. For example, if the liquid or the liquid and bubbles are introduced into the cavity of the housing 110, the first resonance system 210 or the second resonance system 260 may improve the impact resistance reliability of the sensing device including the sensing element 400 when receiving the external impact load. Specifically, due to the viscosity of the liquid and the large compressibility of the gas, part of the impact energy may be absorbed and consumed, which may greatly reduce the impact load on the sensing element 400. Therefore, the sensing element 400 may be protected and the working life may be extended. In addition, the sensing element 400 may be often deformed due to stress during processing. By injecting the liquid and bubbles into the chamber, the gravity, the surface tension, and viscosity of the liquid may be used to correct the deformation of the acceleration sensing device, making the deformation of the sensing device smaller, the output more stable and closer to the design effect.

In some embodiments, by adjusting parameters of the acceleration sensing device (e.g., the internal structure, the size, the stiffness of the housing 110 and/or the mass, the size, the stiffness of the sensing element 400) and/or parameters of the substance/structure forming the at least one resonant system (e.g., the size, the mass, the stiffness and elasticity of the elastic rod, the type, the density, the viscosity and volume of the liquid, whether to fill the bubbles, and the proportion, the size, the position and quantity of the bubbles), relevant parameters of the frequency response curve of the sensing device may be changed (e.g., a relationship between the first resonant frequency and the at least one second resonant frequency, a corresponding peak height, the value of Q, a difference and ratio between the first resonant frequency and the second resonant frequency, a ratio between the peak valley value and the peak value of the highest peak, etc.), so as to achieve the purpose of, for example, adjusting the value of Q of the sensing device, improving a sensitivity and reliability of the sensing device, or making an output gain of the sensing device more stable in the required frequency band (e.g., a medium and low frequency).

In some embodiments, a sensitivity difference between a trough between the first resonant frequency and the at least one second resonant frequency and a relatively high peak value of the resonance peaks corresponding to the first resonant frequency and the at least one second resonant frequency may be within a certain range (e.g., 10 dBV, 20 dBV, 30 dBV, etc.), a ratio of the sensitivity difference to the peak value of the higher peak may not be exceed a certain threshold (e.g., 0.05, 0.1, 0.2, etc.). A frequency difference between the first resonant frequency and the at least one second resonant frequency may be within a certain range (for example, 20-3000 Hz, 20-2000 Hz, 50-2000 Hz, 50-1500 Hz, 80-1500 Hz, 100-1500 Hz, etc.) and or a ratio of a difference to the first resonant frequency or the second resonant frequency may be within a certain range (for example, 0.02-0.7, 0.15-0.6), which may make the frequency response curve between the corresponding resonant peaks flatter. The sensitivity improvement of the sensing device including the sensing element 400 within the second resonant frequency may be higher and more stable. For example, the sensitivity may be increased between 10 dBV-60 dBV, 20 dBV-50 dBV, 30 dBV-40 dBV, etc.

In some embodiments, the at least one resonant system may be a liquid including the bubbles. The proportion of the bubbles in the cavity volume may be 5%, 10%, 20%, 30%, 50%, 70%, 95%, and other arbitrary values. The bubbles may be small bubbles (e.g., bubbles accounting for 2%-10% of the cavity volume), small and medium bubbles (e.g., bubbles accounting for 10%-20% of the cavity volume), medium bubbles (e.g., bubbles accounting for 20%-50% of the cavity volume), large bubbles e.g., bubbles accounting for 50%-90% of the cavity volume), etc. The count of bubbles may be 1, 2, 3, 4, or etc. The bubbles may be located at different locations within the cavity (e.g., within the sensing element 400). In some embodiments, the bubble may be located between the first moving electrode and the corresponding first fixing electrode (e.g., 418A and 419A, or 418B and 419B) or between the second moving electrode and the corresponding second fixing electrode (e.g., 418C and 419C, or 418D and 419D). In some embodiments, the bubbles may be attached to the mass element 420 (e.g., an upper surface, a lower surface, and/or a side surface) or the first/second moving electrode provided on the mass element 420 (e.g., an upper surface of the first moving electrode 418A, a lower surface of the first moving electrode 418A, or a side opposite to the first electrode 419A). In some embodiments, the bubbles may be attached to the at least one fixing electrode (e.g., an upper surface the first fixing electrode 419A, a lower surface of the first fixing electrode 419A, or a side opposite to the first moving electrode 418A).

When the bubbles are located at different positions in the cavity (e.g., inside the sensing element 400), the frequency response curves of the sensing device including the sensing element 400 may be different (e.g., a magnitude of the at least one second resonant frequency and a sensitivity of the corresponding peak value may be different). In some embodiments, whether the bubbles is attached to the sensing element 400 (e.g., attached to the at least one moving electrode and/or fixing electrode) or not attached to the sensing element 400 (e.g., located between the first moving electrode 418A and the corresponding first electrode 419A), which both may improve the sensitivity of the sensing device to a certain extent (e.g., 10-60 dBV, 10-40 dBV, 15-40 dBV, etc.) in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz). The size of the lift may be also related to the size and/or position of the bubbles.

In some embodiments, when the bubbles are not attached to the sensing element 400 (e.g., between the first moving electrode 418A and the corresponding first fixing electrode 419A), the sensitivity of the sensing device may increase as the volume of the bubbles increases. Exemplarily, the sensitivity of a sensing device including the small and medium bubbles may be improved by about 5-30 dBV in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) compared with a sensing device including the small bubbles. Compared with a sensing device including the medium and small bubbles, the sensitivity of the sensing device including the medium and small bubbles in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) may be improved by about 5-30 dBV.

FIG. 5A-5D are structure diagrams illustrating an exemplary sensing device 500 according to some embodiments of the present disclosure.

As shown in FIG. 5A-5D, the sensing element 500 may include a substrate 514, a mass element 501 disposed above the substrate 514, and one or more detection capacitors for determining the magnitude of the size of the external acceleration. The substrate 514 may be the same or similar to the substrate in FIGS. 4A and 4B, and may not be described here. The substrate 514 may be provided with a support component (e.g., a support rod, a support spring, a support bracket, etc., which also be referred to as a first support assembly). The support component may be used to support the mass element 501 above the substrate 514. In some embodiment, the support component may be an anchoring portion 502. The anchoring portion 502 may support the mass element 501 above the substrate 514. The mass element 501 may be connected with the support component by an elastic connection unit (e.g., an elastic beam, a spring, etc.). The elastic connecting unit may extend along the first direction. In some embodiments, a center line (along the first direction) of the elastic connection unit may coincide with a center line of the mass element 501 in the first direction. In the second direction, the mass of the parts of the mass element 501 located on two sides of the elastic connection unit may be not equal.

In this embodiment, the elastic connecting unit may be an elastic torsion beam 503. The mass element 501 may be connected with a side wall of the anchoring portion 502 through the elastic torsion beam 503 symmetrically arranged on the two sides, i.e., the two elastic torsion beams 503 may be symmetrically distributed on two sides of the anchoring portion 502. The anchoring portion 502 may be located at a center (e.g., a structure center) of the mass element 501. A center line in a length direction of the elastic torsion beam 503 may coincide with the center line of the mass element 501.

Figure 5A:
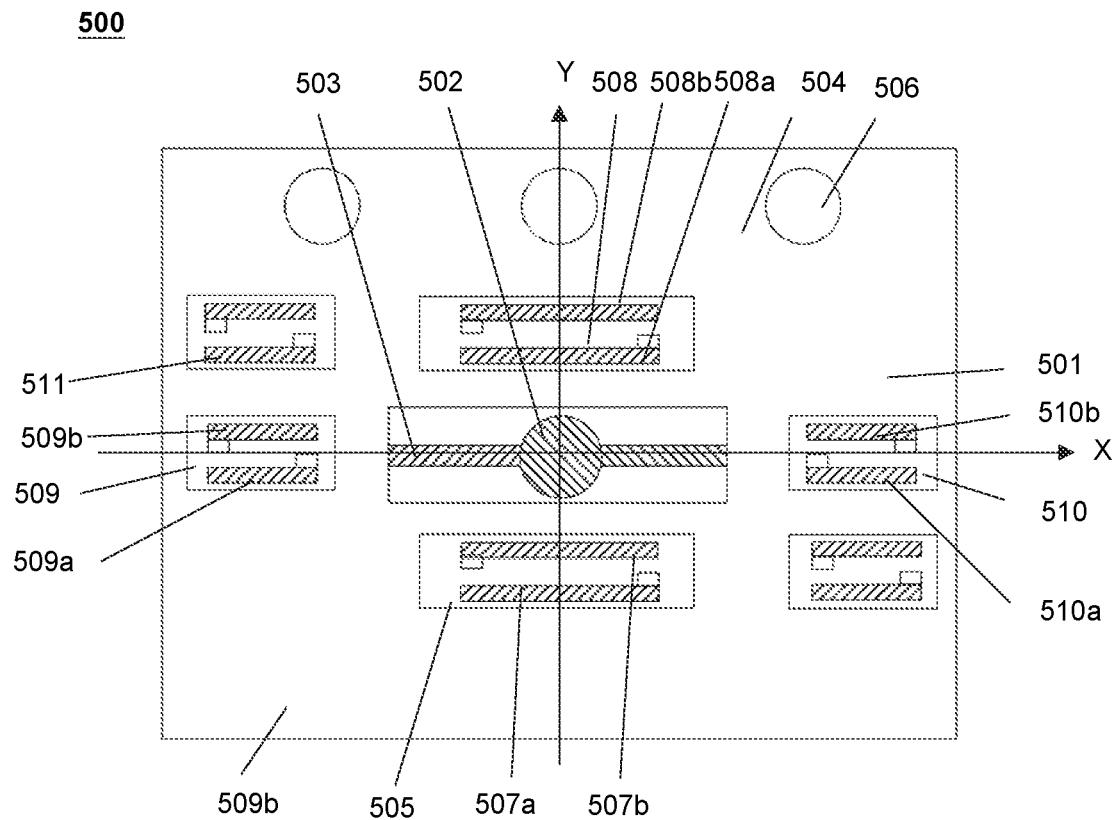
FIG. 5A-5D are structure diagrams illustrating an exemplary sensing device 500 according to some embodiments of the present disclosure.

In order to more clearly explain the structure of the sensing element 500, the first direction (the X-axis direction) may be set as an extension direction of the elastic torsion beam 503 shown in FIG. 5A, the second direction (the Y-axis direction) may be a direction perpendicular to the first direction and located in a plane where the mass element 501 is located, and the third direction (the Z-axis direction) may be a length direction (perpendicular to the X-Y plane) of the anchoring portion 502.

The mass distribution of the mass element 501 may be uneven. In some embodiments, taking the elastic torsion beam 503 as a boundary, the mass of the mass element 501 located on the two sides of the elastic torsion beam 503 may be not equal, i.e., the mass of the mass element 501 located on the two sides of the elastic torsion beam 503 in the Y-axis direction may be not equal. For example, in a view direction of FIG. 5A and bounded by the elastic torsion beam 503, the mass of an upper half and a lower half of the mass element 501 may be not equal.

In a specific embodiment, in order to make the mass located on the two sides of a mass block unequal, one side of the mass element 501 may be provided with a weight reduction hole 506. In some embodiments, the mass element 501 may be provided with the plurality of weight reduction holes 506. The plurality of weight reducing holes may be distributed in a matrix. The weight reducing hole 506 may be a through hole, which may be formed by etching. The weight reduction hole 506 may also be a blind hole and may be etched by setting a mask. In another embodiment, the mass located on the two sides of the mass element 501 may be unequal by adding a counterweight.

For the sensing element 500, the anchoring portion 502 may be located at a structural center of the mass element 501, and a center line in the length direction of the elastic torsion beam 503 may coincide with the center line of the mass element 501. The mass located on the two sides of the mass element 501 may be not equal, and a moment on the two sides of the mass element 501 may be unbalanced. When there is an external acceleration input in the third direction (the Z-axis direction), the mass element 501 may generate a seesaw like motion with the anchoring portion 502 as a fulcrum. When there is an external acceleration input in the first direction (the X-axis direction), since the anchoring portion 502 is located at the structural center of the mass element 501, the center line in the length direction of the elastic torsion beam 503 may coincide with a center line in an X-axis direction of the mass element 501. Moreover, the mass of the mass element 501 located on two sides of an X-axis center line may be not equal, and the mass element 501 may rotate with the anchoring portion 502 as a fulcrum. When there is an external acceleration input in the second direction (the Y-axis direction), since the anchoring portion 502 is located at the structural center of the mass element 501, the center line in the length direction of the elastic torsion beam 503 may coincide with the center line in the X-axis direction of the mass element 501, and the mass element 501 may translate in the Y-axis direction.

In each direction (e.g., the first direction, the second direction, the third direction), the sensing element 500 may include at least one detection capacitor. In this direction, the sensing element 500 may include the at least one moving electrode and the at least one corresponding fixing electrode to form a detection capacitor in the direction to determine the size of the acceleration in the direction. In some embodiments, the sensing element 500 may include at least two first direction fixing electrodes, at least two second direction fixing electrodes, and at least two third direction fixing electrodes arranged on the substrate. The at least two first direction fixing electrodes extend along the second direction, which may be distributed on two sides of the substrate position corresponding to the center line of the mass element 501 along the second direction, and may be axisymmetric with respect to the center line of the second direction or symmetrical with respect to a center of the anchoring portion 502. The at least two second direction fixing electrodes may extend along the first direction, may be located at the center line of the mass element 501 along the second direction, and may be symmetrical with respect to the anchoring portion 502. The third direction fixing electrode may be arranged on two sides of the elastic torsion beam 503. The mass element 501 may be provided with a first direction moving electrode, a second direction moving electrode, and a third direction moving electrode respectively corresponding to the at least two first direction fixing electrodes, at least two second direction fixing electrodes, and at least two third direction fixing electrodes, which may respectively form a first direction detection capacitor, a second direction detection capacitor, and a third direction detection capacitor.

In some embodiments, the at least two first direction fixing electrodes may be not on the center line of the mass element 501 along the first direction. When the two first direction fixing electrodes are located at the center line of the first direction of the mass element 501, the corresponding two first direction detection capacitors may increase or decrease at the same time, and they may not form a differential capacitance structure that may output an acceleration change signal in the first direction. Therefore, each first direction fixing electrode may include two first direction fixing electrode units arranged in parallel. The first direction moving electrode corresponding to the first direction fixing electrode may include two first direction moving electrode units. The two first direction moving electrode units and the two first fixing electrode units may form a first direction differential capacitance structure. The each second direction fixing electrode may include two second direction fixing electrode units arranged in parallel. The second direction moving electrode corresponding to the second direction fixing electrode may include two second direction moving electrode units. The two second direction moving electrode units and the two second direction fixed electrode units may form a second direction differential capacitance structure.

In other embodiments, the at least two first direction fixing electrodes may be located at the center line of the mass element 501 along the first direction. Therefore, the each first direction fixing electrode may include two first direction fixing electrode units arranged in parallel. The first direction moving electrode corresponding to the first direction fixing electrode may include two first direction moving electrode units. The two first direction moving electrode units and the two first fixing electrode units may form a first direction differential capacitance structure. The each second direction fixing electrode may include two second direction fixing electrode units arranged in parallel. The second direction moving electrode corresponding to the second direction fixing electrode may include two second direction moving electrode units. The two second direction moving electrode units and the two second direction fixing electrode units may form a second direction differential capacitance structure. Different from the fact that the at least two first direction fixing electrodes are not on the center line of the mass element along the first direction, when the at least two first direction fixing electrodes are on the center line of the mass element along the first direction, the first direction fixing electrode unit located on one side of at least one of the at least two first direction fixing electrodes may be electrically connected with the first direction fixing electrode unit on an opposite side of the other first direction fixing electrode that is axisymmetric along the center line of the mass element along the second direction.

Figure 5B:
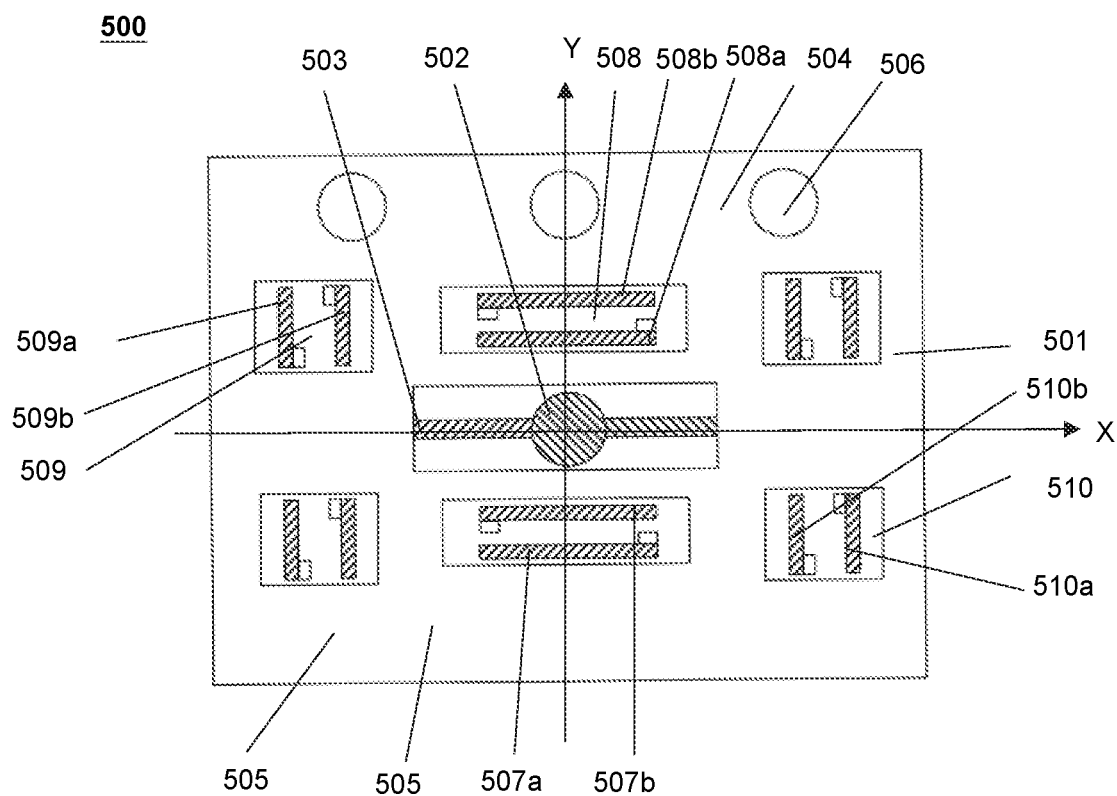
Figure 5C:
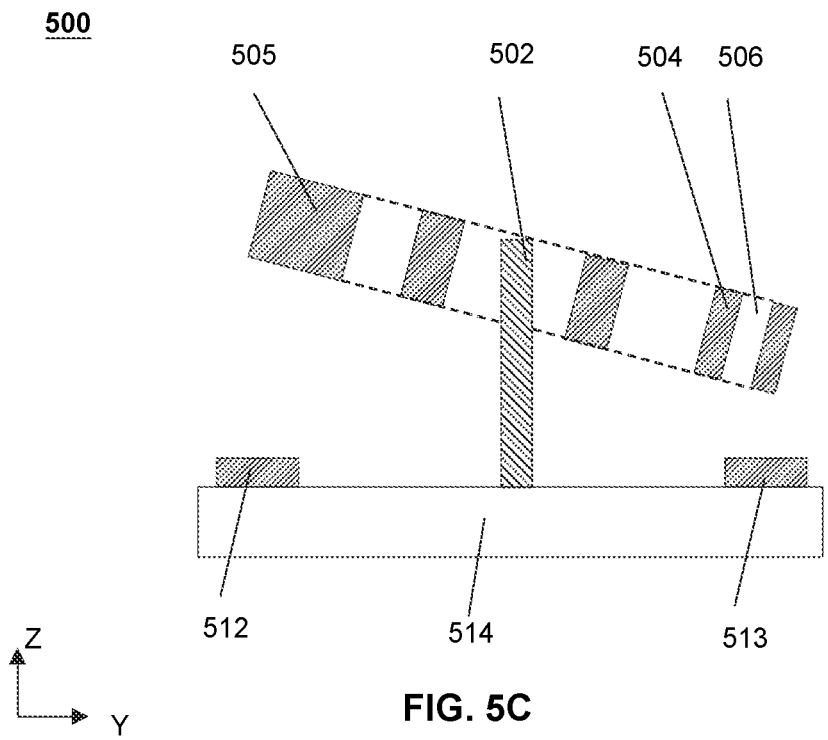
Figure 5D:
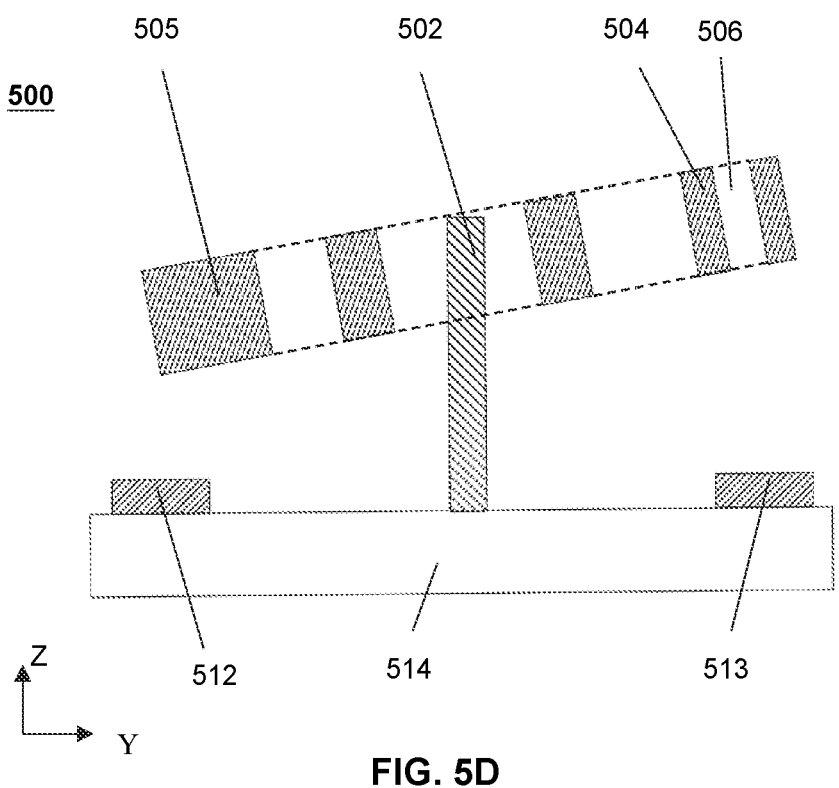

For example, as shown in FIGS. 5C and 5D, the substrate 514 may be provided with a third direction fixing electrode 513 and a third direction fixing electrode 512 distributed on the two sides of the elastic torsion beam 503. Accordingly, the mass element 501 may be provided with a third direction moving electrode 504 and a third direction moving electrode 505. The third direction moving electrodes 504 and 505 may form different third direction detection capacitors with the third direction fixing electrodes 513 and 512, respectively. The third direction fixing electrodes 513 and 512 may be capacitor plate structures well known to those skilled in the art, which may be fixed to the substrate 514. The third direction moving electrodes 504 and 505 may also be capacitor plate structures well known to those skilled in the art. In some embodiments, the third direction moving electrodes 504 and 505 may be part of the mass element 501. For example, the third direction moving electrodes 504 and 505 may be side walls on opposite sides of the mass element 501.

In a specific embodiment, the third direction fixing electrodes 513 and 512 may be lower electrodes of the third direction detection capacitor respectively, and the third direction moving electrodes 504 and 505 may be located at a lower end face of an edge position of the mass element 501 as upper electrodes of the third direction detection capacitor. The third direction fixing electrodes 513 and 512 may be symmetrical with respect to the elastic torsion beam 503 in the Y-axis direction, so that the two third direction detection capacitors may form a differential capacitance structure.

When there is an external acceleration input in the third direction (i.e., the Z-axis direction), for example, referring to the view direction of FIG. 5C, when there is a downward acceleration input, due to the unequal mass on the two sides of the mass element 501, a distance between the third direction moving electrode 504 and the third direction fixing electrode 513 on the side provided with the weight reduction hole 506 may become smaller, and a distance between the third direction moving electrode 505 and the third direction fixing electrode 512 on the heavier side may become larger, so that capacitance of the third direction detection capacitor composed of the third direction moving electrode 504 and the third direction fixing electrode 513 may become larger, and capacitance of the third direction detection capacitor composed of the third direction moving electrode 505 and the third direction fixing electrode 512 may become smaller. Therefore, the two third direction detection capacitors may form a third direction differential capacitance structure.

On the contrary, referring to the view direction of FIG. 5D, when there is an upward acceleration input, due to the mass on the two sides of the mass element 501 are not equal, a distance between the third direction moving electrode 504 and the third direction fixing electrode 513 on the side provided with the weight reduction hole 506 may become larger, and a distance between the third direction moving electrode 505 and the third direction fixing electrode 512 on the heavier side may become smaller, so capacitance of the third direction detection capacitor composed of the third direction moving electrode 504 and the third direction fixing electrode 513 may become smaller, and capacitance of the third direction detection capacitor composed of the third direction moving electrode 505 and the third direction fixing electrode 512 may become larger. Therefore, the two third direction detection capacitors may form a third direction differential capacitance structure.

In a specific embodiment, referring to FIGS. 5a, 5C and 5D, the weight reduction hole 506 may be arranged on the mass element 501 at the position of the moving electrode 504 in the third direction, so that a mass difference on the two sides of the mass element 501 may be large, a deflection amplitude of the mass element 501 and the sensitivity of the third direction detection capacitor may be improved. Since the weight reduction hole 506 is arranged at the position of the third direction moving electrode 504, the area facing the third direction moving electrode 504 and the third direction fixing electrode 513 may be reduced. In order to ensure the consistency of the above two third direction detection capacitors, a process hole corresponding to the weight reduction hole 506 on the third direction moving electrode 504 may be set on the third direction fixing electrode 512, so that positive opposite area of the third direction moving electrode 504 and the third direction fixing electrode 513 may be consistent with positive opposite area of the third direction moving electrode 505 and the third direction fixing electrode 512, i.e., the consistency of the above two third direction detection capacitors may be ensured.

As shown in FIGS. 5A and 5b, a second direction fixing electrode 508 and a second direction fixing electrode 507 may be also disposed on the substrate 514, respectively. The second direction fixing electrodes 508 and 507 may be located at a center line of the Y-axis of the mass element 501 and may be symmetrically distributed on the two sides of the anchoring portion 502; accordingly, the mass element 501 may be provided with two moving electrodes in the second direction. The two second direction moving electrodes and the second direction fixing electrodes 508 and 507 may form two second direction detection capacitors. The second direction fixing electrodes 508 and 507 may adopt a capacitor plate mechanism well known to those skilled in the art, which may be fixed on the substrate 514; the above-mentioned two second direction moving electrodes may also adopt a capacitor plate mechanism well known to those skilled in the art. In some embodiments, the above-mentioned two second direction moving electrodes may be a part of the mass element 501, for example, the above-mentioned two second direction moving electrodes may be the side walls of the mass element 501. In a specific embodiment, corresponding positions on the mass element 501 may be provided with a plurality of hollow matching holes 511, and the second direction fixing electrodes 508 and 507 may be extended into the matching holes 511. A side wall of the matching hole 511 may be used as a moving electrode to form two second direction detection capacitors with the second direction fixing electrodes 508 and 507 respectively, thereby improving temperature characteristics of a chip and an ability to resist external interference.

The second direction fixing electrodes 508 and 507 may extend along the first direction (i.e., the X-axis direction) and may be parallel to the elastic torsion beam 503. When there is an external acceleration input in the second direction (i.e., the Y-axis direction), the mass element 501 may be translational in the Y-axis direction due to an action of the elastic torsion beam, thus, a distance between the second direction fixing electrode 508 and the corresponding second direction moving electrode may increase or decrease, while a distance between the second direction fixing electrode 507 and the corresponding second direction moving electrode may decrease or increase, so that the two second direction detection capacitors may form a second direction differential capacitance structure.

For the second direction fixing electrodes 508 and 507, when there is an external acceleration input in the first direction (i.e., the X-axis direction), the mass element 501 may rotate clockwise or counterclockwise with the anchoring portion 502 as a fulcrum, thus, a distance between the second direction fixing electrode 508 and the corresponding second direction moving electrode and a distance between the second direction fixing electrode 507 and the corresponding second direction moving electrode may increase or decrease at the same time, and the amount of change may be the same, through the differential capacitance structure, the changing signal may be differentiated, at this time, the second direction differential capacitance structure composed of the two second direction detection capacitors may not output the changed capacitance signal, so as to prevent the second direction detection capacitor from outputting the acceleration signal in the first direction.

In some embodiments, the second direction fixing electrode 508 may include a second fixing electrode unit 508a and a second fixing electrode unit 508b arranged in parallel. The second fixing electrode units 508a and 508b may be fixed on the substrate 514 and extend into the matching hole 511 formed on the mass element 501. Two side walls opposite to the matching hole 511 may be used as the moving electrode units of the moving electrode in the second direction, and form a pair of differential capacitance structures with the second fixing electrode units 508a and 508b to further improve a detection accuracy of a Y-axis acceleration signal. Based on the same principle, the second direction fixing electrode 507 may include a second fixing electrode unit 507a and a second fixing electrode unit 507b arranged in parallel. The second fixing electrode units 507a and 507b may be fixed on the substrate 514 and extend into the matching hole 511 formed on the mass element 501. The two side walls opposite to the matching hole 511 may be used as the moving electrode units of the moving electrode in the second direction, and form a pair of differential capacitance structures with the second fixing electrode units 507a and 507b to further improve the detection accuracy of the Y-axis acceleration signal.

The substrate 514 may be also provided with a first direction fixing electrode 509 and a first direction fixing electrode 510. Accordingly, the mass element 501 may be provided with the two first direction moving electrodes. The two first direction moving electrodes and the first direction fixing electrodes 509 and 510 may form two first direction detection capacitors. The first direction fixing electrodes 509 and 510 may be capacitor plate structures well known to those skilled in the art, which may be fixed on the substrate 514 through an anchor point. The first direction fixing electrode 509 and the corresponding first direction moving electrode may form a side capacitive first direction detection capacitor, and the first direction fixing electrode 510 and the corresponding first direction moving electrode may also form a side capacitive first direction detection capacitor. The two first direction detection capacitors may also be upper and lower plate type capacitor structures. In some embodiments, the two first direction moving electrodes may be the side walls of the mass element 501. A corresponding position on the mass element 501 may be provided with a hollow matching hole 511. The first direction fixing electrodes 509 and 510 may be fixed on the substrate 514 and extend into the corresponding matching hole 511. At this time, a hole wall of the matching hole 511 may be used as the first direction moving electrode to form two first direction detection capacitors with the first direction fixing electrodes 509 and 510, thereby improving the temperature characteristics of the chip and the ability to resist external interference.

In a specific embodiment, referring to FIG. 5b, the first direction fixing electrodes 509 and 510 may extend along the Y-axis direction, i.e., a length direction of the first direction fixing electrodes 509 and 510 may be in the Y-axis direction. When there is an external acceleration input in the second direction (i.e., the Y-axis direction), the mass element 501 may be translational in the Y-axis direction, a distance and relative area between the first direction fixing electrode 509 and the corresponding first direction moving electrode may not change, and a distance and relative area between the first direction fixing electrode 510 and the corresponding first direction moving electrode may not change, that is, the two first direction detection capacitors may not output the capacitance change signal, so as to prevent the first direction detection capacitor from outputting the Y-axis acceleration signal.

The first direction fixing electrodes 509 and 510 may be axisymmetric with respect to a center line in the Y-axis direction of the mass element 501 or may be symmetric with respect to the anchoring portion 502. When there is an external acceleration input in the first direction (i.e., the X-axis direction), the mass element 501 may rotate clockwise or counterclockwise with the anchoring portion 502 as a fulcrum, so that the distance between the first direction fixing electrode 509 and the corresponding first direction moving electrode may increase or decrease, the distance between the first direction fixing electrode 510 and the corresponding first direction moving electrode may increase or decrease, so that the two first direction detection capacitors may jointly form a differential capacitance structure in the first direction. The first direction fixing electrodes 509 and 510 may not be set on the center line in the X-axis direction of the mass element 501. Since when the two first direction fixing electrodes 509 and 510 are located at the center line in the X-axis direction of the mass element 501, the corresponding two first direction detection capacitors may increase or decrease at the same time, and the first direction fixing electrodes 509 and 510 may not form a differential capacitance structure that may output the acceleration change signal in the X-axis direction.

In some embodiments, referring to FIG. 5B, the first direction fixing electrode 509 may include a first fixing electrode unit 509a and a first fixing electrode unit 509v arranged in parallel. The first fixing electrode units 509a and 509b may be fixed on the substrate and extend into the matching hole 511 formed on the mass element 501. The two side walls opposite to the matching hole 511 may be used as the moving electrode units of the moving electrode in the first direction, and form a pair of differential capacitance structures with the first fixing electrode units 509A and 509B, further improving the detection accuracy of the X-axis acceleration signal. Based on the same principle, the first direction fixing electrode 510 may include a first fixing electrode unit 510a and a first fixing electrode unit 510b arranged in parallel. The first fixing electrode units 510a and 510b may be fixed on the substrate 514 and extend into another matching hole 511 formed on the mass element 501. The two side walls opposite to the matching hole 511 may be used as the moving electrode units of the first direction moving electrode, and form a pair of differential capacitance structures with the first fixing electrode units 510a and 510b, further improving the detection accuracy of the X-axis acceleration signal.

In another embodiment, referring to FIG. 5A, the first direction fixing electrodes 509 and 510 may extend along the X-axis direction. The first direction fixing electrodes 509 and 510 may be symmetrically distributed on two sides of a Y-axis center line of the mass element 501, or on the two sides of the Y-axis center line of the mass element 501 and symmetrically with respect to the anchoring portion 502. When the mass element 501 rotates clockwise or counterclockwise with the anchoring portion 502 as a fulcrum, capacitance changes of the detection capacitors in the two first directions may be completely opposite, which may form a first direction differential capacitance structure together.

Further, the first direction fixing electrodes 509 and 510 may be located at the center line of the X-axis of the mass element 501 and may be symmetrical with respect to a center line of the anchoring portion 502, so that when subjected to an acceleration in the X-axis direction, capacitance changes of the detection capacitors in the two first directions may be the same. In some embodiment, the first direction fixing electrode 509 may adopt a structure of the first fixing electrode units 509a and 509b, and the first direction fixing electrode 510 may also adopt a structure of the first fixing electrode units 510a and 510b. At the same time, the first fixing electrode unit 509a or 509b on one side of the first direction fixing electrode 509 may be connected with the first fixing electrode unit 510a or 5106 on an opposite side of the first direction fixing electrode 510.

Referring to the view direction of FIG. 5A, the first fixing electrode units 509a and 509b may extend along the X-axis direction, wherein the first fixing electrode unit 509a may be located on a lower side, and the first fixing electrode unit 509b may be located on an upper side; the first fixing electrode units 510a and 510b may extend along the X-axis direction, wherein the first fixing electrode unit 510a may be located on a lower side and the first fixing electrode unit 510b may be located on an upper side. At this time, it is necessary to connect the first fixing electrode unit 509b with the first fixing electrode unit 510a, and connect the first fixing electrode unit 509a with the first fixing electrode unit 510b, so that a first direction differential capacitance structure may be composed of the first fixing electrode unit 509b, a moving electrode unit corresponding to the first fixing electrode unit 509b, the first fixing electrode unit 510a, and a moving electrode unit corresponding to the first electrode unit 510a, and another first direction differential capacitance structure may be composed of the first fixing electrode unit 509a, the moving electrode unit corresponding to the first fixing electrode unit 509a, the first fixing electrode unit 510b, and the moving electrode unit corresponding to the first fixing electrode unit 510b. When there is an external acceleration input in the second direction (i.e., the Y-axis direction), the mass element 501 may be translational in the Y-axis direction, and a distance between the first fixing electrode unit 509b and the moving electrode unit corresponding to the first fixing electrode unit 509b may increase or decrease, a distance between the first fixing electrode unit 510a and a moving electrode unit corresponding to the first fixing electrode unit 510a may increase or decrease, and the amount of change may be the same, through the differential capacitance structure, the changing signal may be differentiated. Based on the same principle, the differential capacitance composed of the first fixing electrode unit 509a, a moving electrode unit corresponding to the first fixing electrode unit 509a, the first fixing electrode unit 510b, and a moving electrode unit corresponding to the first electrode unit 510b may also differentiate the capacitance signal that may change at this time, so as to prevent a detection capacitor in the first direction from outputting the Y-axis acceleration signal.

The sensing element 500 may integrate a three-dimensional acceleration detection structure on a single structure, and a structure center may be an anchor point of a moving mass element 501, the mass element 501 may be connected with the anchor point through the elastic torsion beam 503, so that the mass element 501 may be displaced in various dimensions with the input of the acceleration, so as to realize a detection of acceleration signals in various directions. When there is an acceleration input in the first direction, the mass element 501 may rotate around the anchor point to detect the acceleration in the X-axis direction; when there is an acceleration input in the second direction, the mass element 501 may undergo translational motion in the Y-axis direction to detect the acceleration in the Y-axis direction; when there is an acceleration input in the third direction, the mass element 501 may be twisted in the X-axis direction around the elastic beam 503 to realize the detection of the acceleration in the Z-axis direction.

By coupling the at least one resonant system to the acceleration sensing device (e.g., between the housing 110 and the sensing element 500), a sensing device (e.g., the sensing device 200 or 250) may be constructed. The at least one resonance system may include the first resonance system 210 shown in FIGS. 2A and 2B or the second resonance system 260 shown in FIGS. 2C and 2D.

In some embodiments, the first resonant system 210 and the second resonant system 260 may include liquid. Exemplarily, the first resonant system 210 may include a liquid having a specific density and viscosity. For example, the liquid may be a silicone oil with a density of 0.94 kg/m$^3$, and a kinematic viscosity of the silicone oil be 0.5 cst, 1 cst, 5 cst, 10 cst, 100 cst, 200 cst, 1000 cst, etc. The liquid may be equivalent to a spring (Km4)-mass (Mm4)-damping (Rm4) system. By filling the cavity of the acceleration sensing device with the liquid, so that the sensing element 500 may be completely immersed in the liquid, the first resonance system 210 may be coupled to the sensing element 500. The second resonance system 210 may be liquid including the air bubbles, for example, silicone oil including the air bubbles, wherein a proportion of the air bubbles to the volume of the cavity may be any value between 5% and 95%. The count of bubbles may be 1, 2, 3, 4, or etc. The liquid may be equivalent to a spring (Km4)-mass (Mm4)-damping (Rm4) system, and the air bubbles may be equivalent to a spring (Km3) and damping (Rm3) system. By partially filling the cavity of the acceleration sensing device with the liquid, the air bubbles may be partially filled the cavity of the acceleration sensing device (e.g., air bubbles formed by air not expelled from the cavity when filling liquid, air bubbles formed by air pockets, and/or air bubbles formed by applying a hydrophobic coating to the sensing element 500), the sensing element 500 may be at least partially immersed in the liquid, thereby realizing the coupling of the second resonant system 260 with the sensing element 500.

In some embodiments, the first resonant system 210 and the second resonant system 260 may include elastic structures. Exemplarily, the first resonance system 210 may be an elastic structure with a certain mass (e.g., an elastic rod, an elastic sheet, an elastic block, an elastic net, etc.), or a combination of a lightweight elastic structure and a mass element. The elastic structure with a certain mass or the combination of the lightweight elastic structure and the mass element may be equivalent to a spring (Km4)-mass (Mm4)-damping (Rm4) system. The two ends of the elastic structure may be respectively connected between the housing 110 and the sensing element 500 (e.g., one or more positions on the mass element 501), so that the coupling between the first resonance system 210 and the sensing element 500 may be realized. The second resonant system 260 may be a combination of the lightweight elastic rod and/or the spring and a relatively large mass elastic rod. The elastic rod with a relatively large mass may be equivalent to a spring (Km4)-mass (Mm4)-damping (Rm4) system. The lightweight elastic rod and/or the spring may be equivalent to a spring (Km3) and damping (Rm3) system. The two ends of the elastic rod and/or the spring may be fixedly connected between the housing 110 and the sensing element 500 (e.g., one or more positions on the mass element 501), respectively, so that the second resonance system 260 may be coupled to the sensing element 500.

Due to the existence of the second resonance frequency corresponding to the first resonance system 210 or the second resonance system 260, the frequency response curve of the sensing device including the sensing element 500 may be improved in a specific frequency band (e.g., a low frequency, a medium and low frequency, a medium and high frequency and/or high frequency), so that the sensitivity of the sensing device may be improved compared with the acceleration sensing device without the first resonance system 210 or the second resonance system 260. In addition, since the first resonant system 210 or the second resonant system 260 acts on the sensing element 500, the vibration characteristics of the acceleration sensing device may be changed compared with the vibration characteristics of the acceleration sensing device without the first resonant system 210. Specifically, the first resonant system 210 or the second resonant system 260 acts on the sensing element 500 and may affect the mass, stiffness, damping, etc. of the acceleration sensing device, the effect may be equivalent to changing the value of Q of the first resonance peak of the sensing device including the sensing element 500 relative to the value of Q of the acceleration sensing device not connected with the first resonance system 210 or the second resonance system 260 (e.g., the value of Q may decrease). In some embodiments, the existence of the first resonance system 210 or the second resonance system 260 may suppress a resonance peak corresponding to the acceleration sensing device in the sensing device, so that the value of Q at the resonance peak in the frequency response curve may be relatively low, and the frequency response curve may be flatter in the required frequency band (e.g., a medium and low frequency, a medium frequency, etc.).

At the same time, the first resonance system 210 or the second resonance system 260 may reduce external impacts on the sensing element 500 to protect the sensing element 500. For example, if the liquid or the liquid and bubbles are introduced into the cavity of the housing 110, the first resonance system 210 or the second resonance system 260 may improve the impact resistance reliability of the sensing device including the sensing element 500 when receiving the external impact load. Specifically, due to the viscosity of the liquid and the large compressibility of the gas, part of the impact energy may be absorbed and consumed, which may greatly reduce the impact load on the sensing element 500. Therefore, the sensing element 500 may be protected and the working life may be extended. In addition, the sensing element 500 may be often deformed due to stress during processing. By injecting the liquid and bubbles into the chamber, the gravity, the surface tension, and viscosity of the liquid may be used to correct the deformation of the acceleration sensing device, making the deformation of the sensing device smaller, the output more stable and closer to the design effect.

In some embodiments, by adjusting parameters of the acceleration sensing device (e.g., the internal structure, the size, the stiffness of the housing 110 and/or the mass, the size, the stiffness of the sensing element 500) and/or parameters of the substance/structure forming the at least one resonant system (e.g., the size, the mass, the stiffness and elasticity of the elastic rod, the type, the density, the viscosity and volume of the liquid, whether to fill the bubbles, and the proportion, the size, the position and quantity of the bubbles), relevant parameters of the frequency response curve of the sensing device may be changed (e.g., a relationship between the first resonant frequency and the at least one second resonant frequency, a corresponding peak height, the value of Q, a difference and ratio between the first resonant frequency and the second resonant frequency, a ratio between the peak valley value and the peak value of the highest peak, etc.), so as to achieve the purpose of, for example, adjusting the value of Q of the sensing device, improving the sensitivity and reliability of the sensing device, or making an output gain of the sensing device more stable in the required frequency band (e.g., a medium and low frequency).

In some embodiments, a sensitivity difference between a trough between the first resonant frequency and the at least one second resonant frequency and a relatively high peak value of the resonance peaks corresponding to the first resonant frequency and the at least one second resonant frequency may be within a certain range (e.g., 10 dBV, 20 dBV, 30 dBV, etc.), a ratio of the sensitivity difference to the peak value of the higher peak may not be exceed a certain threshold (e.g., 0.05, 0.1, 0.2, etc.). A frequency difference between the first resonant frequency and the at least one second resonant frequency may be within a certain range (for example, 20-3000 Hz, 20-2000 Hz, 50-2000 Hz, 50-1500 Hz, 80-1500 Hz, 100-1500 Hz, etc.) and or a ratio of a difference to the first resonant frequency or the second resonant frequency may be within a certain range (for example, 0.02-0.7, 0.15-0.6), which may make the frequency response curve between the corresponding resonant peaks flatter. The sensitivity improvement of the sensing device including the sensing element 500 within the second resonant frequency may be higher and more stable. For example, the sensitivity may be increased between 10 dBV-60 dBV, 20 dBV-50 dBV, 30 dBV-40 dBV, etc.

In some embodiments, the at least one resonant system may be a liquid including the bubbles. The proportion of the bubbles in the cavity volume may be 5%, 10%, 20%, 30%, 50%, 70%, 95%, and other arbitrary values. The bubbles may be small bubbles (e.g., bubbles accounting for 2%-10% of the cavity volume), small and medium bubbles (e.g., bubbles accounting for 10%-20% of the cavity volume), medium bubbles (e.g., bubbles accounting for 20%-50% of the cavity volume), large bubbles e.g., bubbles accounting for 50%-90% of the cavity volume), etc. The count of bubbles may be 1, 2, 3, 4, or etc. The bubbles may be located at different locations within the cavity (e.g., within the sensing element 500). In some embodiments, the bubbles may be located between the first direction moving electrode (e.g., the side wall of the matching hole 511 located at a center line of the mass element 501 along the second direction) and the corresponding first direction fixing electrode (e.g., 509 or 510), between the second direction moving electrode and the corresponding second direction fixing electrode (e.g., 507 and 508), or the third direction moving electrodes and the corresponding third direction fixing electrodes (e.g., 504 and 513, 505 and 512). In some embodiments, the bubbles may be attached with the mass element 520 (e.g., an upper surface, a lower surface, and/or a side surface) or the first/second/third moving electrode provided on the mass element 420 (e.g., a side of the first direction moving electrode opposite to the first direction fixing electrode (e.g., 509 or 510), a side of the second direction moving electrode opposite to the second direction fixing electrode (e.g., 507 or 518), and a side of the third direction moving electrode (e.g., 504 or 505) opposite to the third direction fixing electrode (e.g., 513 or 512)). In some embodiments, the bubbles may be attached with the at least one fixing electrode (e.g., a side of the first direction fixing electrode (e.g., 509 or 510) opposite to the first direction moving electrode, a side of the second direction fixing (e.g., 507 or 518) electrode opposite to the second direction moving electrode, and a side of the third direction fixing electrode (e.g., 513 or 512) opposite to the third direction moving electrode (e.g., 504 or 505)).

When the bubbles are located at different positions in the cavity (e.g., inside the sensing element 500), the frequency response curves of the sensing device including the sensing element 500 may be different (e.g., a magnitude of the at least one second resonant frequency and a sensitivity of the corresponding peak value may be different). In some embodiments, whether the bubbles is attached to the sensing element 500 (e.g., attached to the at least one moving electrode and/or fixing electrode) or not attached to the sensing element 500 (e.g., located between the first direction moving electrode (e.g., the side wall of the matching hole 511)), which both may improve the sensitivity of the sensing device to a certain extent (e.g., 10-60 dBV, 10-40 dBV, 15-40 dBV, etc.) in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz). The size of the lift may be also related to the size and/or position of the bubbles.

In some embodiments, when the bubbles are not attached to the sensing element 500 (e.g., between the first direction moving electrode (e.g., the side wall of the matching hole 511) and the corresponding first direction fixing electrode (e.g., 509 or 510), the sensitivity of the sensing device may increase as the volume of the bubbles increases. Exemplarily, the sensitivity of a sensing device including the small and medium bubbles may be improved by about 5-30 dBV in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) compared with a sensing device including the small bubbles. Compared with a sensing device including the medium and small bubbles, the sensitivity of the sensing device including the medium and small bubbles in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) may be improved by about 5-30 dBV.

FIG. 6A-6E are structure diagrams illustrating an exemplary sensing device 600 according to some embodiments of the present disclosure.

Figure 6A:
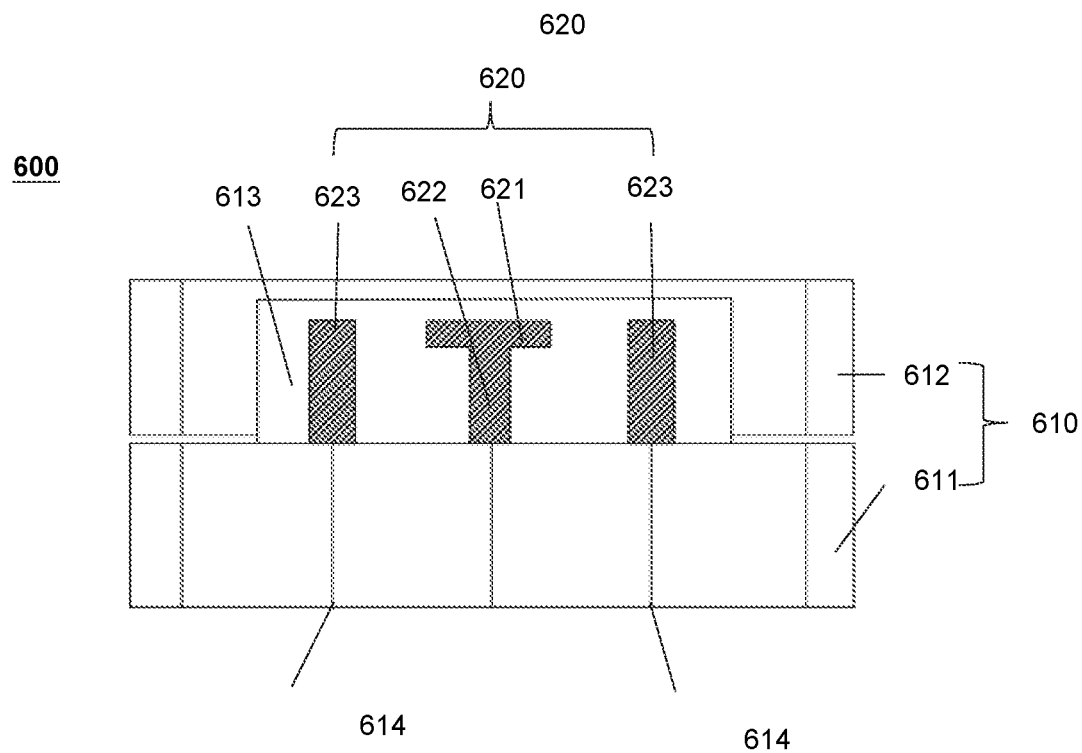
FIG. 6A-6E are structure diagrams illustrating an exemplary sensing device 600 according to some embodiments of the present disclosure.

The sensing element 600 may include a substrate 611 and a detection assembly 620 disposed on the substrate (e.g., a mass element, at least one moving electrode arranged on the mass element, and at least one fixing electrode fixed on the substrate). The substrate 611 may be the same as or similar to the substrate in FIGS. 4A-5D, and may not be repeated here. As shown in FIG. 6A, the detection assembly 620 may include a mass element 621, a support component (e.g., a support rod, a support spring, a support bracket, etc., also be referred to as a second support component), and a coupling member 623. In this embodiment, the support member may include a support rod 622. The mass element 621 may be connected with the substrate 611 through the support rod 622.

The mass element 621 may be a circular, a polygonal, or the like. In some embodiments, when the mass element 621 is a polygon, the count of sides of the mass element may be greater than or equal to 4, for example, the mass element 621 may be a pentagon, a hexagon, an octagon, or the like. The support rod 622 may be deformed. For example, the support rods 622 may be an elongated cylindrical or a prismatic shape. Under an action of external acceleration or external force, the support rod 622 may be elastically deformed. In some embodiments, a central position of the mass element 621 may be connected with one end of the support rod 622. The coupling member 623 may be connected with the substrate and surround the mass element 621. A gap may be provided between the coupling member 623 and the mass element 621. In some embodiments, widths of the gaps may be equal everywhere. In some embodiments, the widths of the gaps may not be equal in at least one direction. The coupling member 623 and the mass element 621 may form at least one detection capacitor. Assuming that the sensing element 600 is placed on a horizontal plane, if the sensing element 600 moves horizontally, the support rod 622 may be subjected to an external force corresponding to the moving direction, and the support rod 622 may be deformed under the action of the external force, so that the mass element 621 may move relative to the substrate 611 and the coupling member 623, resulting in a change in a distance between the mass element 621 and the coupling member 623, thereby changing the capacitance in the moving direction. According to the change of the capacitance, the acceleration in the moving direction may be determined. In some embodiments, the materials of the components in the detection assembly 620 may be a siliceous material doped with other elements. For example, the material of the each component in the detection assembly 620 may be a boron doped siliceous material. At this time, the entire mass element 621 may be used as a moving electrode, and the coupling member 623 may be used as a fixing electrode. It should be noted that, in some embodiments, the mass element 621 may also include a conductive layer (e.g., conductive layers provided on the upper and lower surfaces of the mass element 121) to form a moving electrode. Similarly, the coupling member 623 may also include a conductive layer to form a fixing electrode.

Figure 6B:
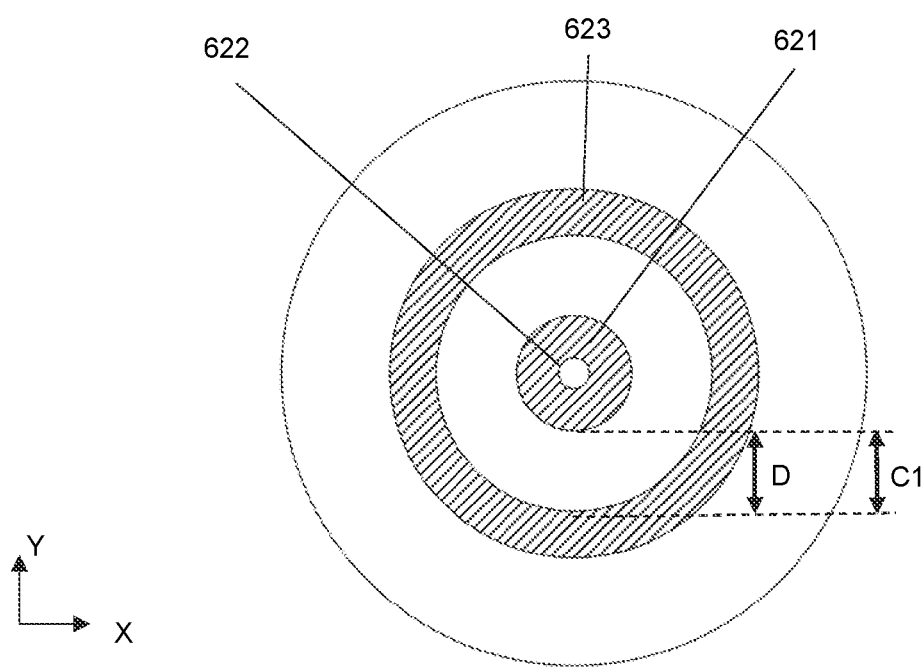

In some embodiments, a width of gaps between the coupling member 623 and the mass element 621 may be equal everywhere. At this time, a shape of the coupling member 623 may be the same as a shape of the mass element 621, and a shape of an inner wall of the coupling member may be the same as a shape of an outer wall of the mass element 621. Exemplarily, as shown in FIG. 6B, the mass element 621 may be a circle, and the coupling member 623 may be a ring concentric with a circle. In other embodiments, the mass element 621 may be a hexagonal. At this time, the inner wall of the coupling member 623 may be a hexagonal, and an edge of an inner wall of the coupling member 623 may be parallel to an edge of an outer wall of the mass element 621.

In some embodiments, the substrate 611 may be provided with a plurality of through holes. A conductive element 614 may be provided in the through hole for connecting each component of the detection assembly 620 with an external circuit (e.g., an integrated chip, etc.). The conductive element 614 may be a metal filled in the through hole, a wire filled in the through hole, or the like. Since the detection assembly 620 is made of boron silicon, the conductive element 614 may be electrically connected with the coupling member 623 and the support rod 622. The support rod 622 may be further electrically connected with the mass element 621. The coupling member 623 and the support rod 622 may be energized by a power supply, so that the coupling member 623 and the mass element 621 may form a detection capacitor.

Referring to FIG. 6B, when there is an external acceleration input in the Y-axis, the acceleration may denote ay. The coupling member 623 may be fixedly connected with the substrate 611. Since the mass of the mass element 621 is large, and the support rod 622 may be elastically deformed and bent to a certain extent under an influence of inertia, resulting in a decrease in a distance d between the mass element 621 and the coupling member 623 in an acceleration direction. When a distance between the mass element 621 as a moving electrode and the coupling member 623 as a fixing electrode decreases, a capacitor C1 of the detection capacitor may increase. A size of the capacitor C1 may be inversely proportional to the distance d between the mass element 621 and the coupling member 623. The acceleration may be determined by measuring the capacitor C1. Based on the above manners, the acceleration ax in the X-axis direction and an acceleration A45° in a 45° angle with the X-axis may be measured. Since the mass element 621 is a circular structure, the acceleration in any direction may be measured to achieve 360° all-round measurement. When the mass element 621 is a polygon and the count of sides of the polygon is greater than or equal to four, the sensing element 600 may detect an acceleration in more than four directions, for example, if the mass block is a pentagon, the sensing element 600 may detect an acceleration in five directions.

Figure 6C:
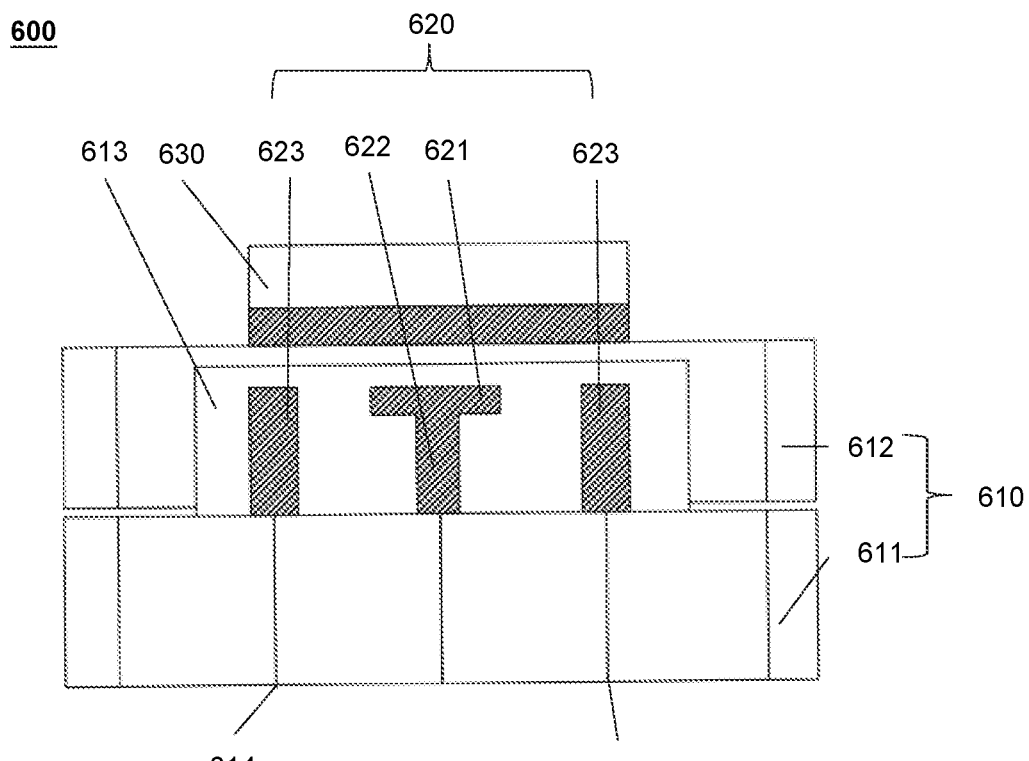

The sensing element 600 may be accommodated in a cavity formed by the housing. The housing 610 may include an upper housing 612 and a substrate 611. In some embodiments, both the upper housing 612 and the substrate 611 may be silicon substrates. The upper housing 612 and the substrate 611 may enclose to form a first cavity 613. In some embodiments, the housing 610 may also provided with an external circuit, for example, an integrated chip. The integrated chip may be electrically connected with the support rod 622 and the coupling member 623 respectively. The integrated chip may calculate a capacitance between the mass element 621 and the coupling member 623. The integrated chip may be arranged on an outer surface of the upper housing 612. Referring to FIG. 6C, the integrated chip 630 may be arranged on the outer surface of the upper housing 612. The integrated chip 630 may be electrically connected with the support rod 622 and the coupling member 623 through a conductive element 614. The support rod 622 may be further electrically connected with the mass element 621. In this embodiment, the integrated chip 630 may be attached with the upper housing 612, so that a size of the acceleration sensing device may be consistent with a size of the chip, thereby reducing the size of the acceleration sensing device.

Figure 6D:
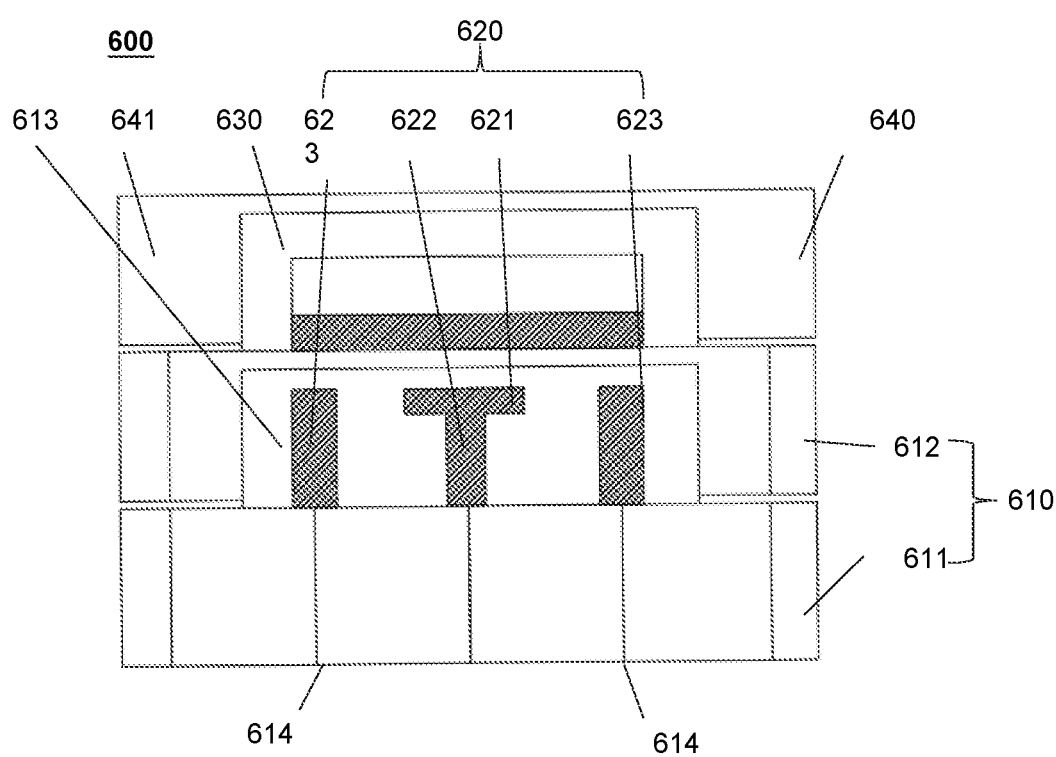

In some embodiments, referring to FIG. 6D, an outside of the acceleration sensing device may be further provided with a cover 640. The cover 640 may be covered on an outer surface of the housing 610, i.e., the cover 640 may be covered on an outer surface of the upper housing 612, thereby forming a second cavity 641 including the integrated chip 630. The cover 640 may be used to protect the integrated chip 630 from external factors. In some embodiments, the cover 640 may be made of silicon. In some embodiments, a material of the cover 640 may also be metal, plastic, or the like.

Figure 6E:
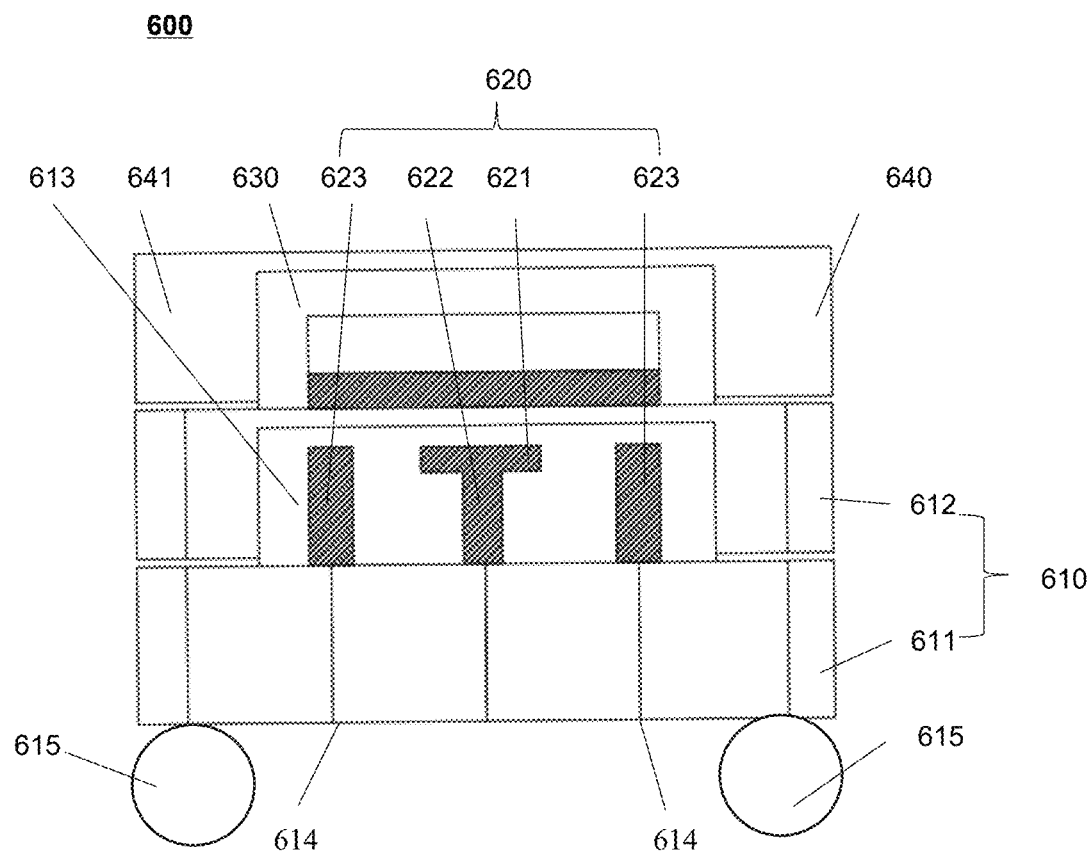

In some embodiments, referring to FIG. 6E, a plurality of pins 615 may be also provided on an outer surface of the substrate 611, each pin 615 may be respectively connected with the conductive element 614, so that the acceleration sensing device may be electrically connected with an external device or an electronic component (e.g., a printed circuit board PCB) through the pin 615.

In some embodiments, the acceleration sensing device and internal components of the acceleration sensing device (e.g., the detection assembly 620) may be cut by a wafer level process. The housing 110 may be square, i.e., a front view of the acceleration sensing device may be square. The acceleration sensing device fabricated by the wafer level process has a relatively small size.

Figure 7B:
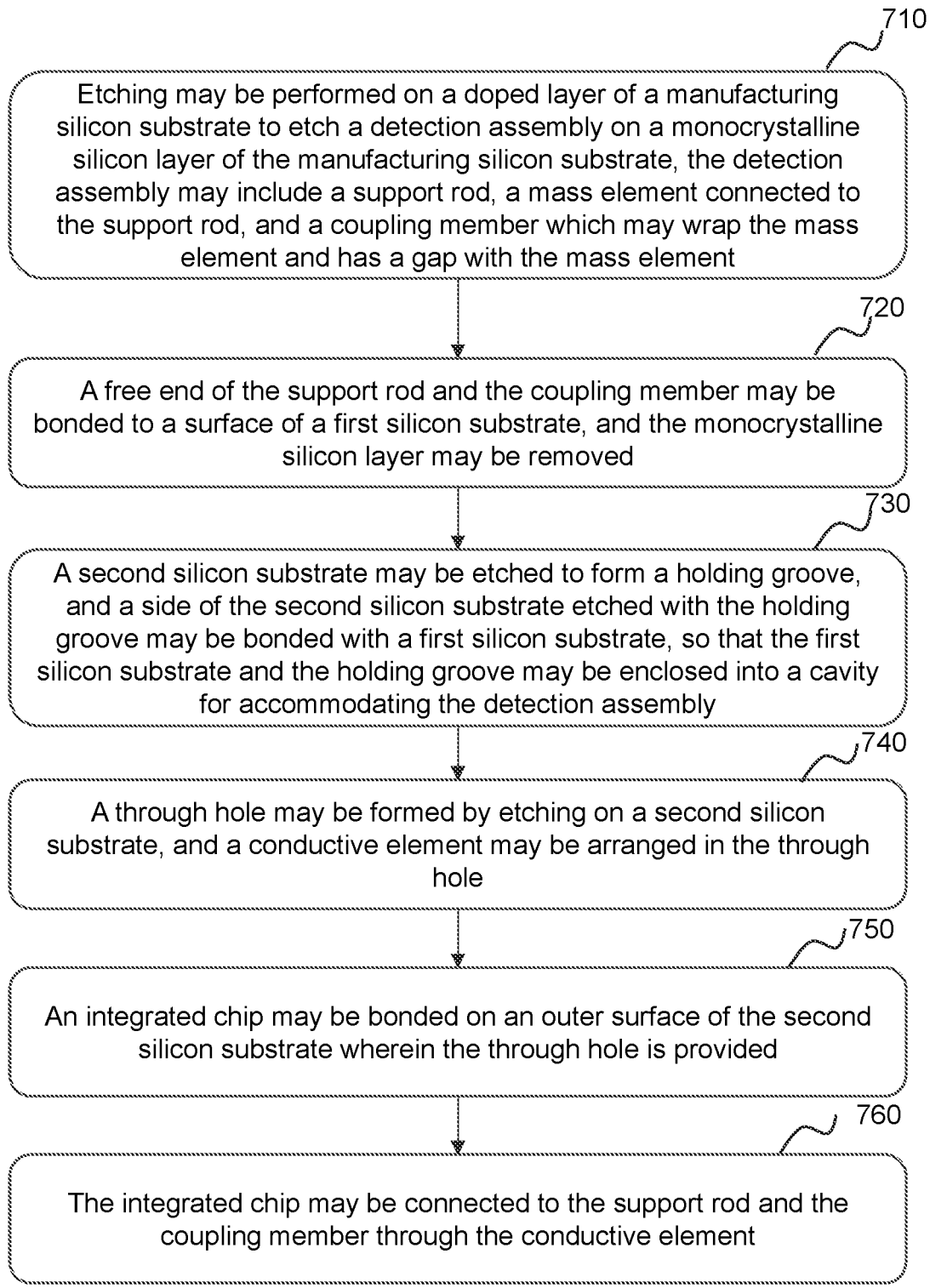
FIG. 7B is a flow diagram illustrating a preparation method of an acceleration sensing device including a sensing element 600 according to other embodiments of the present disclosure.

FIG. 7A is a flow diagram illustrating a preparation method of an acceleration sensing device including a sensing element 600 according to some embodiments of the present disclosure.

In 710, etching may be performed on a doped silicon (e.g., a boron doped silicon) layer of a manufacturing silicon substrate to etch a detection assembly on a monocrystalline silicon layer of the manufacturing silicon substrate, the detection assembly may include a support rod, a mass element connected with the support rod, and a coupling member which may wrap the mass element and has a gap with the mass element.

In some embodiments, widths of the gaps between the mass element and the coupling member may be equal everywhere. The mass element may be a circle or a polygon. When the mass element is a polygon, the count of vertex angles or sides may be greater than or equal to four.

In this embodiment, the manufacturing substrate may include a monocrystalline silicon layer of a first thickness and a doped silicon (e.g., a boron doped silicon) layer of a second thickness. The monocrystalline silicon layer of the first thickness may be used as a substrate; the detection assembly may be etched on the doped silicon layer of the second thickness. For example, the detection assembly may be etched on the doped silicon layer by a deep reactive ion etching technology. Specifically, a manufacturing substrate needs to be prepared first. A process of manufacturing substrate may include: taking a certain thickness of monocrystalline silicon sheet, and then using an ion implantation technology to inject boron ions into the monocrystalline silicon sheet, so that boron ions may be doped between silicon atoms to form a doped silicon layer of a second thickness. A silicon atom layer that is not implanted with the boron ions may be a monocrystalline silicon layer. After preparing a manufacturing substrate, a first mask may be arranged on the manufacturing substrate, and then a deep reactive ion etching technology may be used to etch the doped silicon layer. At the same time, it may be necessary to control a thickness of a corrosion to prevent the doped silicon layer from being etched through. A region where the first mask is arranged may be not etched, so that a coupling member prototype and a support rod may be etched out of the doped silicon layer. Then, a second mask may be arranged on the doped silicon layer that is not etched through. A center of the second mask may be a support rod, and the second mask may be a circular or a polygonal (the count of sides may be greater than or equal to four). The doped silicon layer arranged with the second mask may be etched again, and the doped silicon layer may be etched through, so as to etch the mass element and coupling member connected with a support rod. Since the second mask is a circular or a polygonal, an etched mass element may be also a circular or a polygonal. It should be noted that a solution used to corrode the doped silicon layer may not corrode the monocrystalline silicon layer, thus etching the detection assembly on the monocrystalline silicon layer.

The etched coupling member may wrap around the mass element. There may be a gap between the mass element and the coupling member, and the widths of the gaps may be equal everywhere. Therefore, a shape of the inner wall of the coupling member may be the same as a shape of the outer wall of the mass element. When the shape of the mass element is a circle, the shape of the coupling member may be a ring; when the shape of the mass element is a polygon, the shape of the inner wall of the coupling member may be also a polygon, and an edge of the inner wall of the coupling member may be parallel to an edge of the outer wall of the mass element.

In 720, a free end of the support rod and the coupling member may be bonded to a surface of a first silicon substrate, and the monocrystalline silicon layer may be removed.

After etching the detection assembly, the surface of the first silicon substrate (i.e., a substrate) may be bonded to a free end of the support rod and the coupling member, i.e., a surface of the doped silicon layer may be bonded to a surface of the substrate. Exemplarily, a bonding manner may be bonding, i.e., bonding a surface of the substrate with the support rod and the free end of the coupling member using a silicon-silicon bonding process. Since a high strength of the silicon-silicon bonding, the detection assembly may be firmly connected with the surface of the substrate. It should be noted that, before bonding, a through silicon via technology may be used to provide through holes on the substrate. For example, an etching technique may be used to etch the substrate to form through holes. Positions of the through holes may bond the support rod and the coupling member. The conductive element may be arranged in the through holes, so that the support rod and the coupling member may be respectively connected with the conductive element. When a voltage is applied to the conductive element, the mass element and the coupling member may be made to form a detection capacitor. The conductive element may be a wire, a metal filled in vias, or the like.

After bonding the substrate, the monocrystalline silicon layer may be removed, thereby releasing the detection assembly. The monocrystalline silicon layer may be removed by etching the monocrystalline silicon layer with a sodium hydroxide solution without damaging a detection assembly composed of doped silicon.

In 730, a second silicon substrate may be etched to form a holding groove, and a side of the second silicon substrate etched with the holding groove may be bonded with a first silicon substrate, so that the first silicon substrate and the holding groove may be enclosed into a cavity for accommodating the detection assembly.

The surface of the second silicon substrate (i.e., an upper housing) is etched, so that the holding groove may be etched on a surface of the upper housing. Then, the side of the upper housing etched with the holding groove may be bonded with the first silicon substrate (i.e., the substrate), so that the substrate and the holding groove may be enclosed into a cavity for accommodating the detection assembly. Further, after bonding the substrate and the upper housing, the wiring may be performed on the through holes openings on an outer surface of the substrate, thereby forming a wiring region. Then, a ball-mounting may be performed on the wiring area to form pins, so that the support rod and the coupling member may be connected with a power supply through the pins.

In this embodiment, a plurality of detection assembly may be etched on a manufacturing substrate, i.e., the plurality of acceleration sensing device may be prepared on the substrate, and each detection assembly may be located on a same silicon substrate, so a wafer level process may be used to cut the housing containing the detection assembly to obtain a plurality of square acceleration sensing device. Since the wafer level process is adopted, the wafer level process may be beneficial to mass produce the acceleration sensing device, improve the production efficiency of the acceleration sensing device and reduce the production cost.

The mass element prepared in the present embodiment may be a circular acceleration sensing device different from a traditional single-axis or dual-axis acceleration sensing device, the acceleration sensing device described in this embodiment may realize 360° omnidirectional acceleration measurement, and a placement orientation of the acceleration sensing device may be not limited.

FIG. 7A is a flow diagram illustrating an exemplary process 735 of a preparation method of an acceleration sensing device including a sensing element 600 according to some embodiments of the present disclosure. Combining with a process 705 shown in FIG. 7A, the process 735 after operation 730 may further include operations 740-760.

In 740, a through hole may be formed by etching on a second silicon substrate, and a conductive element may be arranged in the through hole.

In 750, an integrated chip may be bonded on an outer surface of the second silicon substrate wherein the through hole is provided.

In 760, the integrated chip may be connected with the support rod and the coupling member through the conductive element.

In this embodiment, an integrated chip, such as an ASIC (Application Specific Integrated Circuit) chip, may be provided for the acceleration sensing device including a sensing element 600. After the first silicon substrate (i.e., the substrate) and the second silicon substrate (i.e., the upper case) are bonded, the integrated chip may be bonded on an outer surface of the upper housing. The upper housing may be provided with a through hole in advance, a conductive element may be arranged in the through hole, and an integrated chip may be bonded to a position of the through hole, so that the integrated chip may be electrically connected with the support rod and the coupling member through the conductive element provided in the through hole. In some embodiments, the wiring may be performed at the through hole, the integrated chip may be electrically connected with the support rod and the coupling member through the wiring, and then the integrated chip may be bonded to the outer surface of the upper housing. The through holes on the upper housing may be aligned with the through holes of the substrate, so that the conductive element in the through holes of the upper housing may be connected with the conductive element in the throughs hole on the substrate, thus, the integrated chip may be electrically connected with the support rod and the coupling member respectively.

In this embodiment, the integrated chip may measure a capacitance between the coupling member and the mass element, and the size of the acceleration may be obtained through signal amplification, AD conversion, and/or algorithm processing. Information of the acceleration may be sent from the integrated chip, and the information may be transmitted from the pin to the external circuit (e.g., a central processing unit of the device including the acceleration sensing device) through the wiring and through holes on the upper housing, and the wiring and through holes on the substrate.

Figure 7C:
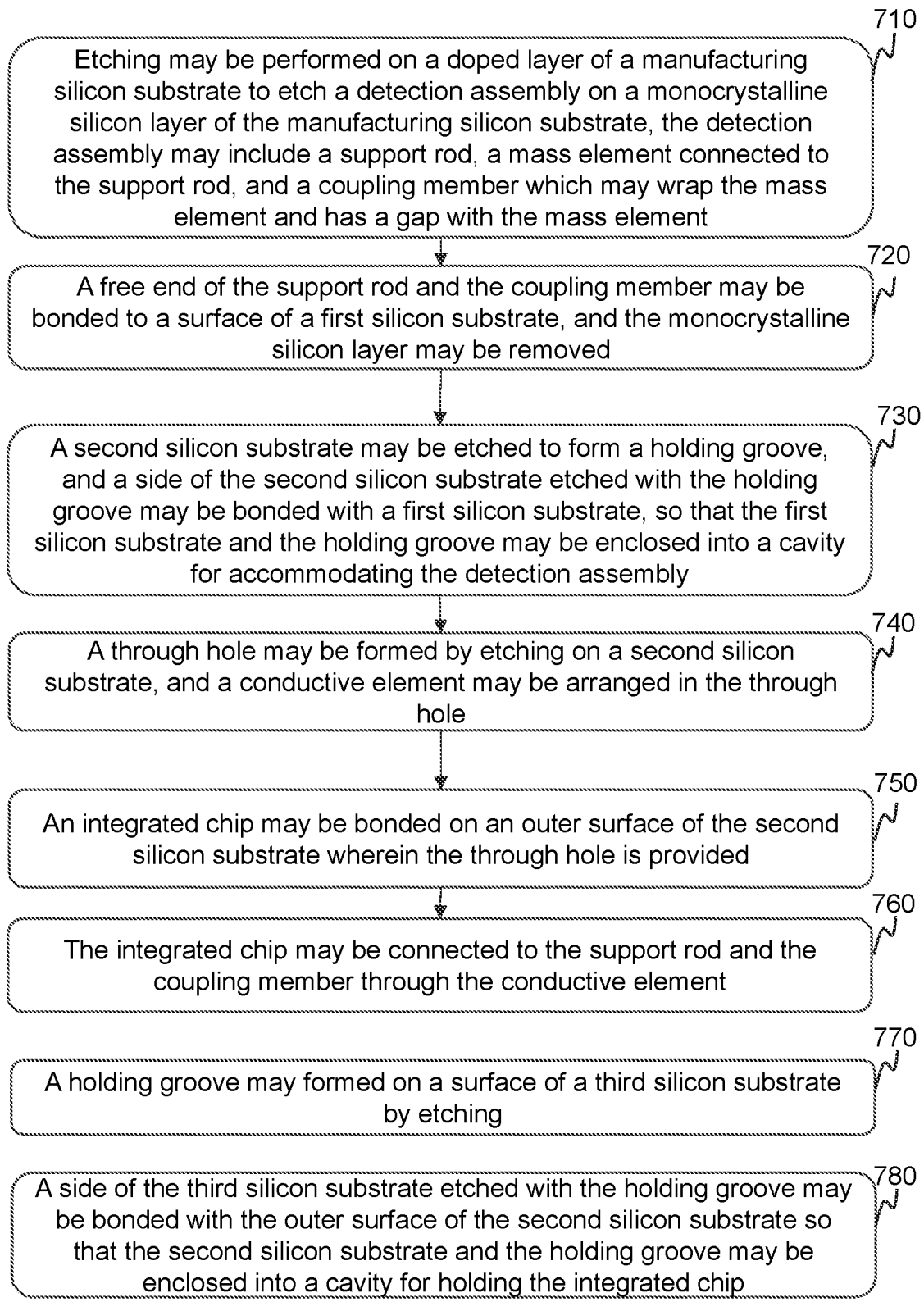
FIG. 7C is a flow diagram illustrating a preparation method of an acceleration sensing device including a sensing element 600 according to other embodiments of the present disclosure.

FIG. 7C is a flow diagram illustrating an exemplary process 765 of a preparation method of an acceleration sensing device including a sensing element 600 according to other embodiments of the present disclosure. Combining with processes 705 and 735 shown in FIG. 7A and FIG. 7B, a process 765 after operation 760 may further include operations 770 and 780.

In 770, a holding groove may formed on a surface of a third silicon substrate by etching.

In 780, a side of the third silicon substrate etched with the holding groove may be bonded with the outer surface of the second silicon substrate so that the second silicon substrate and the holding groove may be enclosed into a cavity for holding the integrated chip.

In this embodiment, the integrated chip needs to be protected. In this regard, after the integrated chip is connected with the support rod and the coupling member, the third silicon substrate (i.e., a cover) may be corroded, so that the holding groove may be etched on the cover. One side of the cover etched with the holding groove may be bonded with the outer surface of the upper housing, so that the upper housing and the holding groove may form a cavity for holding the integrated chip. Thus, the integrated chip may be protected by the cover.

By coupling the at least one resonant system to the acceleration sensing device (e.g., between the housing 110 and the sensing element 600), a sensing device (e.g., the sensing device 200 or 250) may be formed. The at least one resonant system may include a first resonant system 210 shown in FIGS. 2A and 2B or a second resonant system 260 shown in FIGS. 2C and 2D.

In some embodiments, the first resonant system 210 and the second resonant system 260 may include liquid. Exemplarily, the first resonant system 210 may be liquid having a specific density and viscosity. For example, the liquid may be a silicone oil with a density of 0.94 kg/m$^3$, and a kinematic viscosity of the silicone oil be 0.5 cst, 1 cst, 5 cst, 10 cst, 100 cst, 200 cst, 1000 cst, etc. The liquid may be equivalent to a spring (Km4)-mass (Mm4)-damping (Rm4) system. By filling the cavity of the acceleration sensing device with the liquid, so that the sensing element 600 may be completely immersed in the liquid, the first resonance system 210 may be coupled to the sensing element 600. The second resonance system 210 may be liquid including the air bubbles, for example, silicone oil including the air bubbles, wherein a proportion of the air bubbles to the volume of the cavity may be any value between 5% and 95%. The count of bubbles may be 1, 2, 3, 4, or etc. The liquid may be equivalent to a spring (Km4)-mass (Mm4)-damping (Rm4) system, and the air bubbles may be equivalent to a spring (Km3) and damping (Rm3) system. By partially filling the cavity of the acceleration sensing device with the liquid, the air bubbles may be partially filled the cavity of the acceleration sensing device (e.g., air bubbles formed by air not expelled from the cavity when filling liquid, air bubbles formed by air pockets, and/or air bubbles formed by applying a hydrophobic coating to the sensing element 600), the sensing element 600 may be at least partially immersed in the liquid, thereby realizing the coupling of the second resonant system 260 with the sensing element 600.

In some embodiments, the first resonant system 210 and the second resonant system 260 may include elastic structures. Exemplarily, the first resonance system 210 may be an elastic structure with a certain mass (e.g., an elastic rod, an elastic sheet, an elastic block, an elastic net, etc.), or a combination of a lightweight elastic structure and a mass element. The elastic structure with a certain mass or the combination of the lightweight elastic structure and the mass element may be equivalent to a spring (Km4)-mass (Mm4)-damping (Rm4) system. The two ends of the elastic structure may be respectively connected between the housing 110 and the sensing element 600 (e.g., one or more positions on the mass element 621), so that the coupling between the first resonance system 210 and the sensing element 600 may be realized. The second resonant system 260 may be a combination of the lightweight elastic rod and/or the spring and a relatively large mass elastic rod. The elastic rod with a relatively large mass may be equivalent to a spring (Km4)-mass (Mm4)-damping (Rm4) system. The lightweight elastic rod and/or the spring may be equivalent to a spring (Km3) and damping (Rm3) system. The two ends of the elastic rod and/or the spring may be fixedly connected between the housing 110 and the sensing element 600 (e.g., one or more positions on the mass element 621), respectively, so that the second resonance system 260 may be coupled to the sensing element 600.

Due to the existence of the second resonance frequency corresponding to the first resonance system 210 or the second resonance system 260, the frequency response curve of the sensing device including the sensing element 600 may be improved in a specific frequency band (e.g., a low frequency, a medium and low frequency, a medium and high frequency and/or high frequency), so that the sensitivity of the sensing device may be improved compared with the acceleration sensing device without the first resonance system 210 or the second resonance system 260. In addition, since the first resonant system 210 or the second resonant system 260 acts on the sensing element 600, the vibration characteristics of the acceleration sensing device may be changed compared with the vibration characteristics of the acceleration sensing device without the first resonant system 210. Specifically, the first resonant system 210 or the second resonant system 260 acts on the sensing element 600 and may affect the mass, stiffness, damping, etc. of the acceleration sensing device, the effect may be equivalent to changing the value of Q of the first resonance peak of the sensing device including the sensing element 600 relative to the value of Q of the acceleration sensing device not connected with the first resonance system 210 or the second resonance system 260 (e.g., the value of Q may decrease). In some embodiments, the existence of the first resonance system 210 or the second resonance system 260 may suppress a resonance peak corresponding to the acceleration sensing device in the sensing device, so that the value of Q at the resonance peak in the frequency response curve may be relatively low, and the frequency response curve may be flatter in the required frequency band (e.g., a medium and low frequency, a medium frequency, etc.).

At the same time, the first resonance system 210 or the second resonance system 260 may reduce external impacts on the sensing element 600 to protect the sensing element 500. For example, if the liquid or the liquid and bubbles are introduced into the cavity of the housing 110, the first resonance system 210 or the second resonance system 260 may improve the impact resistance reliability of the sensing device including the sensing element 600 when receiving the external impact load. Specifically, due to the viscosity of the liquid and the large compressibility of the gas, part of the impact energy may be absorbed and consumed, which may greatly reduce the impact load on the sensing element 600. Therefore, the sensing element 600 may be protected and the working life may be extended. In addition, the sensing element 600 may be often deformed due to stress during processing. By injecting the liquid and bubbles into the chamber, the gravity, the surface tension, and viscosity of the liquid may be used to correct the deformation of the acceleration sensing device, making the deformation of the sensing device smaller, the output more stable and closer to the design effect.

In some embodiments, by adjusting parameters of the acceleration sensing device (e.g., the internal structure, the size, the stiffness of the housing 110 and/or the mass, the size, the stiffness of the sensing element 600) and/or parameters of the substance/structure forming the at least one resonant system (e.g., the size, the mass, the stiffness and elasticity of the elastic rod, the type, the density, the viscosity and volume of the liquid, whether to fill the bubbles, and the proportion, the size, the position and quantity of the bubbles), relevant parameters of the frequency response curve of the sensing device may be changed (e.g., a relationship between the first resonant frequency and the at least one second resonant frequency, a corresponding peak height, the value of Q, a difference and ratio between the first resonant frequency and the second resonant frequency, a ratio between the peak valley value and the peak value of the highest peak, etc.), so as to achieve the purpose of, for example, adjusting the value of Q of the sensing device, improving the sensitivity and reliability of the sensing device, or making an output gain of the sensing device more stable in the required frequency band (e.g., a medium and low frequency).

In some embodiments, a sensitivity difference between a trough between the first resonant frequency and the at least one second resonant frequency and a relatively high peak value of the resonance peaks corresponding to the first resonant frequency and the at least one second resonant frequency may be within a certain range (e.g., 10 dBV, 20 dBV, 30 dBV, etc.), a ratio of the sensitivity difference to the peak value of the higher peak may not be exceed a certain threshold (e.g., 0.05, 0.1, 0.2, etc.). A frequency difference between the first resonant frequency and the at least one second resonant frequency may be within a certain range (for example, 20-3000 Hz, 20-2000 Hz, 50-2000 Hz, 50-1500 Hz, 80-1500 Hz, 100-1500 Hz, etc.) and or a ratio of a difference to the first resonant frequency or the second resonant frequency may be within a certain range (for example, 0.02-0.7, 0.15-0.6), which may make the frequency response curve between the corresponding resonant peaks flatter. The sensitivity improvement of the sensing device including the sensing element 600 within the second resonant frequency may be higher and more stable. For example, the sensitivity may be increased between 10 dBV-60 dBV, 20 dBV-50 dBV, 30 dBV-40 dBV, etc.

In some embodiments, the at least one resonant system may be a liquid including the bubbles. The proportion of the bubbles in the cavity volume may be 5%, 10%, 20%, 30%, 50%, 70%, 95%, and other arbitrary values. The bubbles may be small bubbles (e.g., bubbles accounting for 2%-10% of the cavity volume), small and medium bubbles (e.g., bubbles accounting for 10%-20% of the cavity volume), medium bubbles (e.g., bubbles accounting for 20%-50% of the cavity volume), large bubbles e.g., bubbles accounting for 50%-90% of the cavity volume), etc. The count of bubbles may be 1, 2, 3, 4, or etc. The bubbles may be located at different locations within the cavity (e.g., within the sensing element 600). In some embodiments, the bubbles may be located between the mass element 621 and the coupling member 623. In some embodiments, the bubbles may be attached with the mass element 621 (e.g., an upper surface, a lower surface, and/or a side opposite the coupling member 623). In some embodiments, the bubbles may be attached with the coupling member 623 (e.g., an upper surface, a lower surface, and/or a side opposite the mass element 621).

When the bubbles are located at different positions in the cavity (e.g., inside the sensing element 600), the frequency response curves of the sensing device including the sensing element 600 may be different (e.g., a magnitude of the at least one second resonant frequency and a sensitivity of the corresponding peak value may be different). In some embodiments, whether the bubbles is attached to the sensing element 600 (e.g., attached to the mass element 621 and/or the coupling member 623) or not attached to the sensing element 500 (e.g., located between the mass element 621 and the coupling member 623), which both may improve the sensitivity of the sensing device to a certain extent (e.g., 10-60 dBV, 10-40 dBV, 15-40 dBV, etc.) in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz). The size of the lift may be also related to the size and/or position of the bubbles.

In some embodiments, when the bubbles are not attached to the sensing element 600 (e.g., between the mass element 621 and the coupling member 623), the sensitivity of the sensing device may increase as the volume of the bubbles increases. Exemplarily, the sensitivity of a sensing device including the small and medium bubbles may be improved by about 5-30 dBV in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) compared with a sensing device including the small bubbles. Compared with a sensing device including the medium and small bubbles, the sensitivity of the sensing device including the medium and small bubbles in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) may be improved by about 5-30 dBV.

Figure 8A:
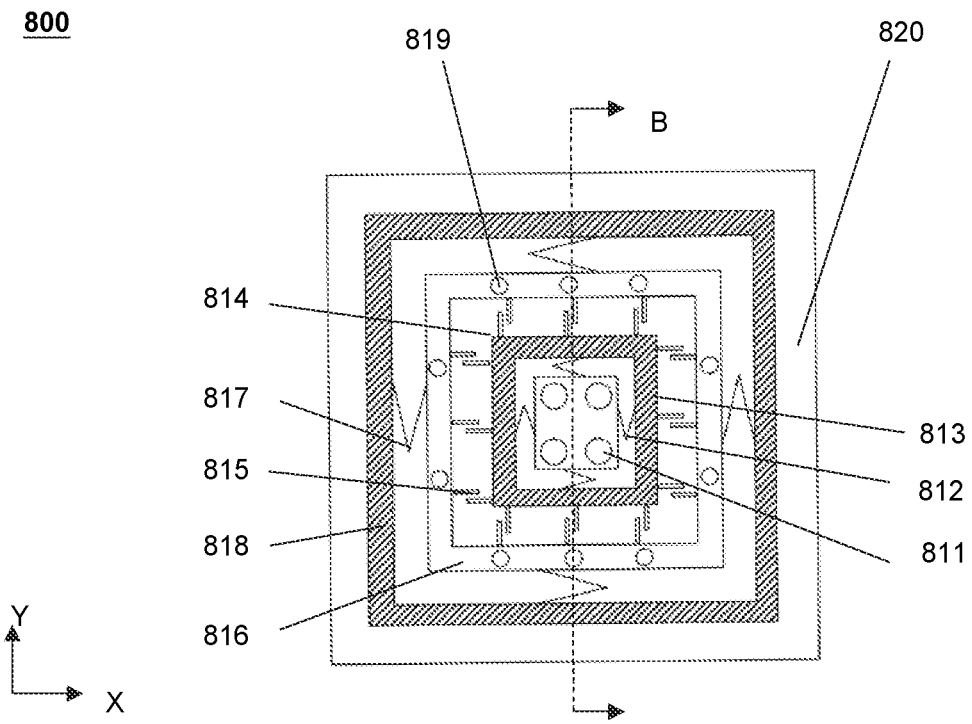
FIGS. 8A and 8B are structure diagrams illustrating an exemplary sensing device 800 according to some embodiments of the present disclosure.
Figure 8B:
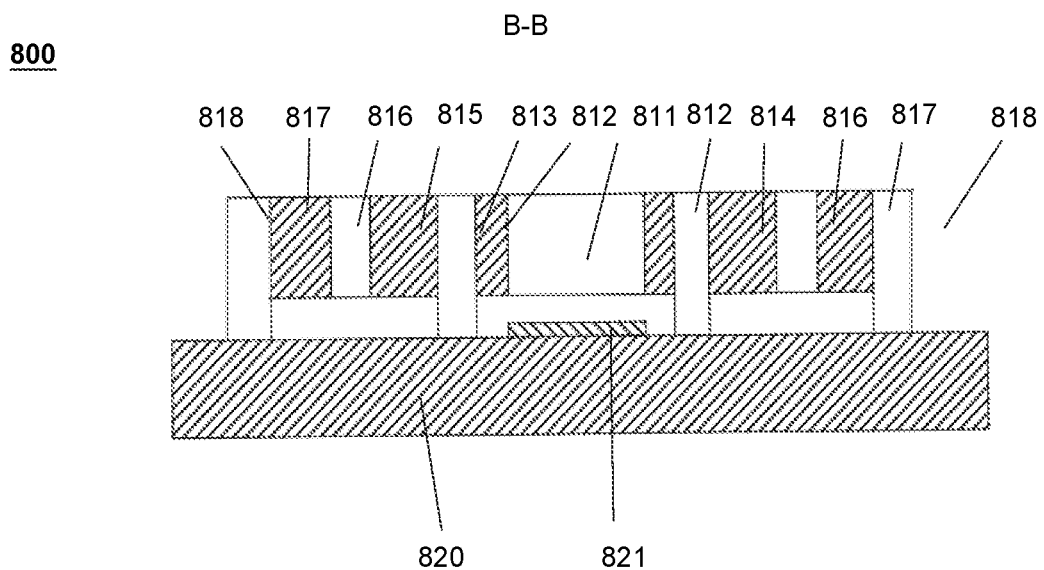

FIGS. 8A and 8B are structure diagrams illustrating an exemplary sensing device 800 according to some embodiments of the present disclosure.

The sensing element 800 may include a substrate 820 and a detection assembly disposed on the substrate (e.g., a mass element, at least one moving electrode disposed on the mass element, and at least one fixing electrode fixed on the substrate). The substrate 820 may be the same or similar to the substrate in FIGS. 4A-6A and may not be described here. As shown in FIG. 8A, the detection assembly may include a first mass element 811, at least one first flexible component 812, a first fixed element 813, a plurality of first fixing electrodes 814, a plurality of first moving electrodes 815, a second mass element 816, at least one second flexible component 817, and a second fixed element 818 in the order from a center of the substrate 820 to an outside of the substrate 820. The first mass element 811 has a regular or irregular shape such as a circle, a square, or a polygon. The first mass element 811 may be made of, for example, the material such as monocrystalline silicon. The first fixed element 813 may support the first mass element 811 and fix the first electrode 814. The first fixed element 813 may be connected with the substrate 820 and surround the first mass element 811. An inner wall of the first fixed element 813 may be provided with the at least one first flexible component 812. Through the at least one first flexible component 812, the first fixed element 813 may be connected with the first mass element 811 (e.g., an outer wall of the first mass element), so that the first mass element 811 may be suspended on the substrate 820. The plurality of first fixing electrodes 814 may be arranged on a periphery of the first fixed element 813 and extend outward. Exemplarily, the plurality of first fixing electrodes 814 may be flat, a perpendicular to an outer wall of the first fixed element 813, and arranged along the outer wall of the first fixed element 813. In some embodiments, the plurality of first fixing electrodes 814 may be distributed along the at least a first direction (e.g., the X-axis direction) and a second direction (e.g., the Y-axis direction).

The second mass element 816 may be located at the periphery of the first fixed element 813 and surround the first fixed element 814. The second mass element 816 may be made of, for example, single crystal silicon, or the like. The second fixed element 818 may support the second mass element 816. The second fixed element 818 may be connected with the substrate 820. The at least one second flexible component 817 may be disposed on an inner wall of the second fixed element 818. Through the at least one second flexible component 817, the second fixed element 818 may be connected with the second mass element 816 (e.g., an outer wall of the second mass element), so that the second mass element 816 may be suspended on the substrate 820. The plurality of first moving electrodes 815 may be arranged on an inner side of the second mass element 816 and extend inward. Exemplarily, the plurality of first moving electrodes 815 may be in a flat plate shape, perpendicular to an inner wall of the second mass element 816, and arranged along the inner wall of the second mass element 816. In some embodiments, the plurality of first moving electrodes 815 and the plurality of first fixing electrodes 814 may be arranged in parallel and interval setting form a first detection capacitor and a second direction detection capacitor.

Referring to FIG. 8B, the sensing element 800 may further include a second fixing electrode 821 and a second moving electrode arranged on a lower surface of the first mass element. The second fixing electrode 821 may be connected with the substrate 820 and may be arranged opposite to a lower surface of the first mass element 811. The second moving electrode may be a conductive layer provided on the lower surface of the first mass element 811. The exemplary conductive layer may include a metal, an alloy material, a metal oxide material, graphene, doped silicon, or any combination thereof. In some embodiments, the conductive layer may be fixedly connected by welding, riveting, clipping, bolting, adhesive bonding, or disposed on the lower surface of the first mass element 811 by deposition, doping, physical growth, or the like. The second fixing electrode 821 and the second moving electrode may form a third direction detection capacitor.

In some embodiments, the first fixed element 813, the second mass element 816, and the second fixed element 818 have a central hole, the first mass element 811 may be located in a central hole of the first fixed element 813, the first fixed element 813 may be located in a central hole of the second mass element 816, and the second mass element 816 may be located in a central hole of the second fixed element 818. Outer profiles of the first mass element 811, the first fixed element 813, the second mass element 816, and the second fixed element 818 may be circular, square, rectangular, polygonal, etc.

In some embodiments, the outer profiles of the first mass element 811, the first fixed element 813, the second mass element 816, and the second fixed element 818 may be square. Exemplarily, the at least one first flexible component 812 may include four first flexible components 812. The four first flexible components 812 may be respectively connected with each of four outer walls of the first mass element 811 and the corresponding inner wall of the first fixed element 813, so as to support the first mass element 811 and enable the first mass element 811 to move in the third direction (e.g., the Z-axis direction). Exemplarily, the at least one second flexible component 817 may include eight second elastic connecting components 817. Each of the eight second elastic connecting components 817 may connect each of four outer walls of the second mass element 816 with the corresponding inner wall of the second fixed element 818, thereby supporting the second mass element 816 and enabling the second mass element 816 to move in the first direction (e.g., the X-axis direction) and/or the second direction (e.g., the Y-axis direction) parallel to the substrate 820. In some embodiments, the at least one first flexible component 812 and/or the at least one second flexible component 817 may be a curved arm structure as shown in the figure.

In some embodiments, a plurality of holes 819 may be provided on the first mass element 811 and/or the second mass element 822. The holes may provide damping for motion of the first mass element 811 and/or the second mass element 822, making the motion of the first mass element 811 and/or the second mass element 822 more stable.

Referring to FIG. 8A, the plurality of first moving electrodes 815 and the plurality of first fixing electrodes 814 may cross each other and may be arranged in parallel to form a comb capacitance system, each of the first moving electrode 815 and a corresponding first fixing electrode 814 may form a detection capacitor.

When there is an external acceleration input in the first direction or the second direction (i.e., the X-axis direction or the Y-axis direction), the second mass element 816 may move in the X-Y plane due to action of the at least one second flexible component 817, so that a distance and/or positive area between the plurality of first fixing electrodes 814 and the corresponding first moving electrode 815 may change, and the formed detection capacitors in the first direction and the second direction may change to characterize a magnitude of the size of the acceleration in the first direction and the second direction.

When there is an external acceleration input in the third direction (i.e., the Z-axis direction), the first mass element 811 may move in the Z-axis direction due to action of the at least one second flexible component 812, so that a distance and/or positive area between the second fixing electrodes 821 and the corresponding first moving electrode may change, and the formed detection capacitors in the third direction may change to characterize a magnitude of the size of the acceleration in the third direction.

By coupling the at least one resonant system to the acceleration sensing device (e.g., between the housing 110 and the sensing element 800), a sensing device (e.g., the sensing device 200 or 250) may be constructed. The at least one resonance system may include the first resonance system 210 shown in FIGS. 2A and 2B or the second resonance system 260 shown in FIGS. 2C and 2D.

In some embodiments, the first resonant system 210 and the second resonant system 260 may include liquid. Exemplarily, the first resonant system 210 may be liquid having a specific density and viscosity. For example, the liquid may be a silicone oil with a density of 0.94 kg/m$^3$, and a kinematic viscosity of the silicone oil be 0.5 cst, 1 cst, 5 cst, 10 cst, 100 cst, 200 cst, 1000 cst, etc. The liquid may be equivalent to a spring (Km4)-mass (Mm4)-damping (Rm4) system. By filling the cavity of the acceleration sensing device with the liquid, so that the sensing element 800 may be completely immersed in the liquid, the first resonance system 210 may be coupled to the sensing element 800. The second resonance system 210 may be liquid including the air bubbles, for example, silicone oil including the air bubbles, wherein a proportion of the air bubbles to the volume of the cavity may be any value between 5% and 95%. The count of bubbles may be 1, 2, 3, 4, or etc. The liquid may be equivalent to a spring (Km4)-mass (Mm4)-damping (Rm4) system, and the air bubbles may be equivalent to a spring (Km3) and damping (Rm3) system. By partially filling the cavity of the acceleration sensing device with the liquid, the air bubbles may be partially filled the cavity of the acceleration sensing device (e.g., air bubbles formed by air not expelled from the cavity when filling liquid, air bubbles formed by air pockets, and/or air bubbles formed by applying a hydrophobic coating to the sensing element 800), the sensing element 800 may be at least partially immersed in the liquid, thereby realizing the coupling of the second resonant system 260 with the sensing element 800.

In some embodiments, the first resonant system 210 and the second resonant system 260 may include elastic structures. Exemplarily, the first resonance system 210 may be an elastic structure with a certain mass (e.g., an elastic rod, an elastic sheet, an elastic block, an elastic net, etc.), or a combination of a lightweight elastic structure and a mass element. The elastic structure with a certain mass or the combination of the lightweight elastic structure and the mass element may be equivalent to a spring (Km4)-mass (Mm4)-damping (Rm4) system. The two ends of the elastic structure may be respectively connected between the housing 110 and the sensing element 800 (e.g., one or more positions on the first mass element 811 or the second mass element 816, the first moving electrode 815, the second moving electrode, etc.), so that the coupling between the first resonance system 210 and the sensing element 800 may be realized. The second resonant system 260 may be a combination of the lightweight elastic rod and/or the spring and a relatively large mass elastic rod. The elastic rod with a relatively large mass may be equivalent to a spring (Km4)-mass (Mm4)-damping (Rm4) system. The lightweight elastic rod and/or the spring may be equivalent to a spring (Km3) and damping (Rm3) system. The two ends of the elastic rod and/or the spring may be fixedly connected between the housing 110 and the sensing element 800 (e.g., one or more positions on the first mass element 811 or the second mass element 816, the first moving electrode 815, the second moving electrode, etc.), respectively, so that the second resonance system 260 may be coupled to the sensing element 800.

Due to the existence of the second resonance frequency corresponding to the first resonance system 210 or the second resonance system 260, the frequency response curve of the sensing device including the sensing element 800 may be improved in a specific frequency band (e.g., a low frequency, a medium and low frequency, a medium and high frequency and/or high frequency), so that the sensitivity of the sensing device may be improved compared with the acceleration sensing device without the first resonance system 210 or the second resonance system 260. In addition, since the first resonant system 210 or the second resonant system 260 acts on the sensing element 800, the vibration characteristics of the acceleration sensing device may be changed compared with the vibration characteristics of the acceleration sensing device without the first resonant system 210. Specifically, the first resonant system 210 or the second resonant system 260 acts on the sensing element 800 and may affect the mass, stiffness, damping, etc. of the acceleration sensing device, the effect may be equivalent to changing the value of Q of the first resonance peak of the sensing device including the sensing element 800 relative to the value of Q of the acceleration sensing device not connected with the first resonance system 210 or the second resonance system 260 (e.g., the value of Q may decrease). In some embodiments, the existence of the first resonance system 210 or the second resonance system 260 may suppress a resonance peak corresponding to the acceleration sensing device in the sensing device, so that the value of Q at the resonance peak in the frequency response curve may be relatively low, and the frequency response curve may be flatter in the required frequency band (e.g., a medium and low frequency, a medium frequency, etc.).

At the same time, the first resonance system 210 or the second resonance system 260 may reduce external impacts on the sensing element 800 to protect the sensing element 800. For example, if the liquid or the liquid and bubbles are introduced into the cavity of the housing 110, the first resonance system 210 or the second resonance system 260 may improve the impact resistance reliability of the sensing device including the sensing element 800 when receiving the external impact load. Specifically, due to the viscosity of the liquid and the large compressibility of the gas, part of the impact energy may be absorbed and consumed, which may greatly reduce the impact load on the sensing element 800. Therefore, the sensing element 800 may be protected and the working life may be extended. In addition, the sensing element 800 may be often deformed due to stress during processing. By injecting the liquid and bubbles into the chamber, the gravity, the surface tension, and viscosity of the liquid may be used to correct the deformation of the acceleration sensing device, making the deformation of the sensing device smaller, the output more stable and closer to the design effect.

In some embodiments, by adjusting parameters of the acceleration sensing device (e.g., the internal structure, the size, the stiffness of the housing 110 and/or the mass, the size, the stiffness of the sensing element 800) and/or parameters of the substance/structure forming the at least one resonant system (e.g., the size, the mass, the stiffness and elasticity of the elastic rod, the type, the density, the viscosity and volume of the liquid, whether to fill the bubbles, and the proportion, the size, the position and quantity of the bubbles), relevant parameters of the frequency response curve of the sensing device may be changed (e.g., a relationship between the first resonant frequency and the at least one second resonant frequency, a corresponding peak height, the value of Q, a difference and ratio between the first resonant frequency and the second resonant frequency, a ratio between the peak valley value and the peak value of the highest peak, etc.), so as to achieve the purpose of, for example, adjusting the value of Q of the sensing device, improving the sensitivity and reliability of the sensing device, or making an output gain of the sensing device more stable in the required frequency band (e.g., a medium and low frequency).

In some embodiments, a sensitivity difference between a trough between the first resonant frequency and the at least one second resonant frequency and a relatively high peak value of the resonance peaks corresponding to the first resonant frequency and the at least one second resonant frequency may be within a certain range (e.g., 10 dBV, 20 dBV, 30 dBV, etc.), a ratio of the sensitivity difference to the peak value of the higher peak may not be exceed a certain threshold (e.g., 0.05, 0.1, 0.2, etc.). A frequency difference between the first resonant frequency and the at least one second resonant frequency may be within a certain range (for example, 20-3000 Hz, 20-2000 Hz, 50-2000 Hz, 50-1500 Hz, 80-1500 Hz, 100-1500 Hz, etc.) and or a ratio of a difference to the first resonant frequency or the second resonant frequency may be within a certain range (for example, 0.02-0.7, 0.15-0.6), which may make the frequency response curve between the corresponding resonant peaks flatter. The sensitivity improvement of the sensing device including the sensing element 800 within the second resonant frequency may be higher and more stable. For example, the sensitivity may be increased between 10 dBV-60 dBV, 20 dBV-50 dBV, 30 dBV-40 dBV, etc.

In some embodiments, the at least one resonant system may be a liquid including the bubbles. The proportion of the bubbles in the cavity volume may be 5%, 10%, 20%, 30%, 50%, 70%, 95%, and other arbitrary values. The bubbles may be small bubbles (e.g., bubbles accounting for 2%-10% of the cavity volume), small and medium bubbles (e.g., bubbles accounting for 10%-20% of the cavity volume), medium bubbles (e.g., bubbles accounting for 20%-50% of the cavity volume), large bubbles e.g., bubbles accounting for 50%-90% of the cavity volume), etc. The count of bubbles may be 1, 2, 3, 4, or etc. The bubbles may be located at different locations within the cavity (e.g., within the sensing element 800). In some embodiments, the bubbles may be located between the first moving electrode 815 and the first fixing electrode 814 and/or between the second moving electrode (e.g., a lower surface of the first mass element) and the second fixing electrode 821. In some embodiments, the bubbles may be attached with the first mass element 811 (e.g., an upper surface, a lower surface, and/or inner and outer side walls of the first mass element 811), the second mass element 816 (e.g., an upper surface, a lower surface, inner and outer side walls of the second mass element 816), the first moving electrode 815 (e.g., an upper surface and a lower surface of the first moving electrode 815, or a side surface relative to the first fixing electrode 814), and/or the second moving electrode (e.g., a side surface of the second moving electrode or a surface relative to the second fixing electrode 821). In some embodiments, the bubbles may be attached with the first fixing electrode 814 (e.g., a side opposite to the first moving electrode 815) and/or the second fixing electrode 821 (e.g., a surface opposite to the first moving electrode).

When the bubbles are located at different positions in the cavity (e.g., inside the sensing element 800), the frequency response curves of the sensing device including the sensing element 800 may be different (e.g., a magnitude of the at least one second resonant frequency and a sensitivity of the corresponding peak value may be different). In some embodiments, whether the bubbles is attached to the sensing element 800 (e.g., attached to the first mass element 811, the second mass element 816, the first moving electrode 815, and/or the second moving electrode) or not attached to the sensing element 800 (e.g., located between the first moving electrode 815 and the first fixing electrode 814), which both may improve the sensitivity of the sensing device to a certain extent (e.g., 10-60 dBV, 10-40 dBV, 15-40 dBV, etc.) in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz). The size of the lift may be also related to the size and/or position of the bubbles.

In some embodiments, when the bubbles are not attached to the sensing element 800 (e.g., located between the first moving electrode 815 and the first fixing electrode 814), the sensitivity of the sensing device may increase as the volume of the bubbles increases. Exemplarily, the sensitivity of a sensing device including the small and medium bubbles may be improved by about 5-30 dBV in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) compared with a sensing device including the small bubbles. Compared with a sensing device including the medium and small bubbles, the sensitivity of the sensing device including the medium and small bubbles in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) may be improved by about 5-30 dBV.

Figure 9:
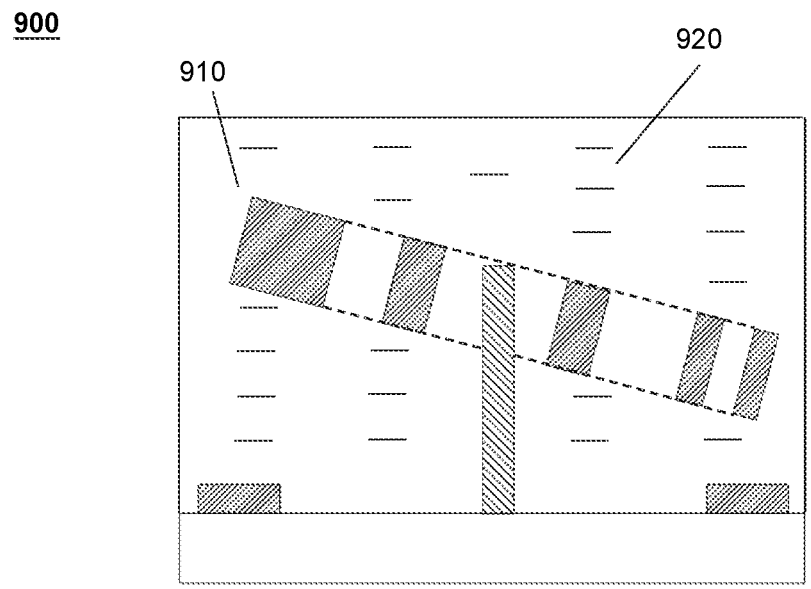
FIG. 9 is a structure diagram illustrating an exemplary sensing device 900 according to some embodiments of the present disclosure.

FIG. 9 is a structure diagram illustrating an exemplary sensing device 900 according to some embodiments of the present disclosure.

The sensing device 900 may include a sensing element 910 and liquid 920. In this embodiment, the sensing element 910 may be the same as or similar to the sensing element 500 in FIGS. 5A-6D, which may not be repeated here. The liquid 920 may be a specific liquid having a specific density and viscosity. For example, the liquid 920 may be a silicone oil with a density of 0.94 kg/m³, and a kinematic viscosity of the silicone oil be 0.5 cst, 1 cst, 5 cst, 10 cst, 100 cst, 200 cst, 1000 cst, etc. The liquid 920 may be equivalent to a spring (Km4)-mass (Mm4)-damping (Rm4) system. By filling the cavity of the acceleration sensing device 910 with the liquid 920, so that the sensing element 910 may be completely immersed in the liquid, the liquid 920 may be coupled to the sensing element 910. In some embodiments, the liquid 920 may include the bubbles, wherein a proportion of the bubbles to the volume of the cavity may be any value between 5% and 95%. The count of bubbles may be 1, 2, 3, 4, or etc. The bubbles may be equivalent to a spring (KM3) and damping (RM3) system. By filling the cavity of the sensing element 910 with the liquid including the bubbles, the sensing element 910 may be at least partially immersed in the liquid, thereby realizing the coupling of the liquid 920 and the sensing element 910.

Due to the existence of the second resonance frequency corresponding to the liquid 920, the frequency response curve of the sensing device 900 may be improved in a specific frequency band (e.g., a low frequency, a medium and low frequency, a medium and high frequency and/or high frequency). In addition, since the liquid 920 acts on the sensing element 910, the vibration characteristics of the sensing element 910 may be changed compared with the vibration characteristics of the sensing element 910 without the liquid 920. Specifically, the liquid acts on the sensing element 910, the effect may be equivalent to changing the value of Q of the first resonance peak of the sensing device including the sensing element 900 relative to the value of Q of the acceleration sensing device not including the liquid 920 (e.g., the value of Q may decrease). In some embodiments, the existence of the liquid 920 may suppress a resonance peak corresponding to the sensing element 910 in the sensing device 900, so that the value of Q at the resonance peak in the frequency response curve may be relatively low, and the frequency response curve may be flatter in the required frequency band (e.g., a medium and low frequency, a medium frequency, etc.).

At the same time, the liquid 920 may reduce external impacts on the sensing element 910 to protect the sensing element 910. For example, the liquid 920 may improve the impact resistance reliability of the sensing device 900 including the sensing element 910 when receiving the external impact load. Specifically, due to the viscosity of the liquid and the large compressibility of the gas, part of the impact energy may be absorbed and consumed, which may greatly reduce the impact load on the sensing element 910. Therefore, the sensing element 910 may be protected and the working life may be extended. In addition, the sensing element 910 may be often deformed due to stress during processing. By injecting the liquid 920 into the chamber, the gravity, the surface tension, and viscosity of the liquid may be used to correct the deformation of the acceleration sensing device, making the deformation of the sensing device smaller, the output more stable and closer to the design effect.

In some embodiments, by adjusting parameters of the sensing device 910 (e.g., the internal structure, the size, the stiffness of the housing and/or the mass, the size, the stiffness of an internal detection assembly) and/or parameters of the liquid 920 (e.g., the size, the mass, the stiffness and elasticity of the elastic rod, the type, the density, the viscosity and volume of the liquid, whether to fill the bubbles, and the proportion, the size, the position and quantity of the bubbles), relevant parameters of the frequency response curve of the sensing device 900 may be changed (e.g., a relationship between the first resonant frequency and the at least one second resonant frequency, a corresponding peak height, the value of Q, a difference and ratio between the first resonant frequency and the second resonant frequency, a ratio between the peak valley value and the peak value of the highest peak, etc.), so as to achieve the purpose of, for example, adjusting the value of Q of the sensing device, improving the sensitivity and reliability of the sensing device 900, or making an output gain of the sensing device 900 more stable in the required frequency band (e.g., a medium and low frequency).

In some embodiments, a sensitivity difference between a trough between the first resonant frequency and the at least one second resonant frequency and a relatively high peak value of the resonance peaks corresponding to the first resonant frequency and the at least one second resonant frequency may be within a certain range (e.g., 10 dBV, 20 dBV, 30 dBV, etc.), a ratio of the sensitivity difference to the peak value of the higher peak may not be exceed a certain threshold (e.g., 0.05, 0.1, 0.2, etc.). A frequency difference between the first resonant frequency and the at least one second resonant frequency may be within a certain range (for example, 20-3000 Hz, 20-2000 Hz, 50-2000 Hz, 50-1500 Hz, 80-1500 Hz, 100-1500 Hz, etc.) and or a ratio of a difference to the first resonant frequency or the second resonant frequency may be within a certain range (for example, 0.02-0.7, 0.15-0.6), which may make the frequency response curve between the corresponding resonant peaks flatter. The sensitivity improvement of the sensing device including the sensing element 900 within the second resonant frequency may be higher and more stable. For example, the sensitivity may be increased between 10 dBV-60 dBV, 20 dBV-50 dBV, 30 dBV-40 dBV, etc.

In some embodiments, the at least one resonant system may be a liquid including the bubbles. The proportion of the bubbles in the cavity volume may be 5%, 10%, 20%, 30%, 50%, 70%, 95%, and other arbitrary values. The bubbles may be small bubbles (e.g., bubbles accounting for 2%-10% of the cavity volume), small and medium bubbles (e.g., bubbles accounting for 10%-20% of the cavity volume), medium bubbles (e.g., bubbles accounting for 20%-50% of the cavity volume), large bubbles e.g., bubbles accounting for 50%-90% of the cavity volume), etc. The count of bubbles may be 1, 2, 3, 4, or etc. The bubbles may be located at different locations within the cavity (e.g., within the sensing element 910).

When the bubbles are located at different positions in the cavity (e.g., inside the sensing element 910), the frequency response curves of the sensing device including the sensing element 910 may be different (e.g., a magnitude of the at least one second resonant frequency and a sensitivity of the corresponding peak value may be different). In some embodiments, whether the bubbles is attached to the sensing element 910 (e.g., attached to the detection assembly) or not attached to the sensing element 800, which both may improve the sensitivity of the sensing device 900 to a certain extent (e.g., 10-60 dBV, 10-40 dBV, 15-40 dBV, etc.) in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz). The size of the lift may be also related to the size and/or position of the bubbles.

In some embodiments, when the bubbles are not attached to the sensing element 910 (e.g., located between a detection assembly and an inner wall of the cavity), the sensitivity of the sensing device 900 may increase as the volume of the bubbles increases. Exemplarily, the sensitivity of a sensing device 900 including the small and medium bubbles may be improved by about 5-30 dBV in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) compared with a sensing device e including the small bubbles. Compared with a sensing device 900 including the medium and small bubbles, the sensitivity of the sensing device 900 including the medium and small bubbles in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) may be improved by about 5-30 dBV.

Figure 10:
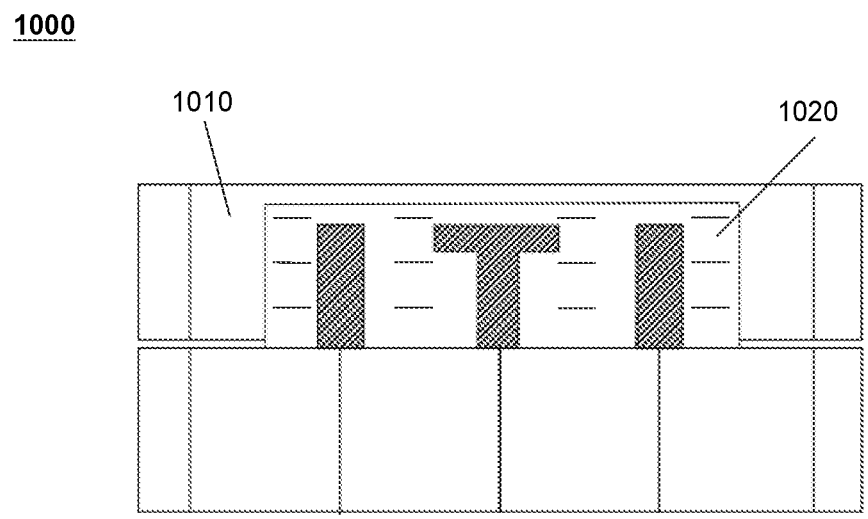
FIG. 10 is a structure diagram illustrating an exemplary sensing device 1000 according to some embodiments of the present disclosure.

FIG. 10 is a structure diagram illustrating an exemplary sensing device 1000 according to some embodiments of the present disclosure.

The sensing device 1000 may include a sensing element 1010 and liquid 1020. In this embodiment, the sensing element 1010 may be the same as or similar to the sensing element 600 in FIGS. 6A-6E, which may not be repeated here. The liquid 1020 may be a specific liquid with a specific density and viscosity. For example, the liquid 1020 may be a silicone oil with a density of 0.94 kg/m$^3$, and a kinematic viscosity of the silicone oil be 0.5 cst, 1 cst, 5 cst, 10 cst, 100 cst, 200 cst, 1000 cst, etc. The liquid 1020 may be equivalent to a spring (Km4)-mass (Mm4)-damping (Rm4) system. By filling the cavity of the acceleration sensing device 1010 with the liquid 1020, so that the sensing element 1010 may be completely immersed in the liquid, the liquid 1020 may be coupled to the sensing element 1010. In some embodiments, the liquid 1020 may include the bubbles, wherein a proportion of the bubbles to the volume of the cavity may be any value between 5% and 95%. The count of bubbles may be 1, 2, 3, 4, or etc. The bubbles may be equivalent to a spring (KM3) and damping (RM3) system. By filling the cavity of the sensing element 1010 with the liquid including the bubbles, the sensing element 1010 may be at least partially immersed in the liquid, thereby realizing the coupling of the liquid 1020 and the sensing element 1010.

Due to the existence of the second resonance frequency corresponding to the liquid 1020, the frequency response curve of the sensing device 1000 may be improved in a specific frequency band (e.g., a low frequency, a medium and low frequency, a medium and high frequency and/or high frequency). In addition, since the liquid 1020 acts on the sensing element 1010, the vibration characteristics of the sensing element 1010 may be changed compared with the vibration characteristics of the sensing element 1010 without the liquid 1020. Specifically, the liquid acts on the sensing element 1010, the effect may be equivalent to changing the value of Q of the first resonance peak of the sensing device including the sensing element 1000 relative to the value of Q of the acceleration sensing device not including the liquid 1020 (e.g., the value of Q may decrease). In some embodiments, the existence of the liquid 1020 may suppress a resonance peak corresponding to the sensing element 1010 in the sensing device 1000, so that the value of Q at the resonance peak in the frequency response curve may be relatively low, and the frequency response curve may be flatter in the required frequency band (e.g., a medium and low frequency, a medium frequency, etc.).

At the same time, the liquid 1020 may reduce external impacts on the sensing element 1010 to protect the sensing element 1010. For example, the liquid 1020 may improve the impact resistance reliability of the sensing device 1000 including the sensing element 1010 when receiving the external impact load. Specifically, due to the viscosity of the liquid and the large compressibility of the gas, part of the impact energy may be absorbed and consumed, which may greatly reduce the impact load on the sensing element 1010. Therefore, the sensing element 1010 may be protected and the working life may be extended. In addition, the sensing element 1010 may be often deformed due to stress during processing. By injecting the liquid 1020 into the chamber, the gravity, the surface tension, and viscosity of the liquid may be used to correct the deformation of the acceleration sensing device, making the deformation of the sensing device smaller, the output more stable and closer to the design effect.

In some embodiments, by adjusting parameters of the sensing device 1010 (e.g., the internal structure, the size, the stiffness of the housing and/or the mass, the size, the stiffness of an internal detection assembly) and/or parameters of the liquid 1020 (e.g., the size, the mass, the stiffness and elasticity of the elastic rod, the type, the density, the viscosity and volume of the liquid, whether to fill the bubbles, and the proportion, the size, the position and quantity of the bubbles), relevant parameters of the frequency response curve of the sensing device 1000 may be changed (e.g., a relationship between the first resonant frequency and the at least one second resonant frequency, a corresponding peak height, the value of Q, a difference and ratio between the first resonant frequency and the second resonant frequency, a ratio between the peak valley value and the peak value of the highest peak, etc.), so as to achieve the purpose of, for example, adjusting the value of Q of the sensing device, improving the sensitivity and reliability of the sensing device 1000, or making an output gain of the sensing device 1000 more stable in the required frequency band (e.g., a medium and low frequency).

In some embodiments, a sensitivity difference between a trough between the first resonant frequency and the at least one second resonant frequency and a relatively high peak value of the resonance peaks corresponding to the first resonant frequency and the at least one second resonant frequency may be within a certain range (e.g., 10 dBV, 20 dBV, 30 dBV, etc.), a ratio of the sensitivity difference to the peak value of the higher peak may not be exceed a certain threshold (e.g., 0.05, 0.1, 0.2, etc.). A frequency difference between the first resonant frequency and the at least one second resonant frequency may be within a certain range (for example, 20-3000 Hz, 20-2000 Hz, 50-2000 Hz, 50-1500 Hz, 80-1500 Hz, 100-1500 Hz, etc.) and or a ratio of a difference to the first resonant frequency or the second resonant frequency may be within a certain range (for example, 0.02-0.7, 0.15-0.6), which may make the frequency response curve between the corresponding resonant peaks flatter. The sensitivity improvement of the sensing device including the sensing element 1000 within the second resonant frequency may be higher and more stable. For example, the sensitivity may be increased between 10 dBV-60 dBV, 20 dBV-50 dBV, 30 dBV-40 dBV, etc.

In some embodiments, the at least one resonant system may be a liquid including the bubbles. The proportion of the bubbles in the cavity volume may be 5%, 10%, 20%, 30%, 50%, 70%, 95%, and other arbitrary values. The bubbles may be small bubbles (e.g., bubbles accounting for 2%-10% of the cavity volume), small and medium bubbles (e.g., bubbles accounting for 10%-20% of the cavity volume), medium bubbles (e.g., bubbles accounting for 20%-50% of the cavity volume), large bubbles e.g., bubbles accounting for 50%-90% of the cavity volume), etc. The count of bubbles may be 1, 2, 3, 4, or etc. The bubbles may be located at different locations within the cavity (e.g., within the sensing element 1010).

When the bubbles are located at different positions in the cavity (e.g., inside the sensing element 1010), the frequency response curves of the sensing device including the sensing element 1010 may be different (e.g., a magnitude of the at least one second resonant frequency and a sensitivity of the corresponding peak value may be different). In some embodiments, whether the bubbles is attached to the sensing element 1010 (e.g., attached to the detection assembly) or not attached to the sensing element 800, which both may improve the sensitivity of the sensing device 900 to a certain extent (e.g., 10-60 dBV, 10-40 dBV, 15-40 dBV, etc.) in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz). The size of the lift may be also related to the size and/or position of the bubbles.

In some embodiments, when the bubbles are not attached to the sensing element 1010 (e.g., located between a detection assembly and an inner wall of the cavity), the sensitivity of the sensing device 1000 may increase as the volume of the bubbles increases. Exemplarily, the sensitivity of a sensing device 1000 including the small and medium bubbles may be improved by about 5-30 dBV in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) compared with a sensing device e including the small bubbles. Compared with a sensing device 1000 including the medium and small bubbles, the sensitivity of the sensing device 900 including the medium and small bubbles in the frequency band before the low frequency, the medium and low frequency, or the medium and high frequency (e.g., in the frequency band less than 7000 hz, 5000 Hz, 3000 Hz, 1000 Hz, 500 Hz, 100 Hz, 50 Hz) may be improved by about 5-30 dBV.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A sensing device, comprising:
   an acceleration sensor, having a first resonant frequency, wherein the acceleration sensor includes a housing and a sensing element, and the sensing element is located within a cavity formed by the housing; and
   at least one resonant system, coupled to the sensing element, wherein the at least one resonant system includes a first medium and a second medium disposed in the housing, and the first medium includes liquid in which the sensing element is immersed, the second medium includes gas, and the gas is distributed in the liquid in a form of one or more bubbles, a volume of the one or more bubbles accounts for 30%-50% of a volume of the cavity, the at least one resonant system provides at least one second resonant frequency for the sensing device, and a difference between the first resonant frequency and the at least one second resonant frequency is within a range of 100 Hz-1500 Hz.

2. The sensing device of claim 1, wherein the sensing element includes:
   a substrate;
   a mass element, in response to an external acceleration, the mass element moving relative to the substrate, wherein at least one moving electrode is set on the mass element; and
   at least one fixing electrode fixed on the substrate, wherein the at least one fixing electrode and the at least one moving electrode form at least one detection capacitor, the at least one detection capacitor being configured to determine a magnitude of the external acceleration.

3. The sensing device of claim 2, wherein
the at least one moving electrode includes:
   at least one group of first moving electrodes arranged along a first direction and each group of first moving electrodes extending perpendicular to the first direction, wherein each group of first moving electrodes includes one or more first moving electrodes; and
   at least one group of second moving electrodes arranged along a second direction and each group of second moving electrodes extending perpendicular to the second direction wherein each group of second moving electrodes includes one or more second moving electrodes;
the at least one fixing electrode includes:
   a first fixing electrode being set relative to and in parallel with each of the first moving electrodes, wherein the at least one group of first moving electrodes and the corresponding first fixing electrodes form a first direction detection capacitor;
   a second fixing electrode being set relative to and in parallel with each of the second moving electrodes, wherein the at least one group of second moving electrodes and the corresponding second fixing electrodes form a second direction detection capacitor, wherein the at least one group of first moving electrodes, the at least one group of second moving electrodes, the corresponding first fixing electrodes, and the corresponding second fixing electrodes form a third direction detection capacitor that detects an acceleration in a third direction.

4. The sensing device of claim 3, wherein the second direction is perpendicular to the first direction.

5. The sensing device of claim 3, wherein
the at least one group of first moving electrodes includes an even number of groups of first moving electrodes and the even number of groups of first moving electrodes are located on two sides of a mass element along the first direction; and
the at least one group of second moving electrodes includes an even number of groups of second moving electrodes and the even number of groups of second moving electrodes are located on two sides of the mass element along the second direction.

6. The sensing device of claim 3, wherein
each first moving electrode has a first moving electrode top surface and a first moving electrode bottom surface, the first moving electrode top surface and the first moving electrode bottom surface are parallel to an upper surface of a mass element, a corresponding first fixing electrode has a first fixing electrode top surface and a first fixing electrode bottom surface, the first fixing electrode top surface and the first fixing electrode bottom surface are parallel to the upper surface of the mass element, and the first moving electrode top surface is farther away from the upper surface of the mass element compared with the first fixing electrode top surface; and
each second moving electrode has a second moving electrode top surface and a second moving electrode bottom surface, the second moving electrode top surface and the second moving electrode bottom surface are parallel to the upper surface of the mass element, a corresponding second fixing electrode has a second fixing electrode top surface and a second fixing electrode bottom surface, the second fixing electrode top surface and the second fixing electrode bottom surface are parallel to the upper surface of the mass element, and the second moving electrode top surface is farther away from the upper surface of the mass element compared with the second fixing electrode top surface.

7. The sensing device of claim 2, wherein the sensing element further includes:
   a first support component fixed on the substrate, wherein the mass element is connected with the first support component through an elastic connecting unit, the first support component is located at a center of the mass element, the elastic connecting unit extends along a first direction, a center line of the elastic connecting unit coincides with a center line of the mass element in the first direction, weights of two parts of the mass element on different sides of the elastic connecting unit in a second direction are different, wherein
   the at least one fixing electrode includes:
      at least two first direction fixing electrodes;
      at least two second direction fixing electrodes extending along the first direction, wherein the at least two second direction fixing electrodes are located at the center line of the mass element along the second direction and are set symmetrically with respect to the first support component; and
      at least two third direction fixing electrodes arranged on two sides of the elastic connecting unit,
   the at least one moving electrode includes:
      first direction moving electrodes, second direction moving electrodes, and third direction moving electrodes corresponding to the at least two first direction fixing electrodes, the at least two second direction fixing electrodes, and the at least two third direction fixing electrodes, respectively, forming at least two first direction detection capacitors, at least two second direction detection capacitors, and at least two third direction detection capacitors, respectively.

8. The sensing device of claim 7, wherein the at least two first direction fixing electrodes extend along the second direction, the at least two first direction fixing electrodes are distributed on two sides of a line on the substrate corresponding to the center line of the mass element along the second direction, and the at least two first direction fixing electrodes are axisymmetric with respect to the center line of the mass element along the second direction or with respect to a center of the first support component.

9. The sensing device of claim 2, wherein the sensing element further includes:
   first support component fixed to the substrate, wherein the mass element is connected with the substrate through the second support component,
   the at least one fixing electrode includes:
      a coupling component, wherein the coupling component surrounds the mass element, and a gap is set between the mass element and the coupling component so as to form at least one detection capacitor.

10. The sensing device of claim 2, wherein
the mass element includes:
   a first mass element; and
   a second mass element,
the sensing device further includes:
   a first fixing element, connected with the substrate and surrounding the first mass element, wherein the first fixing element is connected with the first mass element through at least one first flexible component, and the second mass element surrounds the first fixing element; and a second fixing element, connected with the substrate and surrounding the second mass element, wherein the second fixing element is connected with the second mass element through at least one second flexible component, the at least one moving electrode includes:

a plurality of first moving electrodes disposed on an inner side of the second mass element and extending inwards, wherein the plurality of first movable electrodes are distributed along at least a first direction and a second direction; and a second moving electrode arranged at a bottom of the first mass element; and the at least one fixing electrode includes:

a plurality of first fixing electrodes arranged on a periphery of the first fixing element and extending outwards, wherein the plurality of first fixing electrodes correspond to the plurality of first moving electrodes, and the plurality of first fixing electrodes and the plurality of first moving electrodes are arranged at intervals to form a plurality of first direction detection capacitors and a plurality of second direction detection capacitors; and a second fixing electrode disposed on the substrate, wherein the second fixing electrode and the second moving electrode form a third direction detection capacitor.

11. The sensing device of claim 1, wherein the at least one resonant system includes a first resonance system and the first resonance system is a spring-mass-damper system.

12. The sensing device of claim 11, wherein the liquid includes at least one of silicone oil, glycerin, motor oil, lubricating oil, or hydraulic oil.

13. The sensing device of claim 1, wherein the at least one resonant system includes a second resonant system, and the second resonant system is a combination of a spring-mass-damping system and a spring-damping system.

14. The sensing device of claim 13, wherein the second resonant system is composed of the first medium and the second medium, the first medium and the second medium are filled in the cavity, the first medium constitutes the spring-mass-damping system, the second medium constitutes the spring-damping system.

15. The sensing device of claim 1, wherein the one or more bubbles is formed by applying a hydrophobic coating to the sensing element.

16. The sensing device of claim 14, wherein the first medium and the second medium are immiscible liquids with different properties.

17. The sensing device of claim 13, wherein the second resonant system includes at least one second elastic structure connected to the acceleration sensor, and the second elastic structure includes a first elastic structure and at least one lightweight elastic component.

18. The sensing device of claim 1, wherein a sensitivity difference between a trough between the first resonant frequency and the second resonant frequency and a peak of the first resonant frequency or the second resonant frequency is not more than 30 dBV, and a ratio of the sensitivity difference to the peak is not more than 0.2.

* * * * *